United States Patent
Watts, Jr. et al.

(10) Patent No.: US 12,376,192 B2
(45) Date of Patent: *Jul. 29, 2025

(54) DUAL CHANNEL GATEWAY DEVICE FOR MACHINE-TO-MACHINE COMMUNICATION

(71) Applicant: Systech Corporation, Escondido, CA (US)

(72) Inventors: La Vaughn F. Watts, Jr., San Diego, CA (US); Dean McDaniel, San Diego, CA (US); Donald G. Armerding, San Diego, CA (US); Andrew Marder, San Diego, CA (US); Anderson Wiese, San Diego, CA (US); Robert Lutz, San Diego, CA (US)

(73) Assignee: SYSTECH CORPORATION, Escondido, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/656,313

(22) Filed: May 6, 2024

(65) Prior Publication Data

US 2024/0292493 A1    Aug. 29, 2024

Related U.S. Application Data

(63) Continuation of application No. 17/306,551, filed on May 3, 2021, now Pat. No. 11,979,947.

(Continued)

(51) Int. Cl.
*H04W 88/16*    (2009.01)
*H04W 12/06*    (2021.01)
(Continued)

(52) U.S. Cl.
CPC ........... *H04W 88/16* (2013.01); *H04W 12/06* (2013.01); *H04W 48/18* (2013.01); *H04W 88/06* (2013.01)

(58) Field of Classification Search
CPC ..... H04W 88/16; H04W 12/06; H04W 48/18; H04W 88/06; H04W 4/70
(Continued)

(56) References Cited

U.S. PATENT DOCUMENTS

| | | | |
|---|---|---|---|
| 4,972,455 | A | 11/1990 | Phillips et al. |
| 4,993,059 | A | 2/1991 | Smith et al. |

(Continued)

FOREIGN PATENT DOCUMENTS

| | | | |
|---|---|---|---|
| CA | 2884013 C | 9/2016 | |
| CN | 1352864 A | 6/2002 | |

(Continued)

OTHER PUBLICATIONS

Examination Report dated May 20, 2021 for related EP Patent Application No. 20194830.4, in 7 pages.

(Continued)

*Primary Examiner* — Huy C Ho
(74) *Attorney, Agent, or Firm* — Procopio, Cory, Hargreaves & Savitch LLP

(57) ABSTRACT

Gateway devices can use dual cellular interfaces, each assignable to at least one of a plurality of network services, to provide reliable communications for client machines. A gateway device can use one of the dual cellular interfaces assigned to a first network service as a primary interface and the other assigned to a second network service as a hot backup interface. The backup interface remains connected to a cellular network while communications are routed on the primary interface. Accordingly, the gateway device can rapidly switch communications between from the primary interface to the backup interface. Applications, for example, for ATM payment processing, vending machine telemetry, point of sale payment processing, kiosk internet connectivity, remote monitoring and control, mobile or electronic (Continued)

health, and remote information displays, may run on the gateway devices, on servers, on user devices, or a combination of these devices.

16 Claims, 30 Drawing Sheets

Related U.S. Application Data

(60) Provisional application No. 63/019,493, filed on May 4, 2020.

(51) Int. Cl.
*H04W 48/18* (2009.01)
*H04W 88/06* (2009.01)

(58) Field of Classification Search
USPC .......................................................... 726/3
See application file for complete search history.

(56) References Cited

U.S. PATENT DOCUMENTS

| | | | |
|---|---|---|---|
| 5,146,486 A | 9/1992 | Lebowitz | |
| 5,185,779 A | 2/1993 | Dop et al. | |
| 5,327,478 A | 7/1994 | Lebowitz | |
| 5,535,432 A | 7/1996 | Dent | |
| 5,608,684 A | 3/1997 | Reasoner et al. | |
| 5,794,159 A | 8/1998 | Portin | |
| 5,907,815 A | 5/1999 | Grimm et al. | |
| 6,144,859 A | 11/2000 | Ladue | |
| 6,208,875 B1 | 3/2001 | Damgaard et al. | |
| 6,295,197 B1 | 9/2001 | Watts et al. | |
| 6,298,243 B1 | 10/2001 | Basile | |
| 6,463,462 B1 | 10/2002 | Smith et al. | |
| 6,664,760 B2 | 12/2003 | Kobayashi | |
| 6,960,998 B2 | 11/2005 | Menard et al. | |
| 6,963,757 B1 | 11/2005 | Watts, Jr. et al. | |
| 7,088,966 B2 | 8/2006 | Petersen | |
| 7,617,369 B1 | 11/2009 | Bezbaruah et al. | |
| 7,639,157 B1 | 12/2009 | Whitley et al. | |
| 7,995,466 B2 | 8/2011 | Baker et al. | |
| 7,995,494 B2 | 8/2011 | Habib et al. | |
| 8,203,934 B2 | 6/2012 | Savage et al. | |
| 8,566,410 B2 | 10/2013 | Smith et al. | |
| 8,582,631 B2 | 11/2013 | Vos et al. | |
| 8,639,832 B2 | 1/2014 | Biderman et al. | |
| 8,688,180 B2 | 4/2014 | Catten | |
| 10,623,975 B1 | 4/2020 | Garrett et al. | |
| 2005/0025058 A1 | 2/2005 | Chaudhuri et al. | |
| 2006/0221876 A1 | 10/2006 | Kosanovic et al. | |
| 2007/0180314 A1 | 8/2007 | Kawashima et al. | |
| 2007/0254727 A1 | 11/2007 | Sewall et al. | |
| 2007/0280103 A1* | 12/2007 | Savage | H04L 45/22 370/389 |
| 2007/0294395 A1 | 12/2007 | Strub et al. | |
| 2010/0097925 A1 | 4/2010 | Bell | |
| 2010/0142368 A1* | 6/2010 | Gunukula | H04L 45/22 370/217 |
| 2011/0004791 A1 | 1/2011 | Kokubu et al. | |
| 2011/0237297 A1 | 9/2011 | Shin | |
| 2012/0005609 A1 | 1/2012 | Ata et al. | |
| 2012/0140709 A1 | 6/2012 | Hou | |
| 2012/0195311 A1 | 8/2012 | Gupta et al. | |
| 2012/0278654 A1 | 11/2012 | Shen et al. | |
| 2013/0165117 A1 | 6/2013 | Narayanan | |
| 2013/0223207 A1 | 8/2013 | Bouchard et al. | |
| 2013/0272374 A1 | 10/2013 | Eswaran et al. | |
| 2013/0316764 A1 | 11/2013 | Mehio et al. | |
| 2013/0329639 A1* | 12/2013 | Wietfeldt | H04W 88/06 370/328 |
| 2013/0344872 A1 | 12/2013 | Nukala et al. | |
| 2014/0004842 A1 | 1/2014 | Lindoff et al. | |
| 2014/0019807 A1 | 1/2014 | Harrison et al. | |
| 2014/0025808 A1 | 1/2014 | Ito et al. | |
| 2014/0051398 A1 | 2/2014 | Ben Shlush et al. | |
| 2014/0080485 A1 | 3/2014 | Park | |
| 2014/0095728 A1 | 4/2014 | Zhu et al. | |
| 2014/0233412 A1 | 8/2014 | Mishra et al. | |
| 2014/0247735 A1 | 9/2014 | Tanaka et al. | |
| 2014/0256083 A1 | 9/2014 | Yakobson et al. | |
| 2014/0269364 A1 | 9/2014 | Knapp et al. | |
| 2014/0274006 A1 | 9/2014 | Mutya et al. | |
| 2014/0293829 A1 | 10/2014 | Visuri et al. | |
| 2014/0325258 A1 | 10/2014 | Mendiratta et al. | |
| 2015/0189569 A1 | 7/2015 | Visuri et al. | |
| 2015/0201325 A1 | 7/2015 | Bai et al. | |
| 2015/0215947 A1 | 7/2015 | Kaukovuori et al. | |

FOREIGN PATENT DOCUMENTS

| | | | |
|---|---|---|---|
| CN | 1666473 A | 9/2005 | |
| CN | 101136806 A | 3/2008 | |
| CN | 101296131 A | 10/2008 | |
| CN | 101510991 A | 8/2009 | |
| CN | 101908974 A | 12/2010 | |
| CN | 102067523 A | 5/2011 | |
| CN | 201893938 U | 7/2011 | |
| CN | 102571457 A | 7/2012 | |
| CN | 102801563 A | 11/2012 | |
| CN | 102984057 A | 3/2013 | |
| EP | 1026908 A2 | 8/2000 | |
| EP | 2437528 A1 | 4/2012 | |
| FR | 2929067 A1 | 9/2009 | |
| KR | 1020020076108 A | 10/2002 | |
| KR | 100481272 B1 | 3/2005 | |
| WO | 2004008693 A1 | 1/2004 | |

OTHER PUBLICATIONS

Extended European Search Report dated Oct. 24, 2016 for related EP Patent Application No. 14786025.8, in 9 pages.
International Search Report and Written Opinion for related PCT/US2014/034548, mailed on Sep. 1, 2014 in 11 pages.
Mohan. "Dual Cell HSDPA System Benefits and User Experience Gains." Retrieved from http://www.qualcomm.com/media/documents/dual-cell-hsdpa-system-benefits-and-user-experience-gains. Jul. 18, 2013, 6 pages.
Office Action and Search Report for related CN Patent Application No. 201480029044.5, dated Jan. 31, 2018, 5 pages.
Office Action dated Mar. 7, 2019 for related CA Patent Application No. 2,937,578, in 8 pages.
Office Action dated Oct. 3, 2019 for related CA Patent Application No. 2,937,578, in 9 pages.
Office Action dated Sep. 13, 2019 for related EP Patent Application No. 14786025.8, in 3 pages.
Qualcomm. "HSPA+ Advanced: Multi Carrier." Retrieved from http://www.qualcomm.com/research/projects/hspa/multicarrier. Retrieved on Jun. 26, 2014, 3 pages.
Universal Mobile Telecommunications System (UMTS); Service Requirements for Home Node B (HNB) and Home eNode B (HeNB). 3GPP TS 22.220 version 10.7.0, Release 10. Technical specification, European Telecommunications Standards Institute (ETSI), vol. 3GPP SA1, No. V10.7.0, Jul. 1, 2011.
Qualcomm. "Qualcomm Smart Gateway Platform Transforms Connected Experiences in the Home to Enable a New Breed of Applications and Services." Retrieved from http://www.qualcomm.com/media/releases/2014/01/06/qualcomm-smart-gateway-platform-transforms-connected-experiences-home. Jan. 6, 2014, 3 pages.
Office Action issued in Chinese Patent Application No. 2019105486108 dated Jun. 30, 2023.
Office Action and Search Report for related CN Patent Application No. 201910548610.8, dated Nov. 22, 2021, 13 pages.
EPO; Intention to Grant Issued in EP Application No. 20 194 830.4-1213; Mailed Apr. 12, 2022; 48 Pages.
SIPO; Second Office Action Issued in Chinese Patent Application No. 201910548610.8; Mailed Apr. 28, 2022; 10 Pages.

(56) References Cited

OTHER PUBLICATIONS

Supplementary Search Report in Chinese Patent Application No. 2019105486108 dated Jun. 30, 2023.
USPTO; Notice of Allowance Issued in U.S. Appl. No. 17/025,801; Mailed Jun. 17, 2022; 5 Pages.

* cited by examiner

| RSRP | Signal Strength |
|---|---|
| > -90 dBm | Excellent |
| -90 dBm to -105 dBm | Good |
| -106 dBm to -120 dBm | Fair |
| < -120 dBm | Poor |

| RSRQ | Signal Quality |
|---|---|
| > -9 dB | Excellent |
| -9 dB to -12 dB | Good |
| < -13 dB | Fair to Poor |

| SINR Value | Throughput |
|---|---|
| > 10 | Excellent |
| 6 to 10 | Good |
| 0 to 5 | Fair |
| < 0 | Poor |

FIG. 5

Cellular Modem

Module Information

| Parameter | LE910-NA1 (Telit) |
|---|---|
| Hardware Version | 0 |
| Software Version | 20.00.525 |
| MEID | 35776609091292929 |
| International Mobile Station (IMSI) | 310410247151350 |
| Mobile Station IP Address Mode (MIP Mode) | N/A |
| Preferred Roaming List ID (PRLID) | N/A |
| Roam Preference | N/A |
| Roaming State | Home |
| Signal Strength | -81 dBm (100%) |
| Network Provisioning Status | N/A |
| Main Cell Environment | 2225,-81,"AT&T","310410",0000138,7009,128,3,-109 |
| Network Carrier | AT&T |
| MDN | N/A |
| SIM ID | 89014104272471513502 |
| IP Address | 10.143.223.228 |
| Location | N/A |
| Access Point Name | broadband |
| Connection Mode | LTE |
| Cell Network Info | "310410",2225,-109,-82,-7,5,7009,FE,0,128,19,1,C930F16,"310410247151350","AT&T",3,4,720,3240 |
| Diversity Antenna | Enabled |

FIG. 10

Network Interface Statistics

| Interface | | Bytes | Packets | Errors | Dropped | FIFO | Frame | Compressed | Multicast |
|---|---|---|---|---|---|---|---|---|---|
| ip6_vti0 | Receive | 0 | 0 | 0 | 0 | 0 | 0 | 0 | 0 |
| | Transmit | 0 | 0 | 0 | 0 | 0 | 0 | 0 | 0 |
| ip_vti0 | Receive | 0 | 0 | 0 | 0 | 0 | 0 | 0 | 0 |
| | Transmit | 0 | 0 | 0 | 0 | 0 | 0 | 0 | 0 |
| br1 | Receive | 1143565 | 1843 | 0 | 0 | 0 | 0 | 0 | 0 |
| | Transmit | 628622 | 1575 | 0 | 0 | 0 | 0 | 0 | 0 |
| sit0 | Receive | 0 | 0 | 0 | 0 | 0 | 0 | 0 | 0 |
| | Transmit | 0 | 0 | 0 | 0 | 0 | 0 | 0 | 0 |
| lo | Receive | 7217283 | 26657 | 0 | 0 | 0 | 0 | 0 | 0 |
| | Transmit | 7217283 | 26657 | 0 | 0 | 0 | 0 | 0 | 0 |
| eth0 | Receive | 230786280 | 3513854 | 0 | 0 | 0 | 0 | 0 | 0 |
| | Transmit | 3284920548 | 3211197 | 0 | 0 | 0 | 0 | 0 | 0 |
| ip6tnl0 | Receive | 0 | 0 | 0 | 0 | 0 | 0 | 0 | 0 |
| | Transmit | 0 | 0 | 0 | 0 | 0 | 0 | 0 | 0 |
| eth1 | Receive | 3240893076 | 3223210 | 6 | 0 | 0 | 0 | 0 | 0 |
| | Transmit | 269310990 | 3509233 | 0 | 0 | 0 | 0 | 0 | 0 |

FIG. 11

| Technology | | | | |
|---|---|---|---|---|
| Tech. | Upload (Mbps) | Download (Mbps) | Max Latency (Seconds) | Antennas |
| NB-IoT | 0.25 | 0.25 | 10 | 1 |
| Cat-M1 | 1 | 1 | 2 | 1 |
| Cat-1 | 5 | 10 | 0.1 | 1 or 2 |
| Cat-4 | 50 | 150 | <0.1 | 2 |
| Cat-6 | 100 | 300 | <0.1 | 2 |

| Carrier | Primary LTE Bands |
|---|---|
| AT&T | 1900 (B2), 700 (B12/17), 850 (B5) |
| T-Mobile | 1900 (B2), 1700/2100 (B4) |
| Verizon | 1700 (B4), 700 (B13) |

Note: Speeds are theoretical maximums

FIG. 13

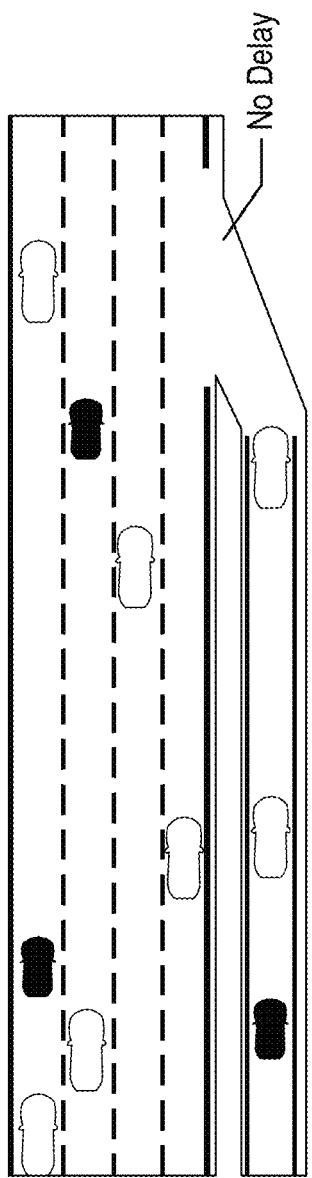 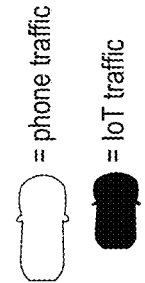
FIG. 14
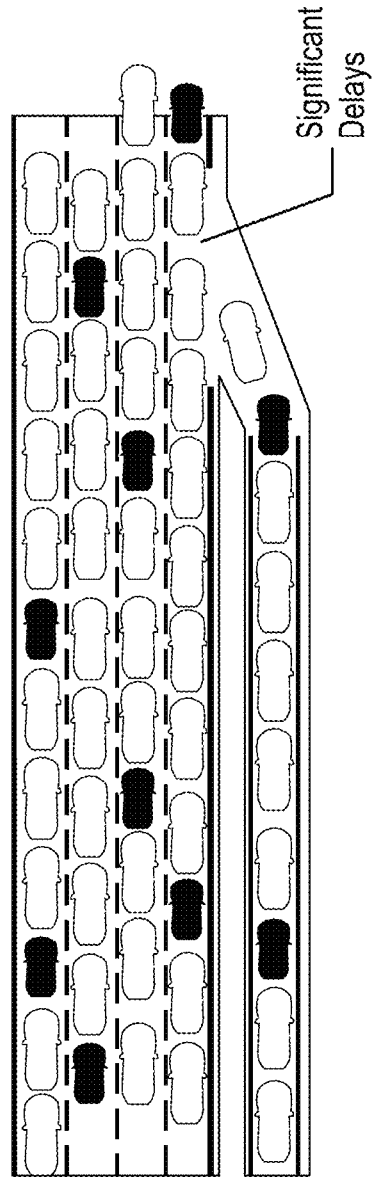 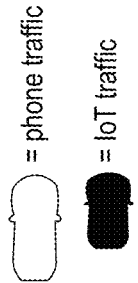
FIG. 15

DUAL CHANNEL GATEWAY DEVICE FOR MACHINE-TO-MACHINE COMMUNICATION

RELATED APPLICATIONS INFORMATION

This application is a continuation of U.S. patent application Ser. No. 17/306,551, filed on May 3, 2021, which claims the benefit of U.S. provisional patent application Ser. No. 63/019,493, filed May 4, 2020 and entitled "Dual Channel Gateway Device for Machine-To-Machine Communication," which is hereby incorporated by reference in its entirety.

The present application is related to U.S. patent application Ser. No. 16/257,548, filed on Jan. 25, 2019 and entitled "Gateway Device for Machine-to-Machine Communication with Dual Cellular Interfaces," which is a continuation of U.S. patent application Ser. No. 15/627,206, filed on Jun. 19, 2017 and entitled "Gateway Device for Machine-to-Machine Communication with Dual Cellular Interfaces," issued Jan. 29, 2019 as U.S. Pat. No. 10,194,340, which is a continuation of U.S. patent application Ser. No. 15/046,876, filed Feb. 18, 2016 and entitled "Gateway Device for Machine-to-Machine Communication with Dual Cellular Interfaces," issued Jun. 20, 2017 as U.S. Pat. No. 9,686,184, which is a continuation of U.S. patent application Ser. No. 14/255,827, filed Apr. 17, 2014 and entitled "Gateway Device for Machine-to-Machine Communication with Dual Cellular Interfaces," issued Apr. 5, 2016 as U.S. Pat. No. 9,307,344, which claims the benefit of U.S. provisional patent application Ser. No. 61/813,066, filed Apr. 17, 2013 and entitled "Gateway Device for Machine-to-Machine Communication with Dual Cellular Interfaces," each of which are hereby incorporated by reference in their entirety.

BACKGROUND

The present invention generally relates to the field of communication systems and more specifically to systems and methods for machine-to-machine communication with dual cellular interfaces.

The use of machine-to-machine (M2M) systems has and will continue to increase. Machine-to-machine systems may also be referred to as the Internet of things. Communications between devices in a machine-to-machine system can use a gateway device. In addition to providing communications, the gateway device may provide additional service is such as running applications. Present gateway devices may have shortcomings; for example, in some circumstances their communications may not be sufficiently reliable.

SUMMARY

In an aspect, a gateway device is provided. The gateway device includes: a cellular module configured to communication over a first network and a second network; a cellular interface coupled to the cellular module and configured to identify and authenticate the gateway device to the first network, the first cellular interface assignable to a first network service of a plurality of network services; a second cellular interface coupled to the cellular module and configured to identify and authenticate the gateway device to the second network, the second cellular interface assignable to a second network service of the plurality of network services; at least one local communication interface configured to route communications between the gateway and one or more client devices; and a one or more processors coupled to the cellular module and the at least one local communication interface, the one or more processors configured to route communication with the one or more client devices via the cellular module using the first cellular interface assigned to the first network service over the first network, while maintaining an active connection to the second network via the cellular module using the second cellular interface assigned to a second network service; determine to switch communication with the one or more client devices from the first network; and after determining to switch communication with the one or more client devices from the first network, route communication with the one or more client devices via the second network.

In another aspect, a dual channel gateway device is provided. The gateway device includes: one network module configured to communication over at least a first network and a second network; a dual network interface coupled to the network module and comprising at least a first network interface and a second network interface, the first cellular interface assignable to a first network service of a plurality of network services and the second cellular interface assignable to a second network service of the plurality of network services; at least one local communication interface configured to communicate with one or more external client devices; and one or more processors coupled to the cellular module and the at least one local communication interface, the one or more processors configured to: use the first network services to communicate over the first network, while maintaining an active connection to the second network via the second network services, determine to switch communication from the first network, and after determining to switch communication from the first network, use the cellular module to route communications over the second network.

Other features and advantages of the present invention should be apparent from the following description which illustrates, by way of example, aspects of the invention.

BRIEF DESCRIPTION OF THE DRAWINGS

The details of the present invention, both as to its structure and operation, may be gleaned in part by study of the accompanying drawings, in which like reference numerals refer to like parts, and in which:

FIG. 5 illustrates a table of parameters within QoS terms for use in managing communications on gateway devices according to presented disclosed embodiments;

FIGS. 10 and 11 illustrate information that may be collected locally by gateway devices according to presently disclosed embodiments;

FIG. 13 illustrates a non-exhaustive list of factors that impact bandwidth on cellular networks;

FIGS. 14-16 illustrate schematic diagrams of a metaphorical example of cellular data traffic patterns on a conventional cellular networks;

DETAILED DESCRIPTION

The detailed description set forth below, in connection with the accompanying drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in simplified form in order to avoid obscuring such concepts.

References throughout this specification to "an embodiment"; "some embodiments" "one embodiment"; "an implementation" or the like means that a particular feature, structure, or characteristic described in connection with the embodiment is included in at least one embodiment or implementation. Thus, appearances of the phrase "embodiment" or "implementation" in various places throughout this specification are not necessarily all referring to the same embodiment or a single exclusive embodiment. Furthermore, the particular features, structures, or characteristics described herein may be combined in any suitable manner in one or more embodiments or one or more implementations. For example, it is to be understood that the features of the various embodiments described herein may be rearranged, interchanged, combined, omitted, and/or otherwise modified as would be understood by one skilled in the art. The subject matter described herein can be practiced without those specifically defined or described matters or with other or different elements or matters not described.

The present disclosure describes a family of gateway and router devices. The devices can be used to provide reliable communication for payment transactions. The devices may be referred to as gateway devices, SysCOREs, SysLINKs, SmartHubs, or Systech Financial Gateways (SFGs). Other applications for the gateway devices include secure cellular and Internet access for ATM payment processing; vending machine telemetry; point of sale (POS) payment processing and internet connectivity; kiosk internet connectivity, remote monitoring and control; mobile or electronic health; and remote information displays. Gateway devices also support home and building security and automation applications. Further applications include mobile merchants, mall kiosks, major events, seasonal sales, outdoor markets, etc. The applications may run on the gateway devices, on servers, on user devices, or a combination of these devices.

Figure 1:
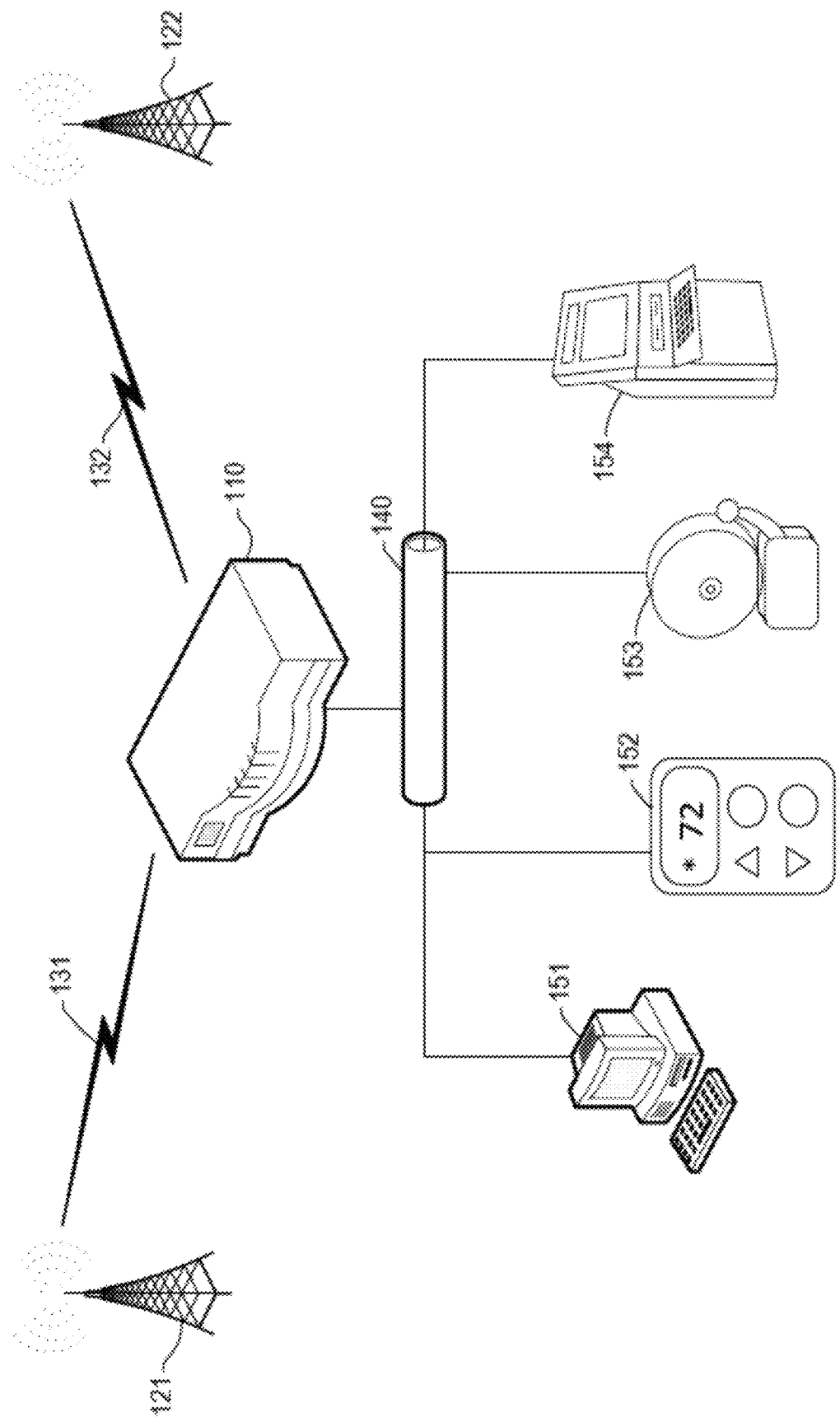
FIG. 1 is a block diagram of a communication system using a gateway device with dual cellular interfaces according to a presently disclosed embodiment.

FIG. 1 is a block diagram of a communication system using a gateway device with dual cellular interfaces according to a presently disclosed embodiment. The gateway device 110 communicates with a first cellular network 121 and a second cellular network 122, for example, to provide services that allow payment transactions to succeed with a high degree of probability. The first cellular network 121 and the second cellular network 122 may be independent mobile networks. The services may have associated SLAs (service level agreements) that guarantee service characteristics (e.g., delays, frequency and duration of outages). For payment transactions, availability of services can be of particular importance. In other systems, one or both of the first cellular network 121 and the second cellular network 122 may be a non-cellular network; for example, the gateway device 110 may communicate using DSL, DOCSIS, MMDS, WiMAX, or other technologies.

The gateway device 110 communicates via a local network 140 with various machines. The machines that communicate with the gateway device 110 using the local network 140 may also be referred to as client machines, client devices, or clients. In the example system of FIG. 1, the client machines that communicate with the gateway device 110 include a personal computer 151, a thermostat 152, an alarm 153, and an automatic teller machine (ATM) 154. Some of the devices may be collocated; for example, the gateway device 110 may be located in the automatic teller machine 154. The local network 140 may be, for example, a wired network such as Ethernet, a wireless network such as Wi-Fi, or a combination of networks.

Figure 2:
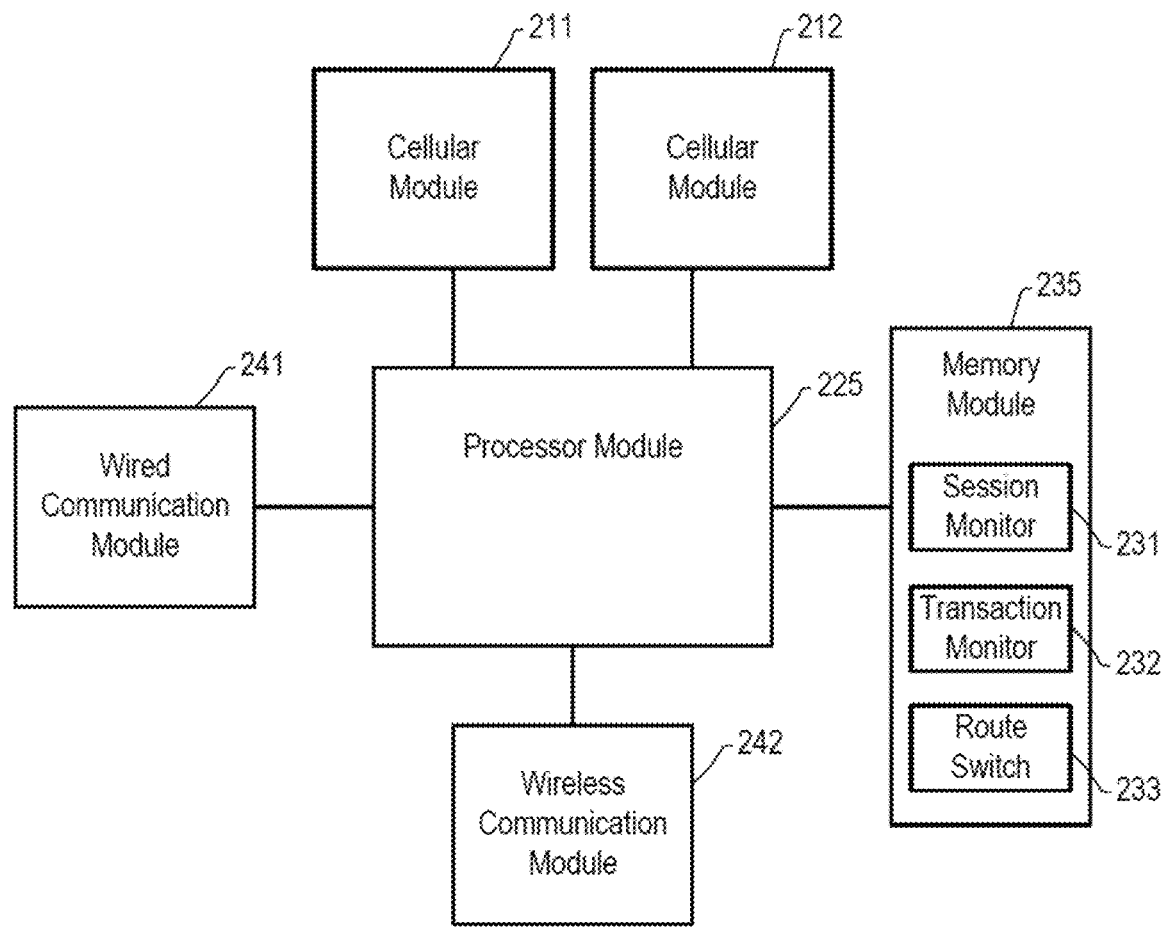
FIG. 2 is a functional block diagram of an gateway device according to a presently disclosed embodiment.

FIG. 2 is a functional block diagram of a gateway device according to a presently disclosed embodiment. The gateway device of FIG. 2 can be used to implement the gateway device 110 of the system of FIG. 1. The gateway device of FIG. 2 includes a processor module 225. The processor module 225 is coupled to a first cellular communication module 211, a second cellular communication module 212, a wired communication module 241, a wireless communication module 242, and a memory module 235.

In various embodiments, the first cellular module 211 and the second cellular module 212 can be configured to transmit and receive communications with cellular networks. For example, the first cellular module 211 may communicate with the first cellular network 121 via communication link 131 and the second cellular module 212 may communicate with the second cellular network 122 using communication link 132. The first cellular module 211 and the second cellular module 212 may also be referred to as network communication modules. In alternative embodiments, the network communication modules may use communication technologies other than cellular. For example, a network communication module may communicate using DSL, DOCSIS, MMDS, WiMAX, or other technologies. Additionally, a network communication module may use a local network connection (e.g., an Ethernet connection) to another device that then communicates with an Internet service provider, wide area network, or some other network. Each cellular module may comprise a respective cellular interface (not shown). The cellular interfaces may use different underlying technologies, such as PPP, LTE, CDMA, and EVDO. The first cellular module 211 and the second cellular module 212 may use subscriber identification module (SIM) cards, as example cellular interfaces, to identify and authenticate the gateway device to the cellular networks. The gateway device may, accordingly, have two or more SIM card slots.

The SIM card slot may access a physical card or an electronic component eSIM where in either case, the usage is the same. If the gateway device has one SIM card slot, then the SIM card may contain at account information for authenticating the gateway device on at least two cellular networks. Thereby providing for operation with multiple modems, each requiring the SIM card information.

The gateway device can provide connections to the Internet for machines that communicate with the gateway device via the wired communication module 241 or the wireless communication module 242. The wired communication module 241 or the wireless communication module 242 may also be termed local communication modules. The gateway device provides the connections to the Internet using the first cellular module 211 and the second cellular module 212. In some embodiments, one or more of the first cellular module 211 and second cellular module 212 may be a physical cellular module. Additionally (or alternatively), one or more of the first cellular module 211 and second cellular module 212 may be logical cellular modules. Further still, one or more additional cellular modules may be included and implemented as either physical or logical cellular modules. For example, some example gateway devices may include one physical cellular module and two logical cellular modules. The gateway device includes one or more antennas for transmission and reception of radio signals.

The wired communication module 241 and the wireless communication module 242 are configured to transmit and receive communications with client machines. In the system of FIG. 1, for example, the wired communication module 241 may communicate with the automatic teller machine 154 and the personal computer 151 and the wireless communication module 242 may communicate with the thermostat 152 and the alarm 153.

The processor module 225 can process communications being received and transmitted by the gateway device. The memory module 235 stores data for use by the processor module 225. The memory module 235 may also be used to store computer readable instructions for execution by the processor module 225. The computer readable instructions can be used by the processor module 225 for accomplishing the various functions of the gateway device. The memory module 235 or parts of the memory module 235 may be a non-transitory machine readable medium. For concise explanation, the gateway device or embodiments of it are described as having certain functionality. It will be appreciated that in some embodiments, this functionality is accomplished by the processor module 225 in conjunction with the memory module 235, and the communication modules. Furthermore, in addition to executing instructions, the processor module 225 may include specific purpose hardware to accomplish some functions.

The gateway device may perform operations to enhance reliability of communications with the devices connected to the gateway device. For example, the gateway device can monitor and analyze the reliability of communications with the first wireless network 121 and the second wireless network 122 and switch between them accordingly.

As described above, the first cellular module 211 and the second cellular module 212 may comprise network interfaces, and therefor may be referred to as network interfaces unless otherwise noted. The gateway device can operate one of the network interfaces as a primary interface while the other network interface is operated as a hot backup (or "secondary") interface. The two network interfaces may, for example, connect to different cellular service providers. The first cellular module 211 and the second cellular module 212 may be physically separate modules or may be a single module with dual cellular interfaces.

In various embodiments, the use of two cellular interfaces can greatly improve the availability of communication services. That is, the gateway device may determine that communication on one of the interfaces is unavailable or unreliable and switch to using the other interface. Usage of the two cellular interfaces may also be based on other criteria, for example, cost of the corresponding cellular data plans. In some embodiments, usage of the two cellular interfaces may be based on performance demands due to content of the communications. For example, different streams of data may be directed to different cellular interfaces such that high bandwidth consuming content (e.g., video streams) can be directed to use a cellular interface capable of high speed or highly available connection, while lower demanding content (e.g., internet of things transactions) can be directed to a slower or less available connection.

Figure 3:
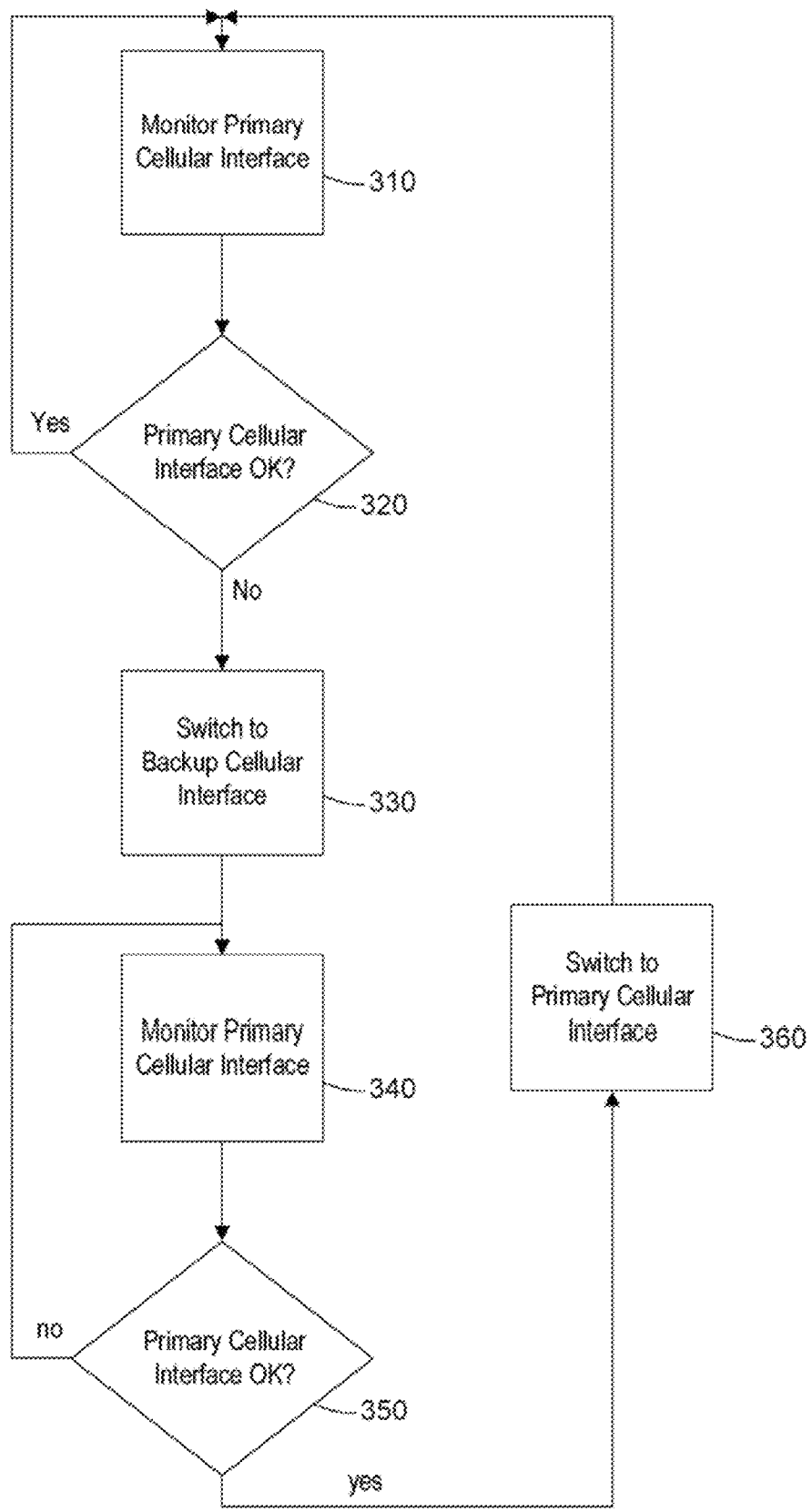
FIG. 3 is a flowchart of a process for managing communications on dual cellular interfaces according to a presently disclosed embodiment.

FIG. 3 is a flowchart of a process for managing communications according to presently disclosed embodiments. In some embodiments, FIG. 3 illustrates a process for managing communication on dual cellular interfaces. The process may be performed by the gateway device of FIG. 2 and the gateways of FIGS. 4 and 6-8. For example, the process 300 may be performed by the processor 225 executing instructions stored in the memory 235. The gateway device can have two or more network interfaces active simultaneously. Although the network interfaces are active, only one network interface is ordinarily used for network traffic and the other network interfaces may be idle. In this embodiment, two physical SIM cards may be implanted, but they may each contain multiple network interfaces. Alternatively, the gateway device may operate with only the network interface used for routing communications active. Whether the network interface that is not used for routing communications is active or passive may be configured by a user. In various embodiments throughout the present disclosure, an active connection may refer to actively handling network traffic between a gateway device and the network, while passive may refer to an idle interface that is not currently used for network traffic. In some embodiments, where the network interfaces disclosed herein include SIM cards and the SIM contains a Subscriber Network in which the Subscriber Network Account is valid and activated to the respective network carrier, then the network interface may be considered an active connection. In these embodiments, where such aspects are not present, the interface may be considered passive. By having two cellular interfaces connected, the gateway device can switch between the interfaces with little delay. In the system of FIG. 1, for example, the gateway device 110 may be operating with communication link 131 to the first cellular network 121 as the primary interface and communication link 132 to the second cellular network 122 as the backup interface. The default route may be through the primary interface. Alternatively, the default route may be to use the last interface that was actively used for network traffic.

In step 310, the gateway device 110 monitors the primary cellular interface. For example, periodically the gateway device 110 may test the primary interface to be sure network traffic is still occurring.

If the process determines, in step 320, that the gateway device should stop using the primary interface, the gateway device switches, in step 330, the default route to the hot backup interface; otherwise, the process returns to step 310 to further monitor the primary cellular interface. The process may determine that that the gateway device should stop using the primary interface when network traffic on the primary interface is not occurring. Switching cellular interfaces may be termed failover. Similarly, the use of dual cellular networks may be referred to as wireless redundancy.

The gateway device can use one or more monitors, for example, a session monitor module 231 and a transaction monitor module 232, to test the interfaces. The monitoring of step 210 may be performed, for example, by the session monitor module 231, the transaction monitor module 232, or a combination of the session monitor module 231 and the transaction monitor module 232. The session monitor module 231 and the transaction monitor module 232 can signal a route switch module 233 to change which cellular interface communications are routed over. The session monitor module 231, the transaction monitor module 232, and the route switch module 233 may be software modules that are stored in the memory module 235 and executed by the processor module 225.

The gateway device can be used as a router to provide general access to the Internet. Accordingly, the gateway device can act as the DHCP (dynamic host configuration protocol) server for client machines. Static IP support is also provided. When the default route is switched, the gateway device can also update DNS (domain name system) information so that DHCP client machines observe minimal delays in the network traffic. The gateway device maintains the network interface specific DNS information for the primary and backup interfaces and acts as a DNS proxy for the DHCP client devices. In this way, the appropriate DNS server is used when switching between the primary and secondary interfaces. These functions may be performed by the route switch module 233.

After switching to the hot backup interface in step 330, the gateway device monitors, in step 340, the primary interface to determine, step 350, whether the gateway device should return to using the primary interface. The process may determine that that the gateway device should return to using the primary interface when network traffic resumes on that interface. The monitoring in step 340 may be the same or similar to the monitoring performed in step 320.

The gateway device may determine that network traffic has resumed on the primary interface by various methods. For example, the primary interface may be assumed to have network traffic if a connection can be completed to a server, such as a payment processor. The server may be identified by an IP (internet protocol) address. Testing the primary interface for network traffic can be performed on a periodic basis while the hot backup interface is being used. The gateway device can use a Systech Online Update Protocol (SOUP) update or Light Weight Heartbeat (LWHB) feature to periodically check for SOUP configuration updates. If a permanent change to the designation of the primary/hot backup interfaces is required, the LWHB can also be used.

If the process determines, in step 350, that the gateway device should return to using the primary interface, the gateway device switches, in step 360, the default route to the primary interface; otherwise, the process returns to step 340 to further monitor the primary cellular interface. The route switch in step 360 may be performed similarly to the route switch performed in step 330. Step 330 and step 360 may be performed, for example, using the route switch module 233.

The process of FIG. 3 may be modified, for example, by adding, altering, or reordering steps. Additionally, steps may be performed concurrently. Additional criteria for switching network interfaces may be used. For example, the gateway device may switch interfaces to reduce cost. In an embodiment, in step 350 the process may determine whether to return to using the primary interface based on monitored performance of the backup network rather than the primary network. Additionally, both the primary interface and the backup interface may be monitored concurrently with route switching based, for example, on relative performance of the two interfaces.

In some situations, a gateways device may permit one active cellular data connection per cellular module (e.g., modem). Thus, in these devices it may not be possible to monitor a non-active or otherwise idle (e.g., hot backup or secondary) interface, while maintaining an active interface on a single cellular module. Accordingly, some embodiments herein provide for a plurality of cellular interfaces coupled to a single cellular module, where each cellular interface is assigned to a different cellular service (e.g., voice services, data services, short message service (SMS), multimedia messaging service (MMS), and the like) of different networks. Various operating systems may be configured to permit a first cellular interface to be assigned to a first cellular service (e.g., data services), a second cellular interface to be assigned to a second cellular service (e.g., voice services), and a third cellular interface to be assigned to a third cellular service (e.g., SMS services). One of the cellular interfaces may be operated as the primary interface and one or more of the remaining cellular interfaces may be operated as the backup interface for network monitoring. By allowing the plurality of cellular interfaces to be assigned to different network services, embodiments of the gateway device can monitor the networks (e.g., using quality of service of the other networks to determine availability of backup services) when only one cellular module exists.

Figure 4:
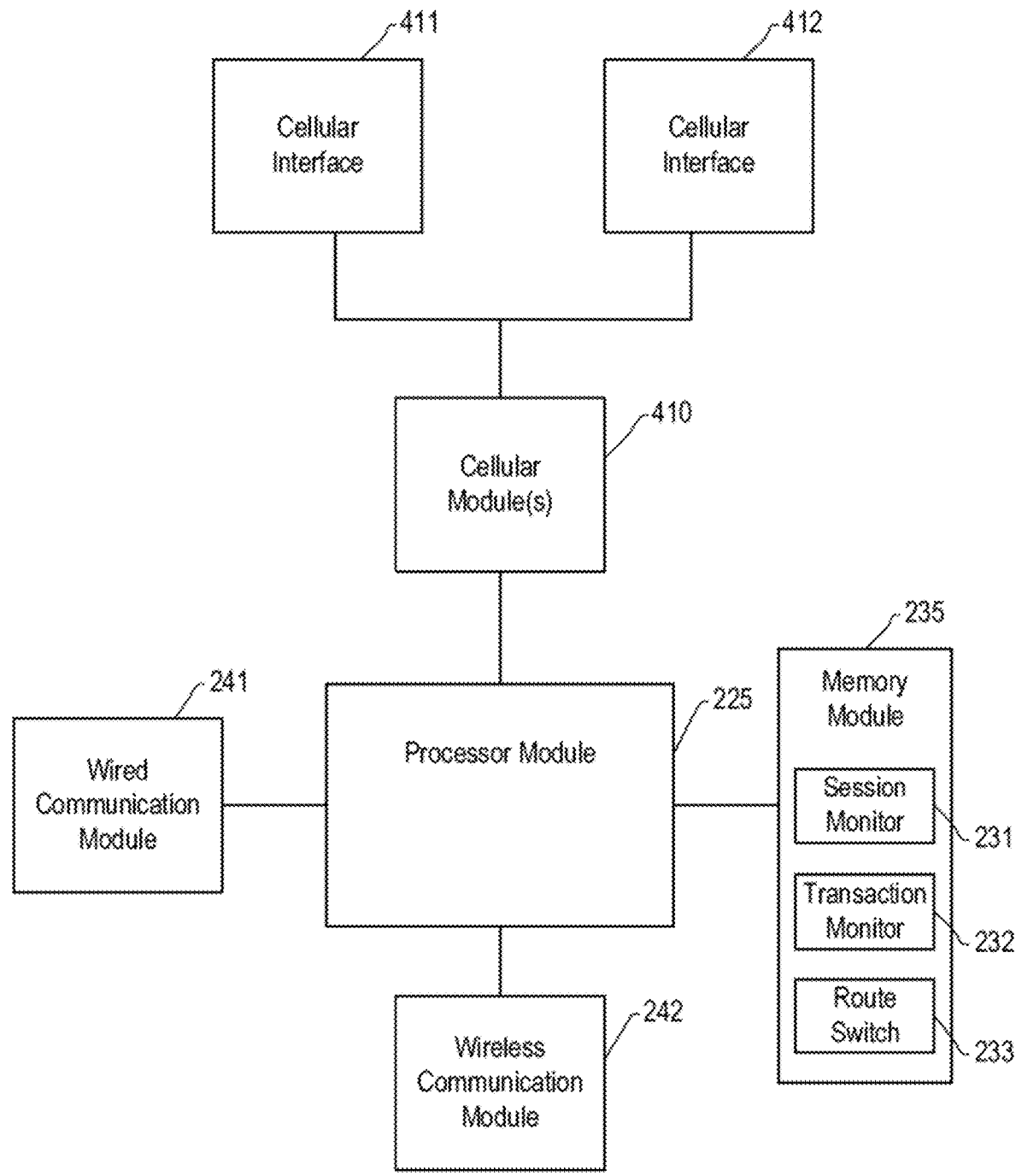
FIG. 4 is a functional block diagram of another gateway device according to a presently disclosed embodiment.
Figure 6A:
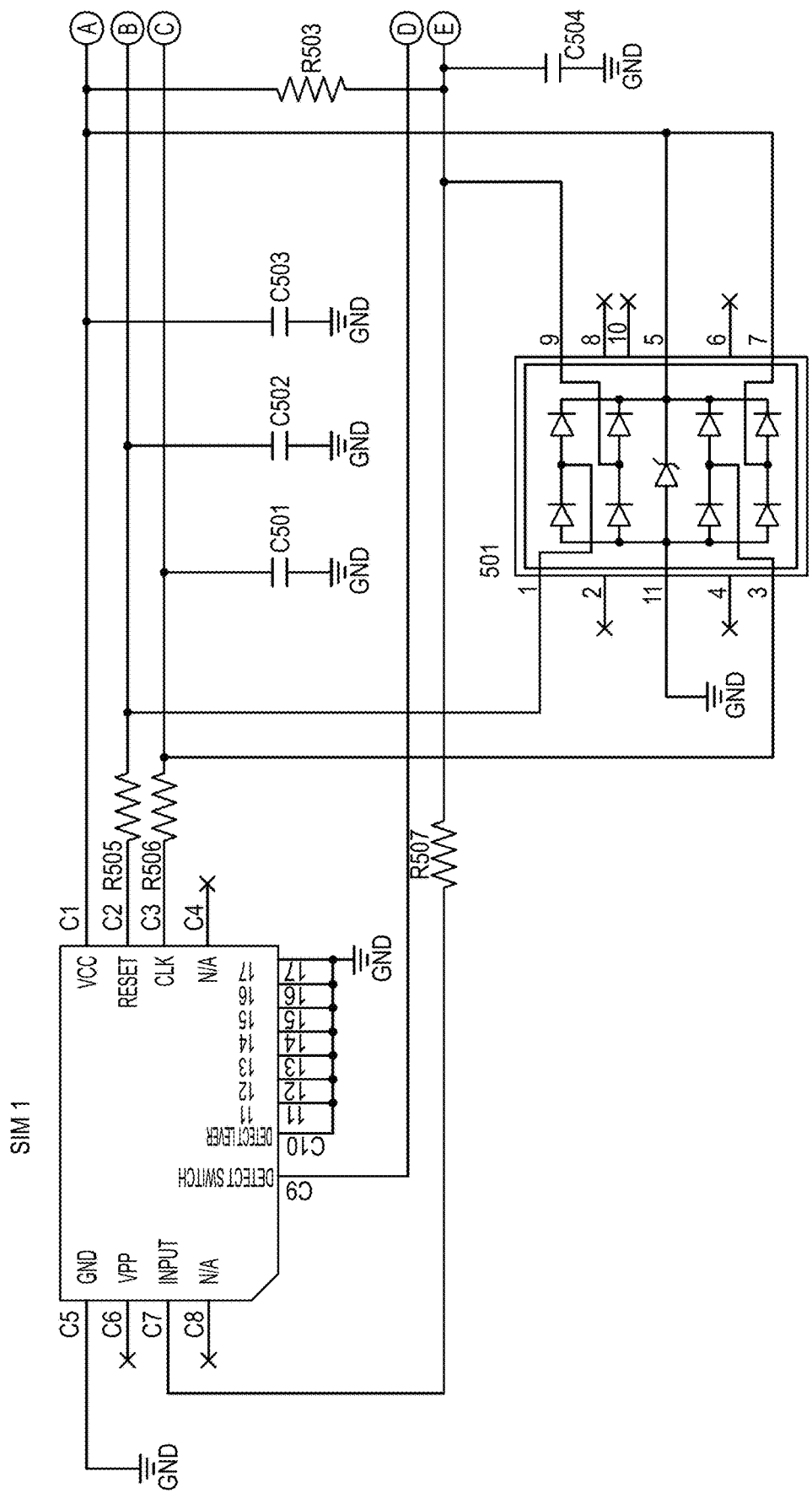
FIGS. 6A-8D are schematic diagrams of example gateway devices according to presently disclosed embodiments.
Figure 6B:
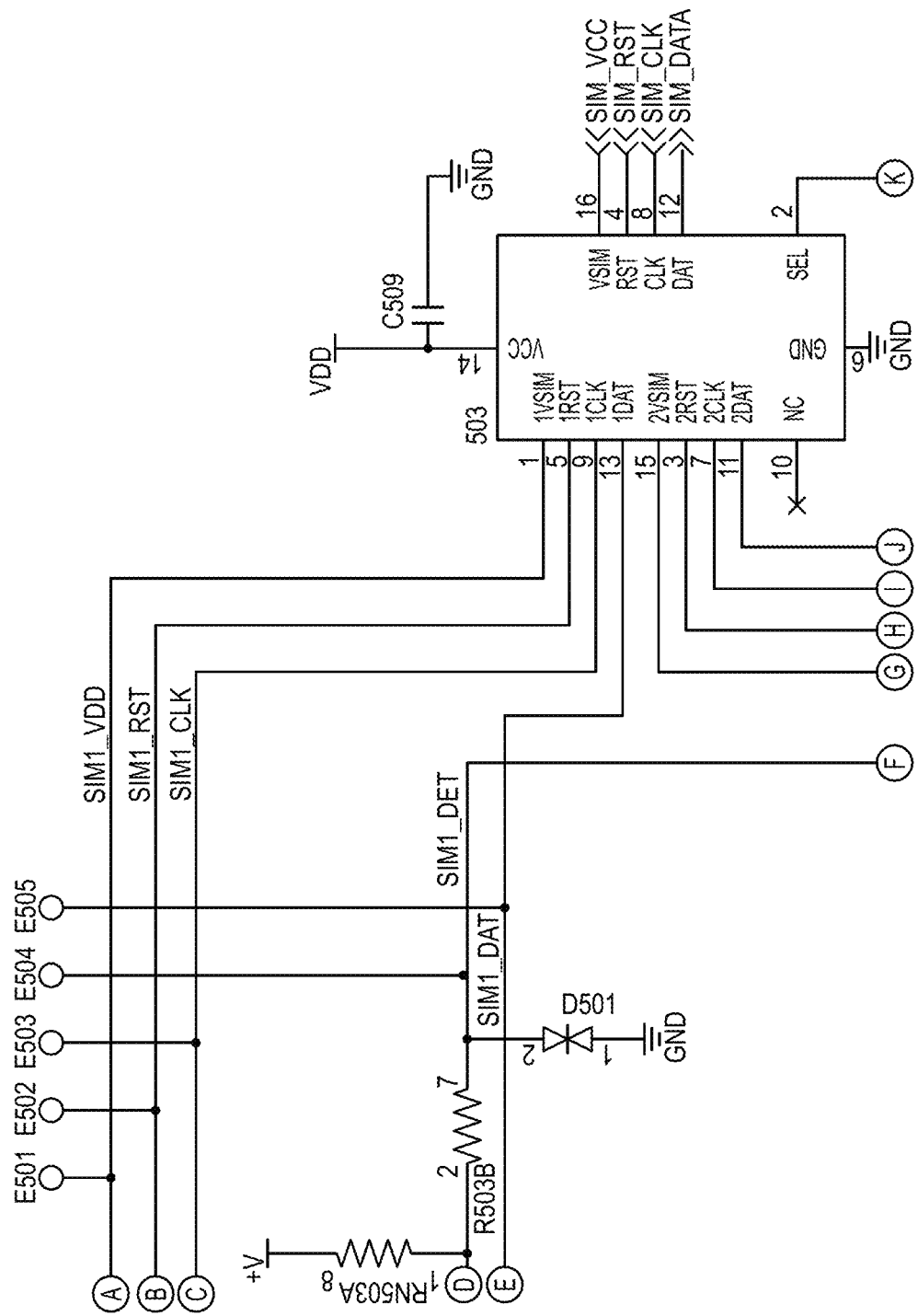
Figure 6C:
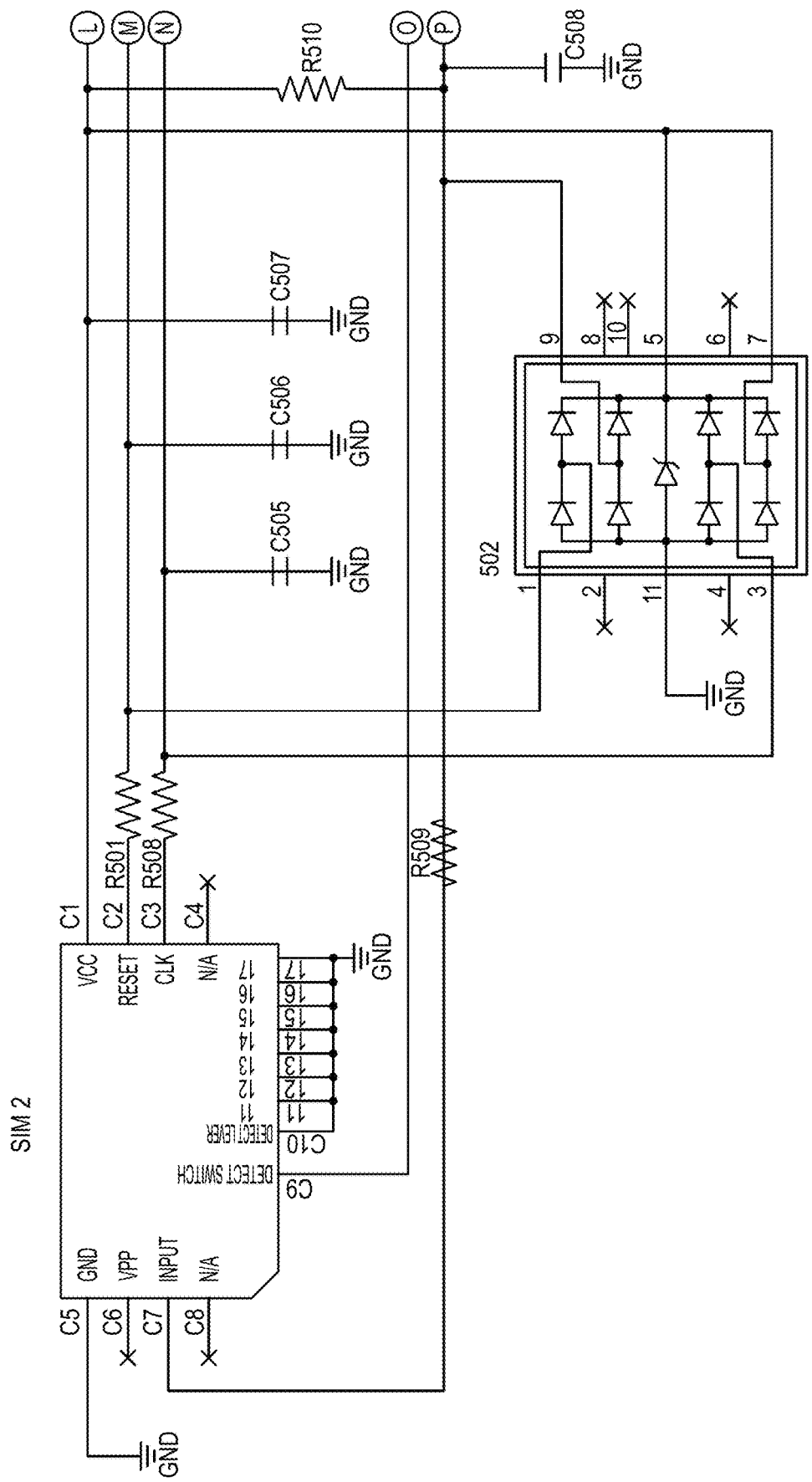
Figure 6D:
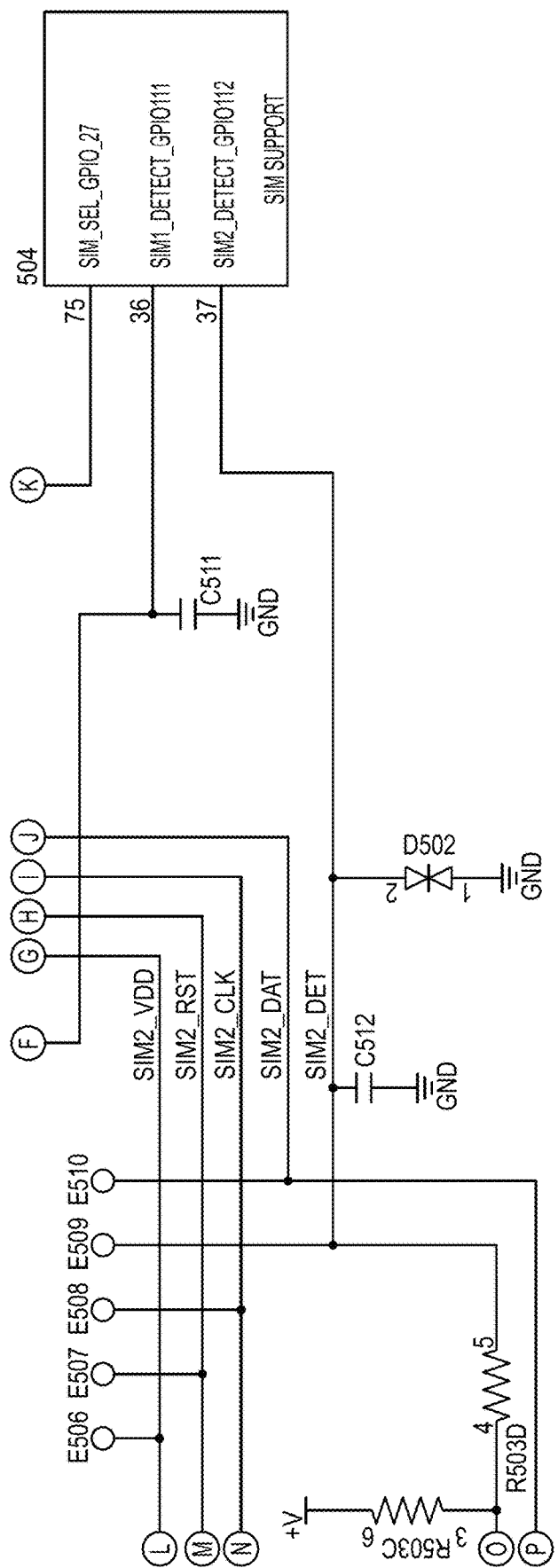
Figure 7A:
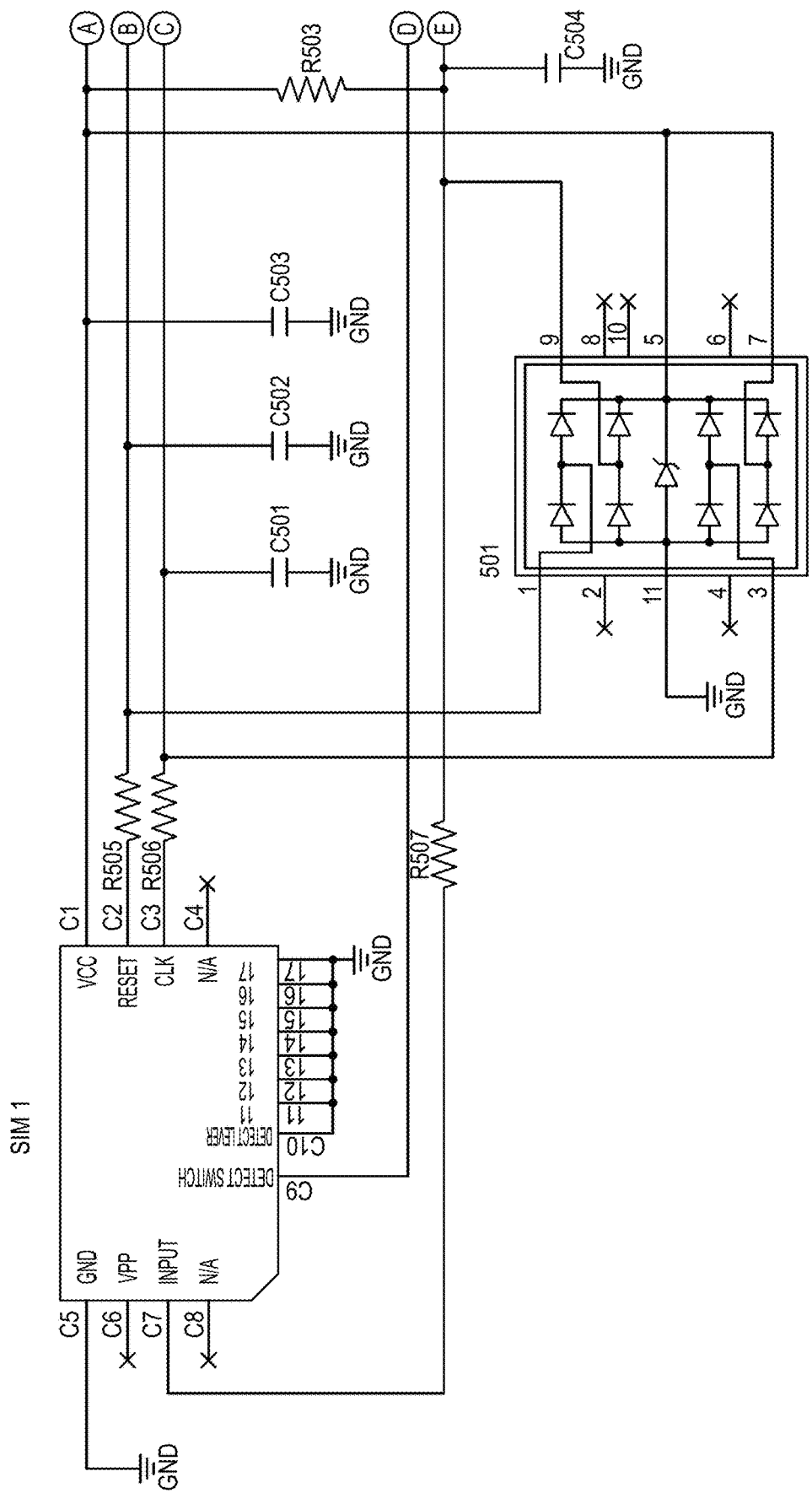
Figure 7B:
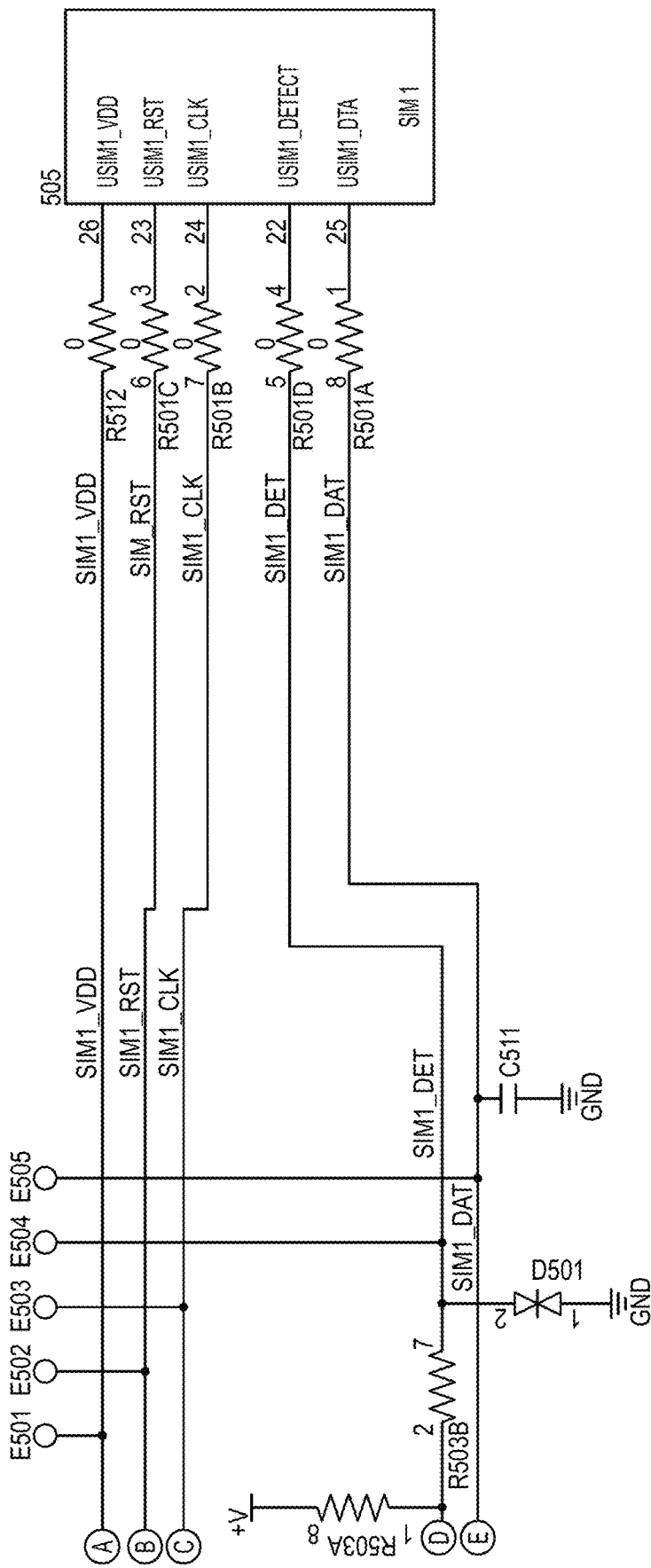
Figure 7C:
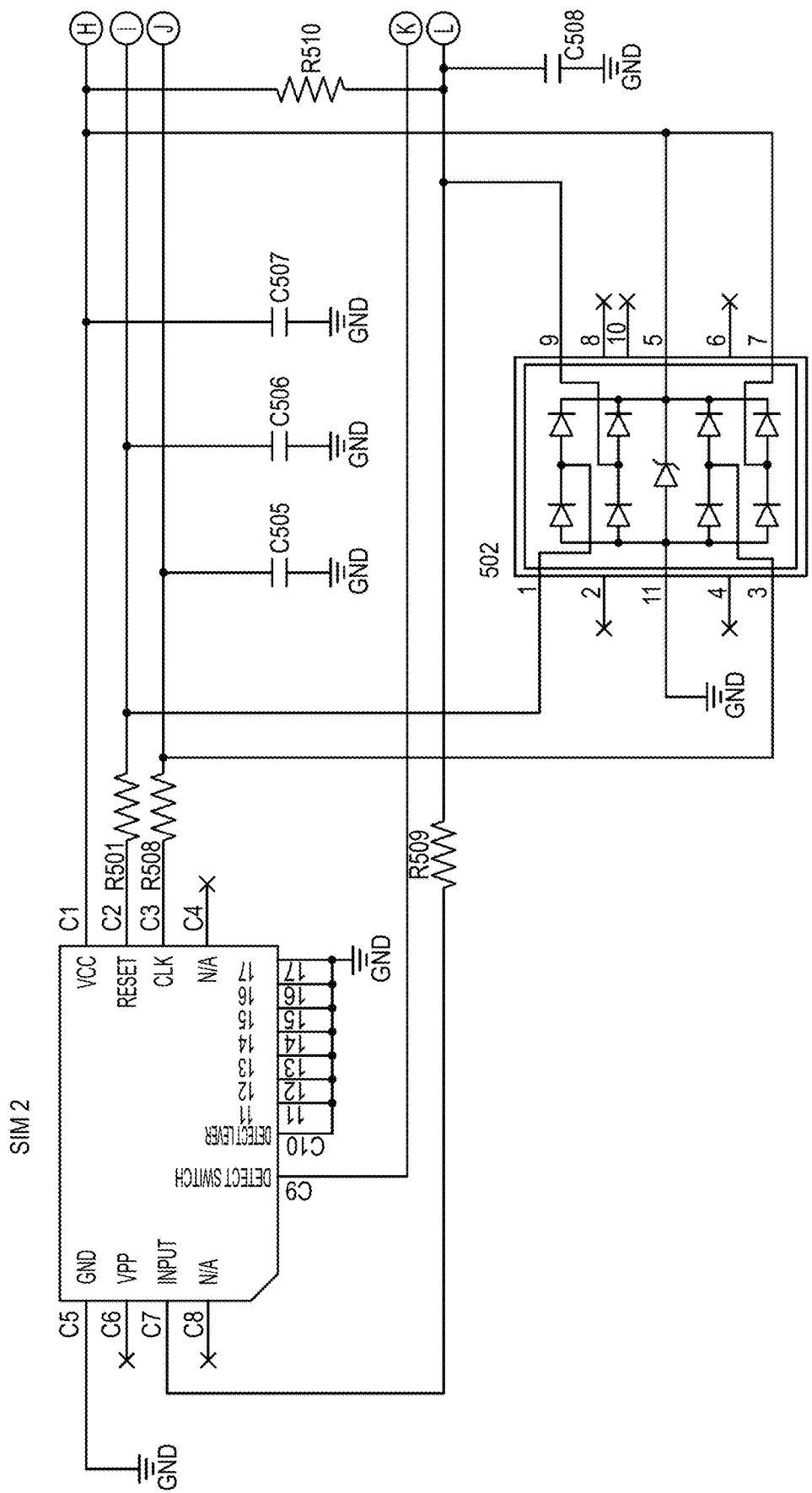
Figure 7D:
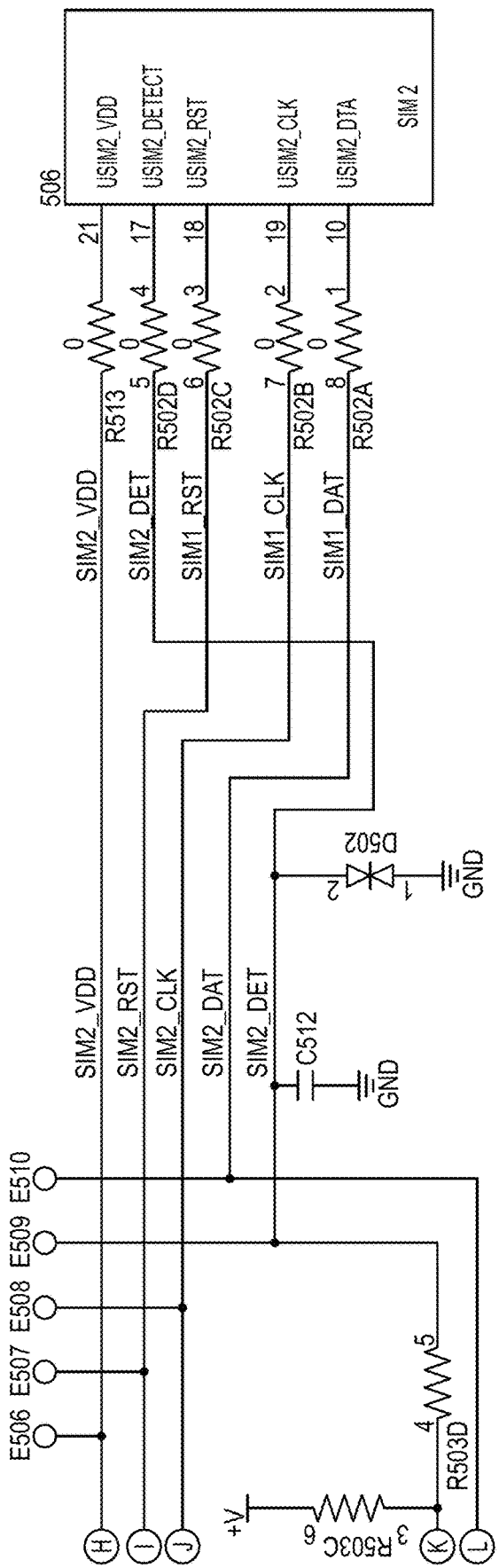
Figure 8A:
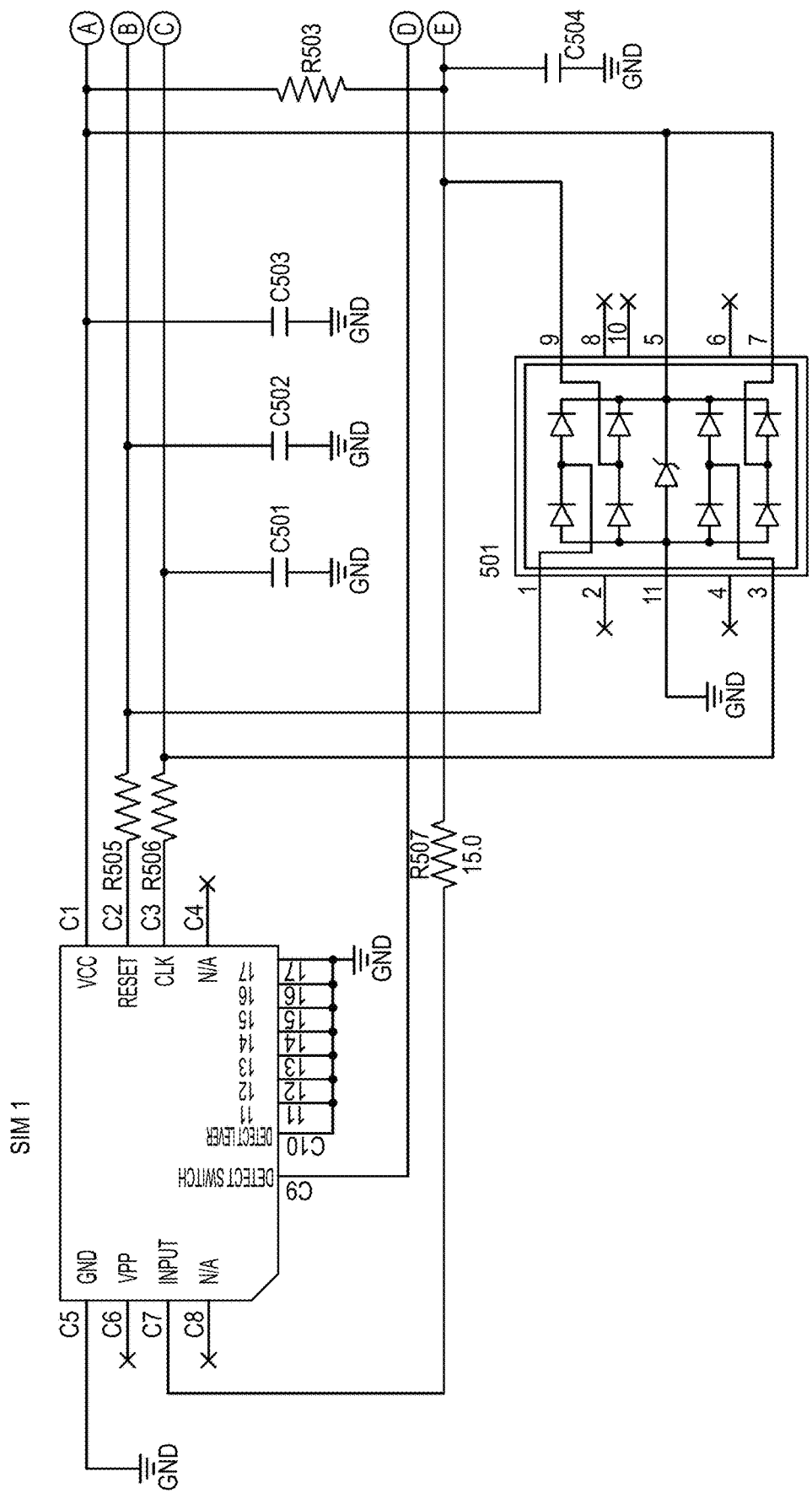
Figure 8B:
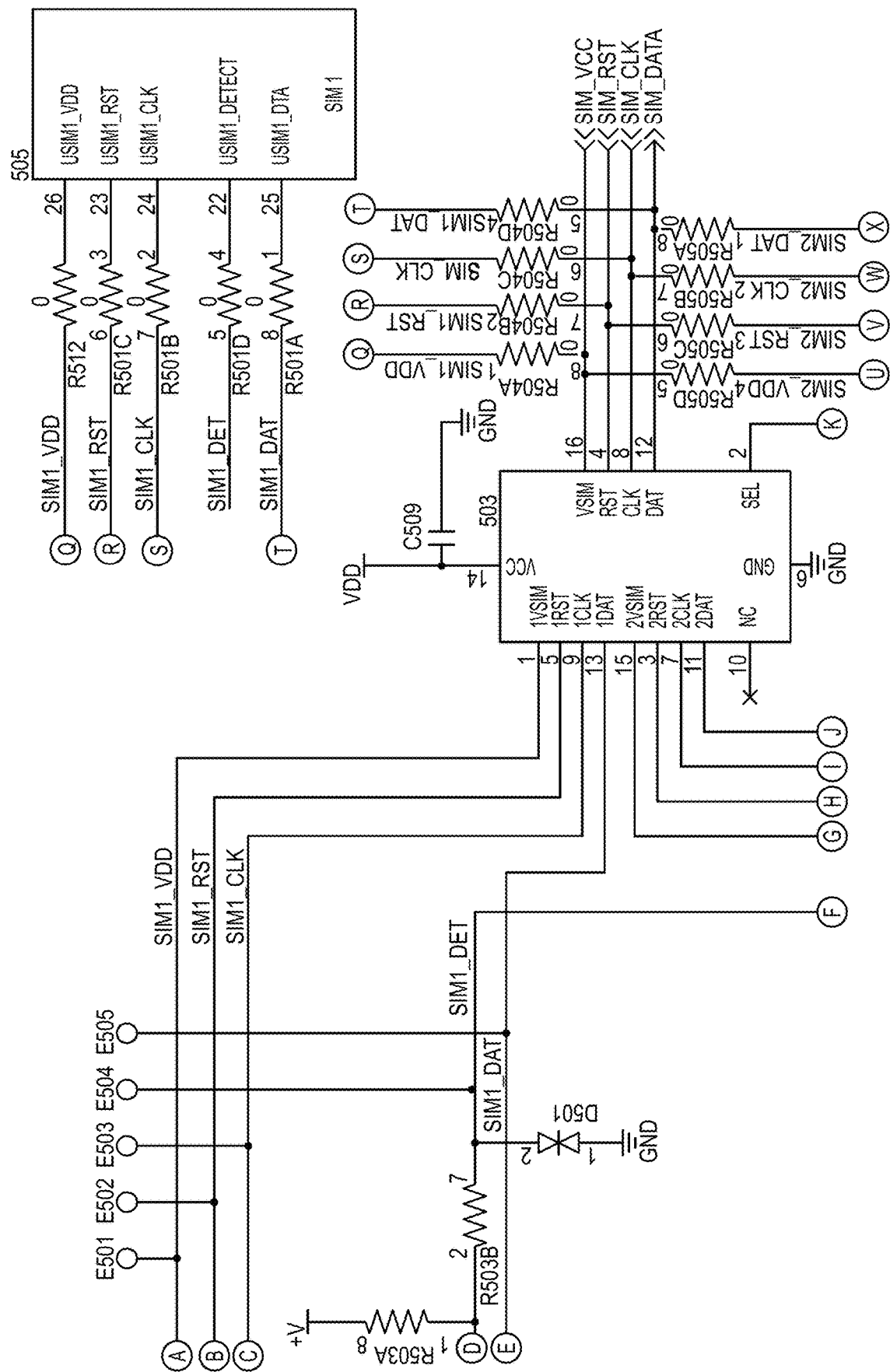
Figure 8C:
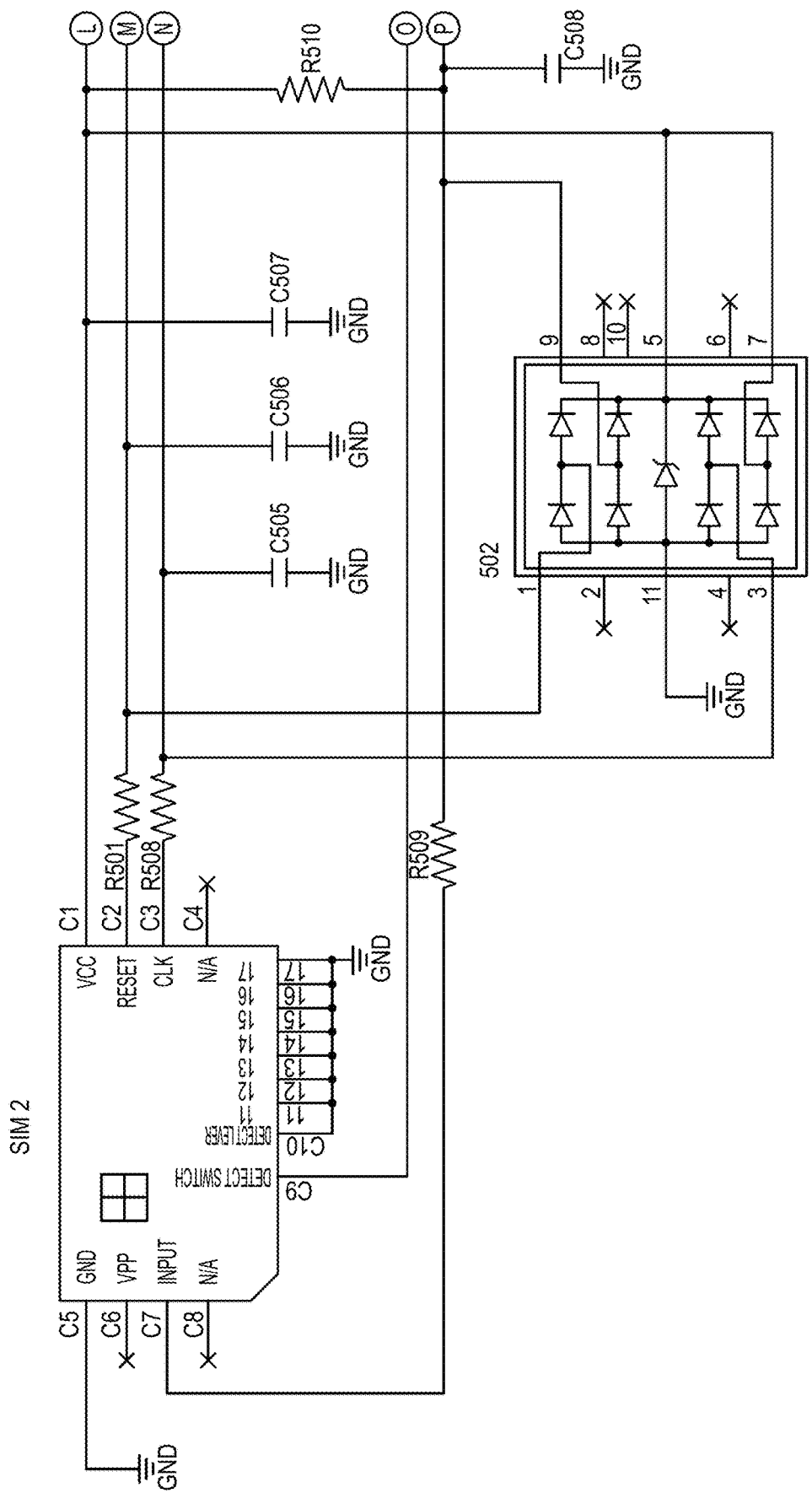
Figure 8D:
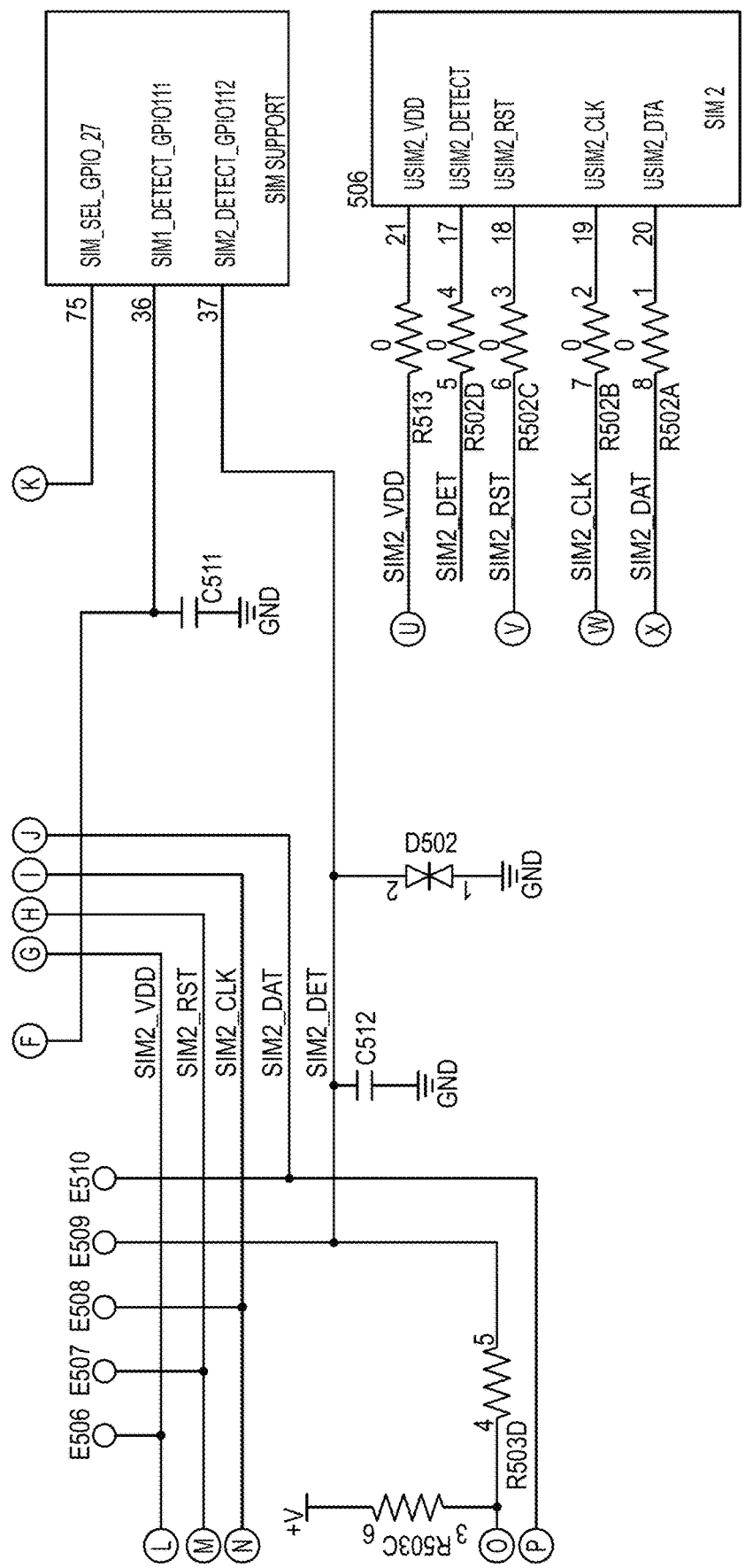

For example, FIG. 4 is a functional block diagram of another gateway device according to a presently disclosed embodiment. The gateway device of FIG. 4 may be substantially similar to the gateway device of FIG. 2, except as provided herein. For example, the gateway device of FIG. 4 includes the processor module 225 which is coupled to the wired communication module 241, the wireless communication module 242, and the memory module 235, each of which are substantially similar to, or the same as, similarly numbered counter parts above.

In the example of FIG. 4, the processor module 225 is coupled to a cellular communication module 410, which may be either of the first cellular communication module 211 or second cellular communication module 212 of FIG. 2. The cellular communication module 410 may be coupled to or otherwise comprise a plurality of cellular interfaces (sometimes referred to herein as network interfaces), for example, a first cellular interface 411 and a second cellular interface 412. However, any number of cellular interfaces maybe utilized as described herein. Furthermore, while one cellular module 410 is illustrated in FIG. 4, any number of cellular modules 410 (e.g., one or more local and/or external modems) and one or more may be included in the gateway devices described herein, for example, as described below in connection with FIGS. 6A-8D.

The cellular module 410 can be configured to transmit and receive communications with cellular networks. For example, the cellular module 410 may communicate with the first cellular network 121 via communication link 131 using the first cellular interface 411. Additionally, the cellular module 410 may communicate with the second cellular network 122 via communication link 132 using the second cellular interface 412. The cellular module 410 may also be referred to as a network communication module and the cellular interfaces 411 and 412 may be referred to as network interfaces. As described above, the network communication module may use communication technologies other than cellular. For example, a network communication module may communicate using DSL, DOCSIS, MMDS, WiMAX, or other technologies. Additionally, a network communication module may use a local network connection (e.g., an Ethernet connection) to another device that then communicates with an Internet service provider, wide area network, or some other network. The cellular interfaces may use different underlying technologies, such as PPP, LTE, CDMA, and EVDO. In an example implementation, the first cellular interface 411 and the second cellular interface 412 may be SIM cards used to identify and authenticate the gateway device to the cellular networks. The gateway device may, accordingly, have two or more SIM card slots. In an example embodiment, the cellular module 410 may be a modem or other communication technologies for connecting to the Internet and the cellular interfaces 411 and/or 412 may be SIM cards.

As with the gateway device of FIG. 2, the gateway device of FIG. 4 may perform operations to enhance reliability of communications with the devices connected to the gateway device. For example, the gateway device can monitor and analyze the reliability of communications with the first wireless network 121 and the second wireless network 122 and switch between them accordingly.

As described above, the gateway device can operate one of the network interfaces as a primary interface with one network while the other network interface is operated as a hot backup (or "secondary") interface to a second network. The two network interfaces may, for example, connect to different cellular service providers.

In various embodiments, the use of two cellular interfaces 411, 412 can greatly improve the availability of communication services. That is, the gateway device may determine that communication on one of the networks is unavailable or unreliable and switch to using the other network via the other interface. Usage of the two cellular interfaces may also be based on other criteria, for example, cost of the corresponding cellular data plans.

In some embodiments, the process of FIG. 3 may be performed by the gateway device of FIG. 4 (e.g., by the processor 225) in a manner substantially the same as that described above with reference to FIG. 2. The gateway device can have two or more network interfaces active simultaneously, for example by operating each network interface 411 and 412 on different cellular services. Although both network interfaces are active, only one network interface is ordinarily used for network traffic and the other network interface is idle. Alternatively, the gateway device may operate with only the network interface used for routing communications active. Whether the network interface that is not used for routing communications is active or passive (as described above in connection to FIG. 3) may be configured by a user. Furthermore, which network service is used as primary and which is used as secondary may be configured by the user. By having two cellular interfaces connected, the gateway device can switch between the interfaces with little delay. For example, embodiments herein may capable of performing the switch in a matter of seconds, whereas conventional systems require minutes to switch communications. Thus, embodiments herein are can switch between interfaces in equal to or less than one minute, and in some embodiments in less than or equal to 10 seconds, and in other embodiments between one and 10 seconds.

In the system of FIG. 4, for example, the gateway device may be operating with communication link 131 to the first cellular network 121 using the first cellular interface 411 assigned to data service over the first network as the primary interface, and communication link 132 to the second cellular network 122 using the second cellular interface 412 assigned to a different network service of the second network as the backup interface. For example, the processor 225 may be configured to assign the first cellular interface 411 to the first network service and assign the second cellular interface 412 to the second network interface. The default route may be through the primary interface. Alternatively, the default route may use the last interface that was actively used for network traffic. Accordingly, the process illustrated in FIG. 3 may be executed in a manner substantially the same as that described above for the gateway device of FIG. 4. By configuring the plurality of cellular interfaces to be assigned to different network services on different networks, the gateway device can monitor performance (e.g., quality of service (QOS), as described below) of the connected networks via the primary and secondary interfaces and determine availability of network connectivity during network interruptions, even when only a single cellular module is available.

For example, in step 310, the gateway device 110 monitors the primary cellular interface. For example, periodically the gateway device 110 may assign cellular interface 411 as the primary interface and used a first network service to be sure network traffic is still occurring. In the following example, the first network service is a data services; however, it will be appreciated that any network service may be assigned to the first cellular interface 411.

If the process determines, in step 320, that the gateway device should stop using the primary interface 411, the gateway device then switches, in step 330, the default route to the hot backup interface 412; otherwise, the process returns to step 310 to further monitor the primary cellular interface 411. The hot backup interface 412 may be assigned to a second network service. In some embodiments, the second network service may be used to route communications with the second network. In another embodiment, the gateway device 110 (e.g., the processor 225) may change or reassign the hot backup interface 412 to another network service for routing communications to the second network, for example, change the network service from SMS to data services or the like. Similarly, the gateway device 110 (e.g., the processor 225) may change or reassign the primary interface 411 to another network service for monitoring, for example, change the network service from data to voice services, SMS, or the like.

In some embodiments, the determination at step 320 may also be based on performance demands due to content of the communications. For example, as described above, different streams of data may be directed to different cellular interfaces such that high bandwidth consuming content (e.g., video streams) can be directed to use a cellular interface capable of high speed or highly available connection, while lower demanding content (e.g., internet of things transactions) can be directed to a slower or less available connection. For example, the first cellular network 121 may be over relatively slower communications speeds and/or be less available (e.g., heavy traffic, etc.) via communication link 131 using, while the second cellular network 122 may offer faster communication speeds and/or higher availability. For a given communication, if the communication includes high performance demands (e.g., video streams), then at step 320 the gateway device may determine to switch to the second cellular interface 412 from the first cellular interface 411 or remain on the second cellular interface 412 if already using second cellular interface 412. Additionally, if the communication includes lower performance demands (e.g., IoT transactions), then at step 320 the gateway device may determine to switch to the first cellular interface 411 from the second cellular interface 412 or remain on the first cellular interface 411 if already using first cellular interface 411.

As described above, after switching (e.g., by the processor 225) to the hot backup interface 412 in step 330, the gateway device monitors, in step 340, the primary interface 411 to determine, step 350, whether the gateway device should return to using the primary interface 411. The process may determine that that the gateway device should return to using the primary interface 411 when network traffic resumes on that interface.

If the process determines, in step 350, that the gateway device should return to using the primary interface 411, the gateway device switches, in step 360, the default route to the primary interface 411; otherwise, the process returns to step 340 to further monitor the primary cellular interface 411. The route switch in step 360 may be performed similarly to the route switch performed in step 330. Step 330 and step 360 may be performed, for example, using the route switch module 233. In some embodiments, the gateway device may route communications to the first network using the same network services used for the monitoring of the network. In another embodiment, the gateway device 110 may change or reassign the primary interface 411 to another network service for routing communications to the first network, for example, change the network service back to data services from voice services, SMS, or the like. Similarly, the gateway device 110 may change or reassign the hot backup interface 411 to another network service for monitoring, for example, change the network service from data to back to voice services, SMS, or the like.

The gateway device can provide usage logging to show when each interface is in use. The logging may include, for example, the absolute time of switch and accumulated times on each interface. Some of the logging information may be kept local to the gateway device and other logging information may be transmitted to a server. For example, the absolute time may only be available in the local log for use in troubleshooting.

The designation of which interface is the primary interface and which interface is the hot backup interface can be done, for example, through a gateway device configuration file. SOUP update or LWHB can be configured to periodically test for updates to the configuration file, including designation of the primary interface. The configuration file may also be able to change one or more parameters of the monitors. Information about the configuration and usage of the interfaces may also be logged.

As noted above in connection with FIG. 4, embodiments herein provide additional technology and capability to gateway devices in regards of failover for cellular communications for at least two subscriber networks. It should be understood that multiple subscriber networks may exist such that one or more are on the same network or carrier however, each subscriber network may be required to have a separate and distinct account for billing purposes depending on the carrier rules. Embodiments herein provide communications across the multiple networks through the various embodiments of gateway devices described here.

While the generalized failover technology may be described, for example, in U.S. patent application Ser. No. 16/257,548 and related applications as noted in the "Related Applications Information" section above, the multiple subscriber networks could be considered as another network. However, when combined with single SIM or multiple SIMs, the subscriber network interface contains unique qualities and requirements to maintain communication failover between multiple subscribers.

In various embodiments, a SIM may represent a subscriber network, such that the term dual or multiple SIMs may represent the presence of more than one subscriber network.

With the results of Moore's law, more technology is being reduced in power requirements, physical space requirements and fixed functions to a more complex, power managed, and programmable capability. The results allow multiple subscriber network hardware to be controlled by internal firmware, middleware, operating systems, and network applications. Within the internet of things (IoT) market, an example concern is less cost with on demand availability. The embodiments presented herein provide opportunity for customizing operations to maximize efficiency in terms of availability, cost routing, quality of service, and redundancy along with tandem operations where needed.

For example, the embodiments herein may revolve around User scenarios or User stories that related to required functionality for the system which consist of all hardware, networks, and applications independently or combined local and/or remote operations. Remote operations may be executed at cloud-based servers communicatively coupled to cloud-based storage devices storing a remote application.

The generalized scenario may consist of a gateway configured with at least one modem and at least two SIMs. The physical SIM Card may contain more than one logical SIM; however, embodiments herein are not differentiating between logical and physical SIMs, only one subscriber network versus another. As described above in connection to FIG. 4, one subscriber network can be selected as primary network (e.g., through designation of a primary interface for routing communications with the corresponding network) while others can be designated as secondary network (e.g., routing communications via a designated secondary network) and may be additionally designated with priorities between the remaining networks. As used herein, primary network and secondary (or failover) network may refer to selecting a network as primary and secondary, thereby also designating corresponding interfaces for communicating with the so designated network as a primary interface or secondary interface.

The primary network may carry communication traffic as long as it is available (e.g., Yes at block 320 of FIG. 3). Availability of the primary network may be conditional (for example at block 320) on the QoS and the availability of a secondary network. Parameters or TERMS may be defined that sets the order of priority of operation between networks based on real-time QoS, time-of-day, day-of-week, seasonal, and other key operational parameters that affect the desired networking system.

Some key parameters may be provided by the generalized network link performance rather than the QoS of a specific gateway over a specific subscriber communication link. For example, in cloud based implementations of the embodiments herein, link performance on multiple subscriber networks across regional or other larger area operations may be monitored remotely by monitoring systems (e.g., cloud-based applications) and QoS predictions may be made of a desired subscriber network for a specific gateway or group of gateways. The predictions (which could be real-time) can be communicated to the desired gateways as a parameter for selection of the subscriber network which becomes a TERM in the logic for primary and failover (e.g., secondary or hot back-up) subscriber network selections. Note that the "communication to a gateway of these predications" and subscriber network selection TERMS may be over a normal data communication linkage or alternative path such as SMS. It is assumed that any security necessary for protection of data and network selections would be handled as common and best practice.

Other example key parameters within the QOS TERMS are gathered from the subscriber network in real-time. As an example, the following table shows LTE QOS parameters that can be monitored, compared to different Subscriber networks to create TERMS for the logic in selection of the Subscriber network to use for the current traffic/link. For example, as shown in FIG. 5, where the signal strength is based on the Reference Signal Received Power (RSRP), the Signal Quality is based on the Reference Signal Received Quality (RSRQ); and the throughput is based on the Signal to Interference-plus-Noise Ratio (SINR).

Additional TERMS can be placed into the logic such as, but not limited to:
  length of time to maintain a link for a specific subscriber network,
  length of time to wait before analyzing QoS parameter,
  amount of transactions over a specific time period (or even real-time for current period), and
  priority of parameters within QoS such that switching or maintaining a subscriber network is considered within the TERMS logic.

Within the scenarios presented as examples, key interaction of hardware and/or software (be it firmware/middleware/operating systems/local or cloud-based servers) may be required within with gateway to provide the selection of the network link based on the SIM information selected from the Multiple SIMs available to the TERMS logic.

Presented below in FIGS. 6A-8D are various schematic examples of hardware configurations of the gateway device described herein. These example gateway devices may be capable of multiple subscriber network selections with failover subscriber network based on a local system selection, a user designation, remote cloud-based selection or combinations of information and TERMS logic.

Example Case 1: One modem with multiple SIMs (e.g., at least one SIM Card with at least two Subscriber Network accounts or at least two SIM Cards with at least one Subscriber Network account on each) providing information necessary to provide a communication link. This example case is illustrated above in FIG. 4, where each cellular interface 411 and 412 may be one of the multiple SIMs and a single cellular module 410 is used as the one modem.

Example Case 2: At least two modems with multiple SIMs (e.g., at least one SIM Card with at least two Subscriber Network accounts or at least two SIM Cards with at least one Subscriber Network account on each) providing information necessary to provide a communication link. This example case is illustrated above in FIG. 4, where each cellular interface 411 and 412 may be one of the multiple SIMs, both of which may be coupled to individual modems (shown collectively in FIG. 4 as cellular modules 410).

Example Case 3: Two modems with one SIM, such that the SIM contains at least one Subscriber network and corresponding account information. The account information may be valid for different modem technologies. An example of this would be a universal (e.g., Virgin Mobile®) SIM containing a worldwide Subscriber network account that was valid across multiple modem technologies such as CAT6, CAT4, CAT1, CATM, CATMI, NBIOT, etc. The two modems would need to be a valid technology supported by the SIM such that a communication link is established with each modem based on TERMS logic. This example case is illustrated above in FIG. 4, where each cellular interface 411 and 412 may be one of the multiple SIMs, where each cellular interface is coupled to a different modem (shown collectively as cellular modules 410).

Example Case 4: Other combinations of modems and SIM Cards (e.g., Subscriber Networks) will become apparent to one skilled in the art.

With any of the aforementioned cases (e.g., Example cases 1-4 and that of FIG. 4), several operational scenarios may be part of the TERMS logic for selection of the active Subscriber Network:
  If the modem (or modems) can be configured to support at least two data connections at the same time then providing real-time information for QoS TERMS may be available even such that pinging operations can be performed providing transaction analysis for each Subscriber network capable of the simultaneous data connection.
  If the modem (or modems) can be configured to support at least one data connection and, at the same time, providing an alternative communication link such as SMS, then providing real-time information for QoS TERMS may be available such that pinging operations can be performed providing transaction analysis for each Subscriber network capable of the data connection and transaction operations on the alternative linkage such as SMS. Even without the actual SMS transactions, for example, QoS information such as signal strength may aid in the TERMS logic for failover analysis. Even if only a voice channel is available on a communication link, the QoS parameters can be weighed within the TERMS logic for failover analysis.
  In many embodiments, not all modems will allow for multiple Subscriber Networks to be connected simultaneously, even though it may be only a data connection with SMS or SMS/Voice or only Voice from another Subscriber Network. For modems that support multiple Subscriber networks, some may support more than one data connection simultaneously with another Subscriber network while others require only one data connection per Subscriber network and any other Subscriber network connection to be an SMS or Voice or SMS/Voice connection.

As noted above, the embodiments herein present the configuration of the gateway device has having one physical modem and dual SIM cards or two physical modems and dual SIM Cards, as outlined above. The dual SIM cards may contain Subscriber Network account information such that when the communication link is established, the modem which is assigned to that connection (data, SMS, voice or combination) performs the task assigned as primary or failover connection per TERMS logic. The Subscriber Network account information may be accessed from the selected SIM card real-time or at predetermined sample periods according the to TERMS logic. The TERMS logic may select a different SIM card real-time or at a predetermined sample period for the modem or modems based on operational parameters set within the TERMS logic by the User. The embodiments herein thus provide an ability for the gateway device to have an integrated modem and an external modem. The integrated modem may be within the same SOM (System On a Module) package, while the external modem is packaged on an mPCIe Card interfacing across the mini PCIe bus interface, as describes below and in FIGS. 18 and 19.

FIGS. 6A-6D are various parts of a schematic diagram of another gateway device according to a presently disclosed embodiment. The example gateway device of FIGS. 6A-6D illustrates a dual SIM represented by SIM1 and SIM2 to the mPCIe interface 503/504 for the external modem. The gateway device includes a plurality of resistors R501-R510, capacitors C501-C511, and diodes D501-D502. Pins of SIM1 and/or SIM2 are electrically coupled to pins of the mPCIe interface as illustrated. The gateway device of FIG. 6 may be substantially similar to the gateway device of FIG. 4, except as provided herein. For example, the cellular interfaces 411 and 412 may be implemented as one of SIM1 and SIM2 and the cellular module 410 may be implemented as the external modem.

In the example gateway of FIGS. 6A-6D, TERMS logic determines the active data connection Subscriber network by selecting either SIM1 or SIM2 and determines the failover data connection Subscriber network by selecting either SIM1 or SIM2. If the failover data connection Subscriber network is not available, the SMS and/or SMS/Voice connection is established for QoS TERMS if available. If neither failover subscriber connection is available, the TERMS logic will establish the monitoring period to sample the failover for availability.

FIGS. 7A-7D are various parts of a schematic diagram of another gateway device according to a presently disclosed embodiment. The example gateway device of FIGS. 7A-7D illustrates a dual SIM represented by SIM1 and SIM2 to the SOM interface 505/506 for the internal modem, which may be provided as an single interface or multiple interfaces. Similar references numbers from the gateway device of FIGS. 6A-6D are used for FIGS. 7A-7D to illustrate similar components. The gateway device of FIGS. 7A-7D may be substantially similar to the gateway device of FIG. 4, except as provided herein. For example, the cellular interfaces 411 and 412 may be implemented as one of SIM1 and SIM2 and the cellular module 410 may be implemented as the internal modem.

In the example gateway of FIGS. 7A-7D, TERMS logic determines the active data connection Subscriber network by selecting either SIM1 or SIM2 and determines the failover data connection Subscriber network by selecting either SIM1 or SIM2. If the failover data connection Subscriber network is not available, the SMS and/or SMS/Voice connection is established for QoS TERMS.

FIGS. 8A-8D are various parts of a schematic diagram of another gateway device according to a presently disclosed embodiment. The example gateway device of FIGS. 8A-8D provides dual SIM represented by SIM1 and SIM2 to the SOM interface for the internal modem and the mPCIe interface for the external modem. Similar references numbers from the gateway device of FIGS. 6A-7D are used for FIGS. 8A-8D to illustrate similar components. The gateway device of FIGS. 8A-8D may be substantially similar to the gateway device of FIG. 4, except as provided herein. For example, the cellular interfaces 411 and 412 may be implemented as one of SIM1 and SIM2 and the internal modem and external modems may be represented by cellular modules 410.

In the example gateway of FIGS. 8A-8D, TERMS logic determines the active data connection Subscriber network by selecting either SIM1 or SIM2 and routing it to the correct modem (internal or external) and determines the failover data connection Subscriber network by selecting either SIM1 or SIM2 and routing it to the other modem. If the failover data connection Subscriber network is not available, the SMS and/or SMS/Voice connection is established for QoS TERMS if available. If neither failover subscriber connection is available, the TERMS logic will establish the monitoring period to sample the failover for availability.

As used throughout the present disclosure, TERMS may refer to the combined logic of software and hardware such that the correct operation of selecting and maintaining the Subscriber Network connection link based on a primary and alternative connection selected by default or the User. Basic selection logic on QoS can be established by the state of the following for each Subscriber Network, for example, as shown in FIG. 5.

These in combination with either default or User selections may determine when and which Subscriber Network will be activated and maintained as the connection linkage. For example, some User or default parameters might be considered (actual data points vary with system performance desired). The example hard coded numbers illustratively provided herein can be user definable and set with a default within a configuration file as underlined in the examples. In one example, if the active connection meets criterial parameter:

Switch Evaluation Period—example 10 seconds to 15 minute interval; and
Switch Evaluation Active-SINR below 7: RSRQ below-11 dB: RSRP below-100 dBm
And Failover connection meets criterial parameters:
Failover Active-SINR>SINR(active)+2: RSRQ>RSRQ (active)+2: RSRP<RSRP(active)−10
Maximum period on failover network—example 2 minutes to 2 hours Then the above TERMS resolve to TRUE, and the Failover (e.g., the secondary) communication link becomes Primary communication link and Primary becomes Failover communication link. Failover communication link TERMS logic in effect for duration of Failover period.

The maximum period on failover network provides for a forced evaluation of the best network to be designated as active Subscriber network after operation independent of the QoS of the active network. By adding the reporting of these values to the cloud-based application, the monitoring systems can use this information for predictive performance of the Subscriber networks within a group of gateways or region of locality as desired. The application my use this information to override or augment the TERMS in any local gateway selecting the active Subscriber network.

In an example implementation, one modem is installed and the User (or by default configuration) may select SIM 1 as the primary Subscriber Network, from the selection SIMs installed on the gateway device (e.g., SIM1 and SIM2 in the example embodiments of FIGS. 6A-8D). A primary modem may be designated as "CAT4" from the selections of modems installed and a failover Modem may be designated "CAT4" from the selection of modems installed (in this example, only CAT4 is installed). In this example, if the TERMS resolve to TRUE the communication path would be designated as route SIM1 to the CAT4 and route SIM2 as failover to failover modem CAT4. As noted previously, in this example only CAT4 is installed so it will use both SIMs, one as primary and one as failover.

In another example implementation, two modems may be installed and the User (or by default configuration) may select SIM 1 as the primary Subscriber Network, from the selection SIMs installed on the gateway device (e.g., SIM1 and SIM2 in the example embodiments of FIGS. 6A-8D)

and CAT4 as the primary modem from the selections of modems installed (e.g., CAT4, CAT1, and CATM in this example). The failover modem may be selected as CATM. In this example, if the TERMS resolve to TRUE the communication path would be designated as route SIM1 to the CAT4 modem using SIM1 and route SIM2 as failover to failover modem CATM (e.g., since CATM is installed it will use SIM2 as failover).

The embodiments herein may be configured to use the TERMS for advanced analysis and prediction. That is, TERMS logic can be performed locally with local information gathered from the operational state of the gateway device and communication linkage. It can also be directed from a remote cloud-based application (usually a cloud application or IT application resident on a Private Network Server).

The gateway devices herein can use subsets of information for a TERMS logic evaluated as QoS for switching between the primary and failover states of operation opposed to using an entire data set of information. An example of which would be a TERMS logic that used only the SINR for throughput as the master decision parameter. This value can be obtained and maintained in a Journal or log if necessary both locally and remotely. As throughput declines and data indicates, ether from local settings or remotely gathered information, that predicted usage will require increased throughput, a local TERMS logic or remote logic can select the Subscriber network to change to the appropriate communication link. Other QoS attributes can be used and other logic combinations can be easily seen by one skilled in the art that may be applicable as master decision parameters. As another example of such logic, SINR from multiple gateway devices may be collected (e.g., by a cloud-based application) that are using collectively multiple Subscriber networks. The SINR of each gateway combined with others gives the remote application predictive ability of available throughput (e.g., some use the "bandwidth" attribute) and can evaluate that with default settings or User settings bandwidth requirements across parameters such as peak usage hours (time of day, time of week, etc.). Information may be communicated to the gateway that will instruct a TERMS logic to select the desired Subscriber network or desired modem based on this attributes value. As another example, two master decision parameters may be used and how they are different based on technology (e.g., modem capability).

Figure 9:
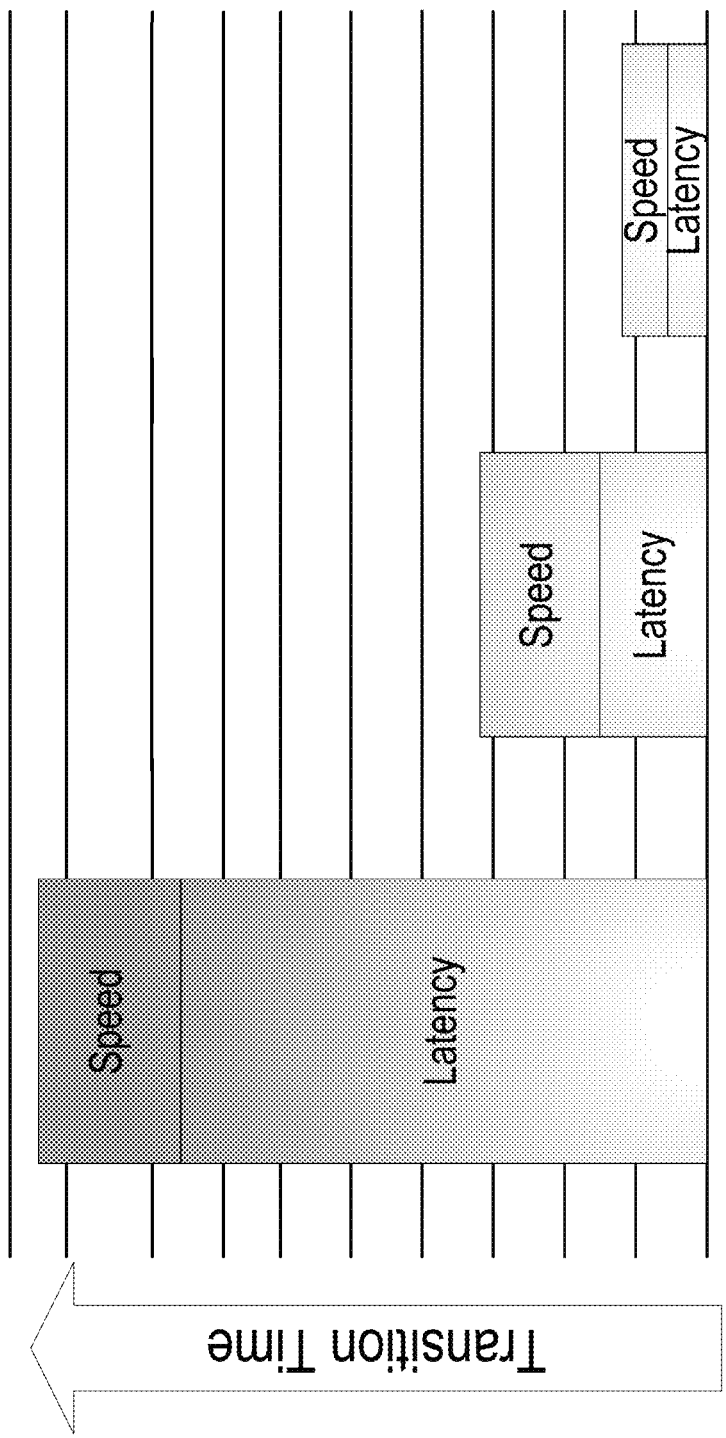
FIG. 9 illustrates a graphical representation of relative performance of different modem technology based on "transaction time"

FIG. 9 illustrates a graphical representation of relative performance of different modem technology based on "transaction time". Transaction time can be a product of throughput (SINR), speed of communications, latency and affected by the technology of the modem. The examples in the figure show a CATM, CAT1 and CAT4 relative comparison that translated into customer experience.

Combine the technology (which bands/available performance and how many are used by the technology) along with cost of data plan for a Subscriber network can directly affect the bottom line for a customer. Therefore, if the gateway for instance carries a low cost data plan (usually the lower the performance the lower the cost) and a high availability plan (usually the highest performance is the highest cost) the TERMS logic can be used to select the performance needed based on customer demand and usage modified by TERMS logic such as time of day, etc.

TERMS logic must also understand constraints of the communication technology and provide logic to achieve the desired Primary and Failover Subscriber network communication link during operational periods. For example, one such constraint may be how modems gather the information about the Subscriber Network from the SIM Card. Some modems only accept the network account information from the SIM Card when the modem is initialized. Others accept the information by a command (usually the command that indicates a SIM Card change or insert or removal). Embodiments herein provide an ability to handle the edge cases by allowing the modems to receive SIM Card Subscriber information as needed. This can be provided by timing the initialization of the modem such that the assigned SIM is present and available (at least slightly before) when the modem is ready to gather the account information. For each modem, this process can be controlled by the internal software/firmware/middleware/operating system and local applications.

An example operation is through sharing of a Subscriber account between two modems with a single SIM. Since the modems gather the information from the SIM Card when instructed (via command or a simple power up and initialization), by making the SIM Card connection to the desired modem and then switching the access to the next modem in sequence of operation allows the single SIM Card to perform multiple tasks to multiple modems and Subscriber networks. This single SIM Card with its Subscriber Network and account information approach may be extended to multiple SIM Cards and their connection to multiple modems.

The embodiments presented herein allow the TERMS logic to assign one or more SIM Cards to one or more desired modems as needed based on the requirements. In some cases, embodiments herein can produce fixed assignments with limited TERMS logic to reduce cost in manufacturing and producing the actual gateway. This reduction of cost for production does not limit the scope of learning presented herein.

In some embodiments, information for TERMS logic may be collected locally by the gateway devices. For example, FIG. 10 shows the relative selections for a modem and Dual SIM capability for example that collectively provides TERMS logic attributes with a selection to the "primary or preferred" Subscriber Network (e.g., account information to be used).

FIG. 11 shows additional attributes including information that can be journaled locally or transmitted to a remote cloud-based application. These attributes can provide key performance information for predictive analysis either with local or remote applications. Adding collection information such as time stamping for journals, this can become a very powerful tool combined with real-time TERMS logic.

Figure 12:
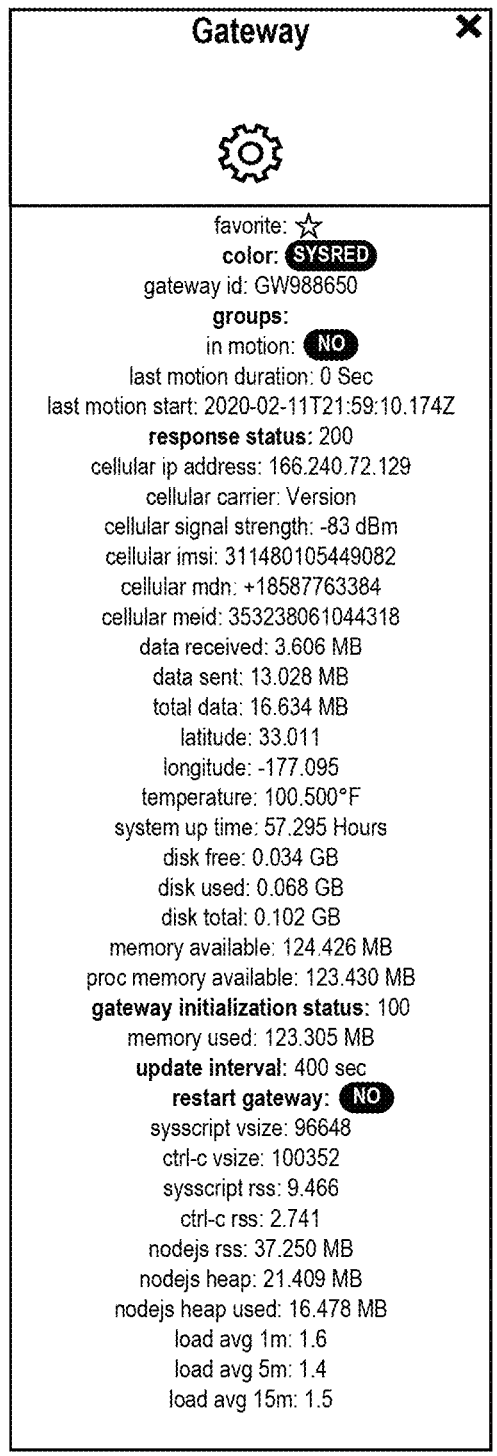
FIG. 12 illustrates information that may be collected remotely be a cloud-based application according to presently disclosed embodiments.

FIG. 12 shows information that can be collected by a cloud-based application (e.g., a Systech SysSCRIPT remote application stored on cloud-based storage devices and executed on one or more cloud-based servers). FIG. 12 illustrates that information about the connected gateway devices and can be used to create journals of information for TERMS logic as desired by the User.

In some embodiments, time of day, temperature, longitude and latitude of a gateway device can be combined with information, such as but not limited to, the Verizon Subscriber network to combine with other gateway devices providing similar information for system and regional/group analysis. The journal can even log Primary and Failover events with timestamps for analysis and predictive operational status. Localize carrier strength can be logged and compared to other gateways to analysis and predict cell tower performance based on group gateway information and active Subscriber Network and modem technology active.

Gateway devices according the embodiments disclosed herein can have multiple modems with the same carrier using different technologies with the same carrier. This information may be provided within journal data as described herein, where it's the same carrier (e.g. Verizon and Verizon or AT&T and AT&T) or a different carrier (Verizon and AT&T), along with collected QOS attributes. Note, for example, that a CATM modem technology with a CATM Subscriber network account with Verizon and a CAT4 modem technology with a CAT4 Subscriber network account with Verizon can be serviced by the same cell tower but produce very different QoS attributes, which can affect the TERMS logic for Failover operations described herein.

An advanced TERMS logic that is a combination of local TERMS logic and remote cloud-based applications may override local TERMS logic based on group or regional attributes. An example of this type of operation would indicate locally that a given gateway device should be communicating using the Primary modem using the Primary Subscribers network. However, the cloud-based application may evaluate a group of gateway devices (e.g., in a given regional area); determine, from the collective gateways, that upcoming bandwidth will be required for the collective gateways; and that peak traffic will reduce available bandwidth for the entire group's gateways. By the remote cloud-based application allocating more bandwidth to other gateways in the group, the remote application request some of the gateways within the group to switch to one or either the Failover Subscriber and/or failover modem (depending on the gateway device, for example, described in FIGS. 4 and 6-8) for a period to allow additional peak performance of other gateways in the group. The gateway devices receiving this request must apply TERMS logic to switch to Failover based on an external request that overrides the current state of the TERMS logic locally indicating that the Primary is meeting the needs correctly.

While examining the TERMS and attributes that can measured, monitored, and evaluated, even a higher level of functionality and performance for failover environments may be provided based on the addition of understanding the active connection and failover connections bandwidth allocations. Even when only evaluating the active connection, the bandwidth allocations can play an important role for performance and may determine yet another reason (TERMS resolve to TRUE events) on when to or when not to change network subscriber accounts. For example, if the primary interface has "traffic" bottled up even through a key TERM such as RSRQ would normally indicate a TERM Logic FALSE for changing to the failover subscriber network (e.g., that is if using the normal RSRQ we would NOT change over and use the Failover subscriber network), the FAILOVER to the subscriber network might be justified based on actual bandwidth allocated on the Failover vs the Primary subscriber network. For example, as described below in connection to FIGS. 13-20, embodiments herein can be effective within the selection of TERMS for Primary or Failover subscriber network.

There are many different factors that impact Cellular Bandwidth. For example, FIG. 13 illustrates a table a non-exhaustive list of physical attributes for multiple modem technologies and examples frequency bands for different network providers or carriers (e.g., AT&T, T-Mobile, Version, etc.). Certain antenna technology may be provided as main and/or diversity (e.g., diversity may increase sensitivity and bandwidth in non-ideal situations) and/or multiple input, multiple output (MIMO) which may available for CAT-6 and faster and may support multiple simultaneous data streams. Operating frequency may affect 5G perform more than 4G performance, and most carriers use frequencies near 700 MHz and 1700 MHZ Communication range may be a factor, for example, bandwidth may be reduced over increasing distances and/or changes in distance may trigger fallback to slower technology (e.g., to 3G). In some examples, CAT-M may introduce Coverage Enhancement (CE) modes that repeats data up to 2048 times, but may reduce speeds and increase latency by 2048 times. Another possible factor may be channel width. For example, each carrier may support one or more frequency bands and the carrier may determine how frequency bands are allocated to individual devices (e.g., 10×10 or 20×20, that is 10 or 20 MHz blocks for transmit and receive). Channel aggregation may also be a factor, for example, for CAT-6 or faster. Channel aggregation may combine multiple bands together to multiply bandwidth.

Figure 16:
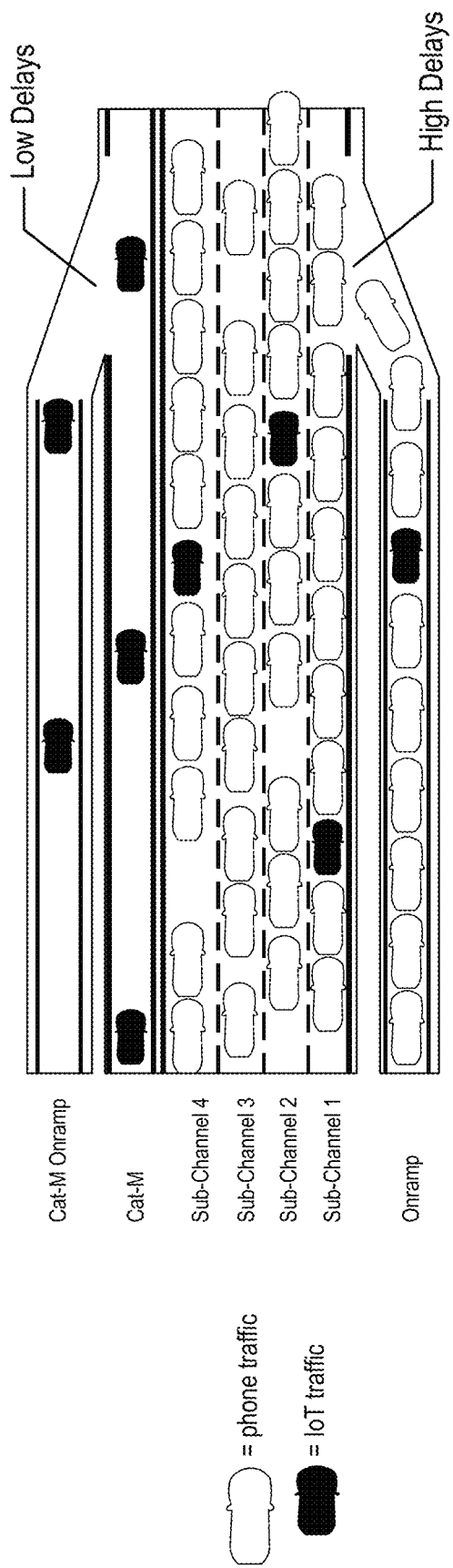

In view of the above, FIGS. 14-16 illustrate schematic diagrams of a metaphorical example of typical traffic patterns on conventional cellular networks. The cellular network illustrated in FIG. 14 is an example LTE network; however other networks can be similarly represented. FIG. 14 illustrates automobiles as data packets, with black automobiles representing phone traffic and red automobiles illustrating IoT traffic. The road is used to illustrate a cellular band that is split up into sub-channels (e.g., lanes). New packets may enter the cellular band channel, for example, via an on-ramp with no or minimal delay.

Traffic Patterns can change, quickly at times. For example, as shown in FIG. 15, the number of data packets has increased dramatically causing a "traffic jam" such that each of the sub-channels is crowded. This may result in new data packets encountering a delay (significant delay in some situations) to enter the channel.

In various implementations, network carriers (e.g., Verizon, AT&T, Sprint, etc.) may set the Bandwidth and determine how it is to be allocated to devices. That is carriers may choose how to distribute channel bandwidth between technologies. The carries may control the Traffic Pattern based on those decisions, for example, as depicted in FIG. 16. By looking at a typical Subscriber Network, a primary interface may be designated as, for example, a CAT-4 or CAT-6 LTE Subscriber Network and the Failover (or secondary) interface designated as the CAT M-1 Subscriber Network. In some embodiments, both of these networks can be on the same carrier and even be serviced by the same cell tower. Alternatively, both networks may be serviced by different carriers and/or different cell towers.

In the illustrative example of FIG. 16, cell tower(s) may, for example, service the sub-channels 1-4 for a first technology (e.g., the CAT-4) and sub-channel for a second technology (e.g., the CAT-M), simultaneously. In the illustrative example, CAT-M speeds and latency may be 10 times worse than CAT-4. All things being equal (e.g., data plan, rates, performance attributes like signal strength, etc.) then the ideal Subscriber Network for IoT devices would be the CAT-M, even though the actual data bits move "faster" (e.g., more allocated bandwidth to the combined sub-channels 1-4) on the CAT-4, as shown in FIG. 16. When the delay of accessing and getting "on to the channel with the data" becomes an issue to performance (e.g., high delay due to increased traffic) and even tandem systems requiring fast availability, switching to the "slower bit" channel (e.g., less bandwidth allocation) might yield better throughput results due to the lower delay of entry. In this example, CAT-M has relatively low usage, so traffic in its dedicated channel is low.

Some embodiments herein, add the knowledge base of the cloud-based applications that can provide additional information as to the performance of the Subscriber network at the individual or collective group of gateways. For example, by timestamping together with identifying the Subscriber network used to transmit the data (e.g., included in metadata associated with each data packet), the cloud-based applications can analyze performance information gathered from the actual transmission and reception of the data with desired granularity and communicate this analysis to a group of or individual gateway devices according to embodiments here. Such communications maybe used by the TERMS logic for each of the one or more gateways devices.

Figure 17:
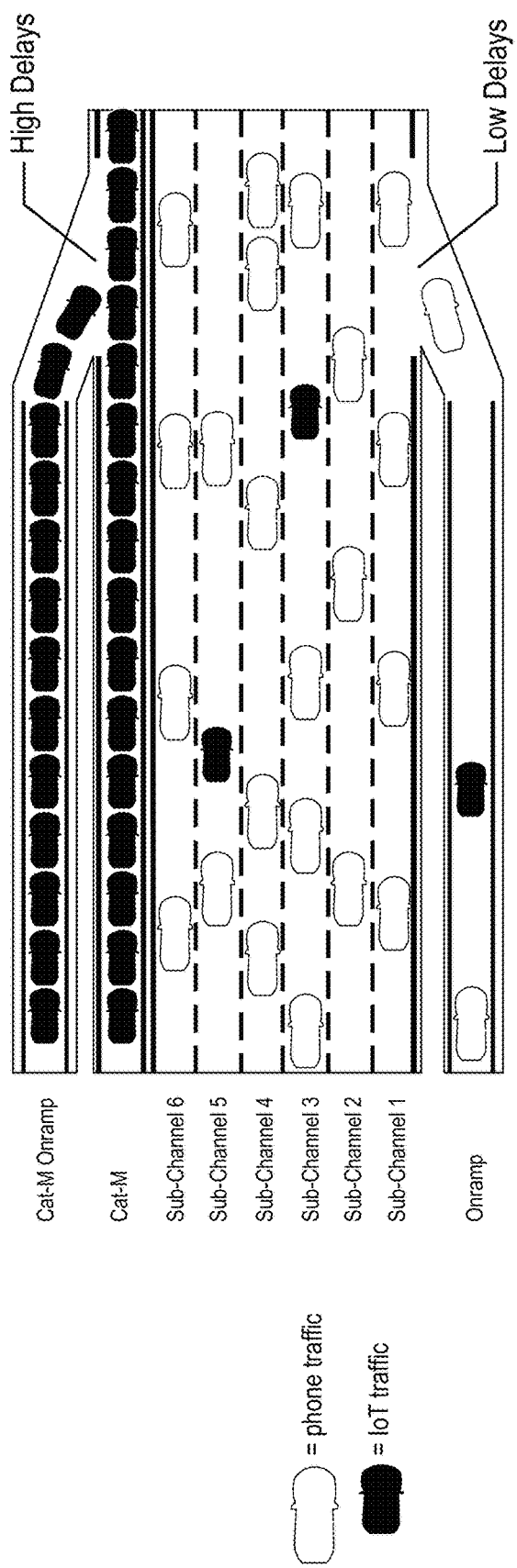
FIG. 17 illustrates a schematic diagram of the metaphorical example of an illustrative future cellular bandwidth allocation.

FIG. 17 illustrates a schematic diagram of the metaphorical example of an illustrative cellular bandwidth allocation. While carriers may re-distribute additional bandwidth for traditional devices (e.g., redistribute bandwidth for the devices allocated to the sub-channels 1-6), the devices allocated to the CAT-M sub-channel must be funneled to this sub-channel and cause delays. For example, IoT devices are becoming increasingly popular resulting in on onslaught of new IoT devices on the CAT-M channels. Since the Carrier determines that allocation of cellular bandwidth to the IoT devices, the reverse of the situation illustrated in FIG. 16 can happen (e.g., a dramatic increase in IoT devices gaining access to the network such as at a "football game") may create an immediate bandwidth drain on the CAT-M sub-channel.

By analyzing of this bandwidth allocation phenomenon (sometimes dynamic allocation), embodiments herein may be configured to use the analysis as its own separate TERMS logic and/or combine it with the other TERMS logic previously discussed. For example, decisions to designate an interface as primary and/or secondary may be based on the allocations so to communicate via a desired Subscriber network to provide adaptive and improved performance. One non-limiting example decision may be to designate an interface as primary and/or secondary based on the bandwidth demands (e.g., performance demands) of the content or payload of the communications. That is, for communications involving high bandwidth consuming content (e.g., video streams) an interface used to communicate with a high speed or highly available Subscriber network may be designated as primary, while an interface used to communication with slower or less available Subscriber networks may be secondary. For communications involving lower bandwidth consuming content (e.g., IoT transactions) an interface used to communicate with a slower or less available Subscriber network may be designated as primary, while an interface used to communication with high speed or highly available Subscriber networks may be secondary. Thus, based on the content, embodiments herein may switch between interfaces and corresponding Subscriber networks. As such, embodiments herein are able to select the optimum technology (e.g., CAT-M or CAT-4 in this example) at any given time and allocate bandwidth accordingly.

Figure 18:
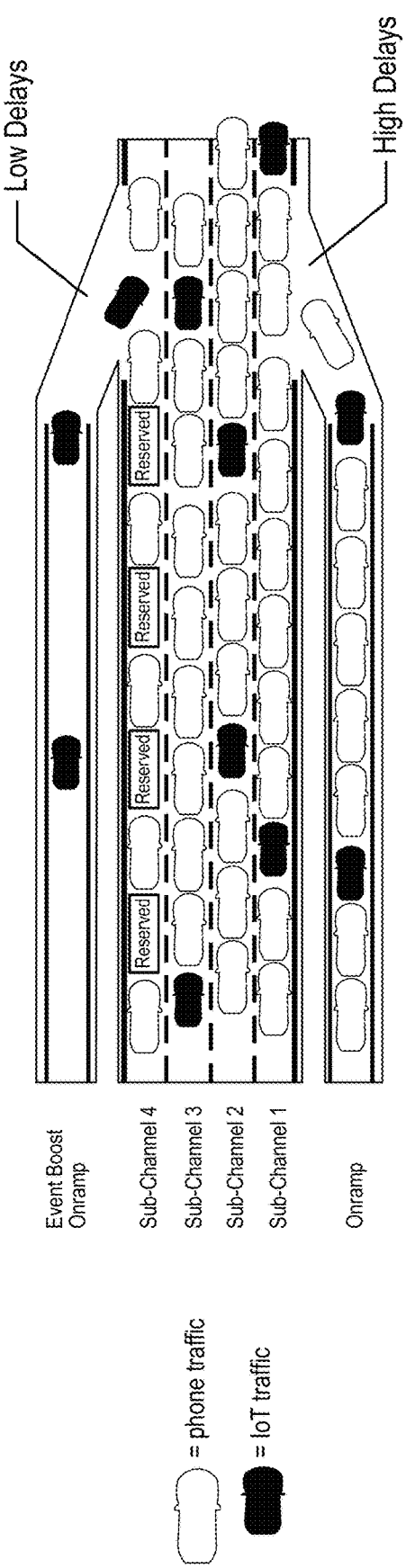
FIG. 18 illustrates another schematic diagram of the metaphorical example of utilizing bandwidth allocations according to presently disclosed embodiments.

For example, FIG. 18 illustrates another schematic diagram of the metaphorical example of utilizing bandwidth allocations according to a presently disclosed embodiment. In the illustrative example, the new TERMS logic would produce that leverages the carrier bandwidth allocations, as described above, may result in the example shown in FIG. 18.

The TERMS logic may express key attributes, such as time of day, day of week, and other high traffic properties, which may be used to determine Primary and Failover subscriber network usage. The same or augmented attributes can be used to perform both a "manual" or "automatic" Cellular Event Boost process of FIG. 18. An example of a means for reserving bandwidth on a carrier cell tower may be through a ping generated at a duration and frequency to reserve the necessary bandwidth. While this is one example, other means may be implemented for reserving bandwidth such bandwidth. In various embodiments, user setting of a "passive" or "active" performance level along with key durations and frequency can add to the control for the access across desired the Subscriber networks. In some embodiments, each subscriber network can have its own performance level parameters and can even have multiple ones depending on the time of day, time of week, or other recurring events.

In some implementations, through negotiating with carrier towers to reserve and allocate bandwidth as described above, new traffic (e.g., IoT traffic and/or other traffic) may enter the cellular data stream with little delay. Embodiments herein may therefor increase total data usage by approximately 25% or more. In some embodiments, the Event Boost technology may be used only at predetermined times or based on predetermined criteria (e.g., only during historically busy times and/or during events known to have significant traffic).

According to various embodiments herein, the Event Boost technology may be effective for a single modem, single subscriber network, as well as with multiple modems and/or multiple subscriber networks. Given the combined TERMS Logic for Primary and Failover execution events, embodiments herein work with any degree of granularly that can be defined by the user or system architect while being dynamically responsive to the Carrier controlled attributes in real-time.

The gateway devices of FIGS. 2, 4, and 6-8 may use various methods for monitoring the cellular network interfaces. The monitoring methods may be used in the process of FIG. 3. Two methods are described below. The session monitor method checks network packet counts. The transaction monitor method checks attempted connections to external servers. The session monitor method may be performed by the session monitor module 231. The transaction monitor method may be performed by the transaction monitor module 232.

When using the session monitor method, the gateway device is not involved in packet traffic, unlike transaction based processing. Accordingly, the gateway device cannot guarantee transactions, but can monitor network traffic and switch interfaces based on the monitored network traffic. The amount of monitoring may be determined, for example, based on the SLA. Excessive monitoring may cause increased data charges on the cellular network. Under monitoring may not meet customer SLA needs.

The session monitor method checks receive and transmit packets on the primary interface. If there are many transmit packets and few receive packets, the session monitor can ping the DNS server on the primary interface. In an embodiment, the ping occurs when the number of transmit packets is much greater (e.g., by a factor of two) than the number of receive packets. If ping fails, the session monitor may determine that network traffic is not occurring on the primary interface and signal a route switch. If both transmit and receive packets are zero, it does not necessarily indicate that network traffic is not available. Thus, the session monitor may have a timer to ping the DNS server periodically (e.g., once an hour). The session monitor may also use determination of a ping response failure time (when the DNS server is unreachable) that is excessive to determine that network traffic is not available. The period of the session monitor and the interface switching time determines the worst-case downtime. For example, if the session monitor runs every minute, the ping failure time is 1 second, and the interface switch time is 2 seconds, the maximum downtime is 63 seconds. The session monitor may use alternate methods besides ping to determine whether network traffic is occurring on the primary interface. For example, several connection tests (connecting to a server, ping, and DNS lookup) may be given a weighted value. The weighted values may be based, for example, on policies for individual users. Once the weighted value exceeds some threshold, the gateway device would perform the switch to the hot backup interface. These policies can be customizable based on particular use cases.

The gateway device may take advantage of local services on the gateway device like SOUP or LWHB to trigger the route switch if a failed connection is detected by any of these services. For example, if the gateway device is processing transactions, and the transaction fails, this can trigger the route switch. Using just the session monitor, any particular transaction (e.g., a POS (point-of-sale) transaction or ATM transaction) is not guaranteed; however, general connection to the Internet can be achieved.

The transaction monitor can track outbound connections from the gateway device. The transaction monitor may use, for example, specialized code that runs as a kernel driver monitoring network traffic. This code can be configured to track outbound connections attempted to specific ports on specific external servers (e.g., a payment processor site). More specifically, the transaction monitor can detect TCP (transmission control protocol) SYN/ACK handshakes for one or more IP addresses. If a failed connection is detected, a signal is generated to switch network interfaces. The transaction monitor continues to check for failed connections to the payment processor. Any failed connections while on hot backup may be ignored or could trigger a switch back to the primary interface. The transaction monitor method may, in some embodiments, provide a better way to increase the probability that POS or ATM transactions to a specific payment processor will succeed. However, general access to the Internet may not be improved over the session monitor method since only specific ports and servers are monitored.

The gateway device, in an embodiment, may use the session monitor and the transaction monitor at the same time. Either monitor can trigger a switch to the hot backup interface. Additionally, a change to the configuration file on the SOUP server will be detected by SOUP update or LWHB, which may result in a change of the primary/hot backup interface designation.

The gateway device configuration file provides a method, among other things, to switch the primary/hot backup priority. Which interface is preferred may be changed, for example, to take advantage of potential cost differential between two carriers associated with the cellular interfaces. The configuration file determines which interface is primary and which is the hot backup. Additionally, the configuration file can contain timer information related to the monitor periods. This configuration file is typically updated on a 24 hour cycle. Through the use of the Light Weight Heartbeat (LWHB), this time period can be reduced. For example, the gateway device can be configured to use LWHB to check every 15 minutes against the SOUP server. If the primary/hot backup needs to be switched, the LWHB would indicate a full check-in is needed, resulting in an updated configuration to the gateway device.

Additionally, the gateway device can record the usage of the primary and hot backup interfaces and upload this information to the SOUP server on a period (e.g., daily cycle).

The gateway devices can operate in many scenarios. In a first example usage case, a network operator (e.g., a mobile virtual network operator (MVNO)) wants to change the order of preference of network use, making the current primary network the secondary network and vice versa. The network operator may want to do this for a subset or for the entire universe of dual network gateway devices that the network operator uses. In this example usage case, this is a permanent change rather than a temporary change, for example, because of network session failure or transaction failure. The network operator also wants to be able to change other configuration file settings.

The network operator can achieve the change in order of preference of network use my multiple methods. In a first method 1, the SOUP server is used to change the preference in the configuration file for the primary and hot backup interfaces, making Carrier 1 the hot backup and Carrier 2 the primary network. The gateway device can be configured for the SOUP update or LWHB to periodically contact the SOUP server for a configuration update.

A second example usage case illustrates a scenario where a transaction fails. Here, the transaction monitor signals a route switch so that the hot backup interface is used rather than the primary interface. When the primary network recovers (e.g., as determined by a ping test or connection to the payment processor) the primary network interface is again used.

The gateway devices of FIGS. 2 and 4 and the related methods and communication systems are susceptible to many variations. Additionally, for clear and brief description, many descriptions of the systems and methods have been simplified. For example, the figures generally illustrate one or a few of each type of device (e.g., two cellular communication modules, one wireless communication module), but a gateway device may have many of each type of device. Similarly, many descriptions use terminology and structures of a specific wireless standard. However, the disclosed systems and methods are more broadly applicable.

Implementations of a gateway device may include many features in addition to those described above. In various embodiments, gateway devices and the systems in which they are used may include various combinations of hardware/firmware features, cloud-based and local server features, and smart phone features.

Examples of hardware/firmware features include: hardware upgrade slots that support cellular modules and/or other hardware options and future hardware features; support for 2G through 4G (e.g., CDMA, EVDO, LTE, GSM, 1×RTT, SPA+) cellular performance or other future cellular technologies; one or multiple Ethernet ports (e.g., using wired communication module 241 or the like), with multiple independent IP addresses when the gateway device has more than one Ethernet port; zero or multiple POTS (plain old telephone service) ports (e.g., v.90, v.92); zero or multiple serial ports (with RS232, RS422 and/or RS485 physical interfaces) that may be configured as standard serial ports (for applications such as POS and security) or as DEX & MDB ports (for vending applications); zero or multiple USB (universal serial bus) ports; zero or multiple microSD (or other types memory card) slots; support for various local wireless technologies including Wi-Fi (e.g., 802.11 a/b/g/n), ZigBee, Z-Wave, Bluetooth, NFC, ANT, etc.; temperature and motion sensors; zero to multiple connectors for external general purpose IO using a GPIO and/or I²C interface; an external or internal backup battery; and support for local applications.

Examples of cloud-based and local server features include: provisioning; configurable alerts (for reporting errors, location, motion, battery status, etc.); Wi-Fi hotspot; a consumer quality GUI for status and control; vending software; building security software; and an object oriented GUI interface that can be used by an unsophisticated user.

Examples of smart phone features (which may be used with other user devices, e.g., tablet and notebook computers) include: a web-driven GUI interface; and a custom app-driven GUI interface.

Gateway device may be provided in many product configurations. A family of gateway device products includes multiple enclosures that provide maximum flexibility in providing multiple configuration options. The specific options which are enabled for any one configuration can be controlled by the physical presence of the hardware features or can be set, locally or remotely, by electronic configuration, which is independent of the actual presence of physical hardware. The number of different hardware configurations may be established based on economies of scale through manufacturing of standardized configurations balanced by the additional costs which will be driven by the presence of some unnecessary hardware for specific configurations.

An example gateway device family includes four subfamilies: The SysLINK 1000 is a low cost, single purpose gateway that will typically be used for simple bridging applications as well as for simple ATM or vending applications. A SysLINK 1000 will generally be placed near the target application. The SysLINK 2000, SysLINK 3000 and SysLINK 4000 are all fully featured general purpose gateways, bridges or routers that support the connection of multiple devices across multiple local or remote networks. They are used in multi-purpose home and building applications and often placed in a central location (such as a wiring closet) with home runs to the target applications. The family of gateway devices can support combinations that include multiple local network connections and multiple broadband networks for internet connectivity. The gateway devices may be co-located with other gateway devices of the same or different subfamilies. Across subfamilies, the gateway devices may have substantially the same appearance, although the physical dimensions of the devices may vary, for example, driven largely by the number of communication interfaces that are provided by a particular device.

Gateway devices may be provided with various levels of communications performance. Many applications for gateway devices require data rates that are no higher than 0.05 Mb/s (megabits per second). This is well within the range that is supported by 2G cellular technology. However, other applications require faster performance, which can be provided by 3G or 4G cellular technology. For example, kiosks, home gateways and digital signage applications may require real-time multimedia streaming.

The architecture of the gateway devices, in an embodiment, is designed to permit field upgrade of an installed device from a slower speed technology to a higher speed technology or the addition of an additional network module by a user with little or no training. This architecture has been constructed to accept cellular modules from multiple sources with minimal development. The architecture supports future cellular technologies as well as the existing technologies previously mentioned.

Some bridging applications do not use cellular connectivity (such as Wi-Fi to Ethernet). In these applications, performance will match the underlying physical interface and will be minimally throttled by the gateway device.

Example applications for gateway devices include: ATMs with non-GPS (global positioning system) based location services and motion detection (including tilt) that will provide alerts (e.g., page, text, MSG, email, tweet, audible alarm, etc.) for unauthorized motion; ATMs with GPS based location services, motion, and temperature sensing; ATMs bundled with Wi-Fi hotspot services with GPS based location services, motion, and temperature sensing; home and building automation for lights, locks, HVAC (heating, ventilation, and air conditioning), and smart grid energy monitoring, controlled through a smart phone application; vending services with support for credit card transactions and inventory monitoring; security services; video surveillance; environmental or security alarm box monitoring; fax gateway; and building services with pool/spa, irrigation, and alarm monitoring.

Gateway devices may connect to different types of servers via the Internet or other networks. A wide variety of client machines, such as utility meters, telephones, kiosks, smart phones, thermostats, facsimile machines, motion sensors, and alarms may be connected to one gateway device. Each of these devices could be connected through a different, normally incompatible, network. The gateway device can be used to communicate information to and from those devices that have been coupled to the gateway to one or more Internet-based servers. An individual can access the information, for example, via a notebook, smart phone, desktop or tablet computer.

Gateway devices can be provided in many physical forms. In various embodiments, gateway devices have the following physical features or subsets thereof. Devices may be placed on a flat surface (desk, shelf, etc.), wall mounted, rack mounted, and/or magnetically mounted to a metal surface. A gateway device may have one or more I/O connections and/or power inputs on the rear of its enclosure. Lights and buttons may be facing the front. One or more antennas, when present, may be attached to both sides of the gateway device gateways and may be user adjustable, for example, up to 270 degrees in three planes.

The power input may be drawn from an AC outlet or from a DC source, for example, 4.5 V to 30 V DC. The power input can use a locking power connector to provide increased reliability. Devices may include a recessed reset push button facing the front of the unit. Additional antennas for other wireless communication modules may be located inside the enclosure. The gateway may include SMA female and SMA male connectors for external antennas to support various wireless communication technologies. Devices will support the use of a SIM card if such a card is necessary to support the underlying cellular technology, for example, for GSM or LTE service. Devices may also use multiple SIM cards. The multiple SIM cards may be used with the same cellular module or with different modules.

The physical enclosure for a gateway device may be physically small to support applications that require an embedded gateway, for example, for ATM, vending and remote display applications.

Some gateway devices may include a display, for example, an LCD or touch screen display. The display can provide a graphical user interface. Some gateway devices may also include an interface, for example, HDMI (High-Definition Multimedia Interface), to an external display.

In various embodiments, the gateway devices include option slots for configuring the devices with a range of features. The option slots may be multiple types and occur in differing number in various family members. A motherboard may, for example, contain functions that are common to all or many member of a family of SysLINK gateways. For example, the motherboard includes a programmable processor for controlling communication operations and directing traffic between cards populating the option slots.

In various embodiments, the SysLINK gateways support Ethernet networks and have the following features or subsets thereof. Ethernet ports may be configured as a secured LAN, an unsecured LAN, or a WAN port. A WAN port connects to an Internet source, such as a broadband router. Such a port may be identified as an "Internet port." A LAN port connects to a local network, such as an individual Ethernet-based device, a switch, or a router. Ethernet ports may operate at 10, 100, 1000 Mbps speeds or other speeds. One or more of the Ethernet ports may support power over Ethernet (POE).

The gateway devices include routing functionality to connect the provisioned communication devices. The router functionality includes support for firewall, DHCP, NAT, IPv4, IPv6, VPN pass through, certificate based Open-SSL, VPN, QOS, dynamic DNS, URL filtering, traffic filtering, and port forwarding.

Internet access may be provided by cellular, Ethernet, Wi-Fi, power line communications, satellite, dialup modem, or other communication technologies. Any of these technologies can be designated as a primary or backup connection. For devices with multiple sources of Internet access, the various sources are prioritized. The priority may be set automatically or through user configuration. Gateway devices are able to access a backend server through routers and firewalls. Access to the backend server may be at programmable intervals or as defined by the needs of applications that are being executed. Some gateway devices have an always-on connection to the backend server, allowing random access to such devices from the server. Such an operation may be termed "on-demand."

In various embodiments, a gateway device may include one or more POTS ports for connections that use traditional analog telephone lines. POTS ports may be used, for example, with FAX or ATM devices. A POTS port may function as a standard phone line from the perspective of appliance that is plugged into the gateway device. Supported MODEM standards include 300 bps: V.21; 1200 bps: V.22 and FastConnect; 2400 bps: V.22bis and FastConnect; 9600 bps: V.29, V.32 and FastConnect; 14,400 bps: V.32bis; 33,600 bps: V.34; 56,000 bps: V.90; V.42bis; and MNP5 data compression. The ports include on and off hook line voltage monitoring, parallel handset (intrusion) detection, V.42 and MNP 2-4 error correction (for example, for dial backup). A POTS port may be used to provide standard Group 3 FAX from 300 to 14,400 bps with Class 1 command compatibility. Higher speeds may also be provided.

One or more of the POTS ports will be able to interface to a standard phone line for remote access and Internet connectivity.

A POTS port supports DTMF (dual-tone multi-frequency, including generation and detection of touch tones), pulse dialing, or relevant FSK (frequency-shift keying) protocols. Functions may be programmed for compatibility with alarm panels and/or other applications.

In various embodiments, a gateway device includes one or more serial port. The serial ports may support RS-232, for example, for alarm systems, RS-422, RS-485, and RS-485/422/232. A serial port may operate in an asynchronous or synchronous mode. A serial port may have either a DCE or DTE physical interface. A serial port may support various protocols including SDLC and 3270 bisync.

In various embodiments, gateway device gateways include one or more USB ports. The USB ports may, for example, be USB 2.0 ports and operate in master mode. A USB port may be used, for example, to connect to memory sticks, cellular modems, PIN terminals, payment terminals, and cameras. A USB port on the gateway may supply power, for example, 500 mA at 5 V, to an attached device. Some of the USB ports are accessible internally, while others are accessible externally to a gateway device. Some USB ports may be directly wired to a USB slave device.

In various embodiments, gateway devices include one or more cellular interfaces. Cellular wireless interfaces may connect to various carrier services, for example, Verizon 2G, 3G, 4G, AT&T 2G, 3G, 4G, and Sprint 2G, 3G, 4G. The cellular wireless interfaces commonly use antennas that are external to the enclosure of the gateway device. Multiple antennas may be used to increase reliability. Multiple antennas may be used to provide multiple simultaneous connections. The gateway device supports location services through cellular services, for example, for use when a GPS location is not available. Multiple cellular interfaces may be provided in one gateway device. In an embodiment, cellular wireless interfaces may be used to communicate with users with the gateway device providing network communications, for example, by a wired backhaul connection.

In various embodiments, gateway devices include Wi-Fi wireless interfaces may operate according to various standards, such as 802.11a, b, g, and n. A Wi-Fi interface may use one or multiple antennas. A Wi-Fi module may support security protocols, such as WAP, WPA, WPA2, and AES, as well as new protocols as they are introduced. When a Wi-Fi wireless interface operates as an access point, multiple (e.g., 16 or 20) simultaneous connections are provided. A Wi-Fi interface may also function as a client device, for example, when providing Internet access to the gateway device. Many other types of wireless interfaces may also be included in a gateway device.

Gateway devices may also provide support for Bluetooth-based devices. A Bluetooth interface may support either the Bluetooth classic or Bluetooth low energy. The Bluetooth network may be used, for example, to communicate data to mobile phones and other Bluetooth devices. Antennas for Bluetooth interfaces are generally inside the gateway device enclosure.

Gateway devices may also provide ZigBee interfaces. Supported specifications include ZigBee Home Automation, ZigBee Smart Energy, ZigBee Telecommunication Services, ZigBee Health Care, ZigBee RF4CE-Remote Control, ZigBee Building Automation, and ZigBee Retail Services. A gateway device with a ZigBee interface operates as ZigBee Coordinator (ZC) and bridges to other networks. Antennas for ZigBee interfaces are generally inside the gateway device enclosure.

Gateway devices may also provide Z-Wave interfaces. Antennas for Z-Wave interfaces are generally inside the gateway device enclosure. Both ZigBee and Z-Wave interface may be joined to and disconnected from other ZigBee and Z-Wave networks. A gateway device may provide simultaneous ZigBee and Z-Wave support to bridge heterogeneous environments.

Support of NFC (near field communication) is also provided. The support is internal to the gateway device in some configurations.

In various configurations, gateway devices include one or more motion detectors. The detectors are sensitive to movement and jostling. Motion detection is used, for example, to detect movement of a machine where the gateway device has been previously installed, for example, inside an ATM. A motion detector may sense general physical movement as well as tilting. A gateway device may provide adjustable alerts when motion is detected. Motion sensitivity may be disabled and re-enabled via a server to allow for legitimate movement of the device.

In various configurations, gateway devices include one or more temperature sensors or interfaces to external temperature sensors. A temperature sensor may have programmable sensitivity in the range of, for example, negative 25 to 100 degrees Celsius. Temperature reading may be provided in Fahrenheit and Celsius. Alerts may be triggered based on set points, such as a minimum temperature and a maximum temperature. An external temperature sensor may be useful for food storage or cold vending machine applications.

In various embodiments, gateway devices include general-purpose input/output (GPIO) interfaces. Such interfaces may be used to interface to smart probes. GPIO interface signals are programmable as inputs or outputs. Some outputs may provide normally open or normally closed connections and may support high voltages, for example, 30 V. This may be used to simulate an open or closed door switch. A GPIO interface signal may also be used to support an analog external temperature sensor, for example, for refrigerated vending applications. GPIO interface signals may also support $I^2C$ electrical and messaging protocol. The GPIO interface may be optically isolated. The GPIO interface may also be used to power on or off other devices based, for example, on messages from a server. Other interfaces may also be used to power devices on or off.

In various embodiments, gateway devices include battery backup within the enclosure or, alternatively, support for an external battery backup. The battery backup will power the gateway device for at least one hour. Battery backup may be used to prevent or detect theft or tampering. Status of the battery backup may be reported to a server and may be signaled by indicator lights. Other devices may be connected to the battery backup.

A gateway device generally includes firmware for program storage. Upgrades to the gateway's firmware may, for example, be performed through loading via a portable storage device that can be attached to the gateway device (such as a USB memory stick or a micro SD card); performed over the air via a cellular or Wi-Fi network; performed via an Ethernet connection; or performed by physically changing a storage device in the gateway device.

Many different applications may be provided by the gateway devices and the systems in which they operate. Various applications may operate on the gateway device, on servers communicating with the gateway device, or a combination thereof. Applications may be programmed, for example, via C, C++, or other commonly used languages. Applications may support object oriented GUI interface that can be used by an unsophisticated user to create scripts. This interface may be presented through a web interface and a smart phone.

One type of application is for location information. Location can be derived from one or more tower cells (cell-ID) or through GPS. The device will use the best source, or combination of sources to determine location. Examples of accuracy are tower cells-300 to 2,000 meters and GPS-10 to 300 meters.

A user can specify a geo-fence that will alert if device moves beyond the fence. The geo-fence surrounds a specific area that is defined on a map (and configured via the backend server). Also, the geo-fence can be a circle defined by a radius that is centered at the current location (and configured locally or via the backend server). The radius can be specified, for example, in feet, meters, miles, or kilometers from 0 to 64K.

Location data may be recorded (via a snapshot) once every N seconds, minutes, or hours, for example, configurable from 0 to 1K when the unit is in a "steady-state" operation. Recordings may be stored in non-volatile memory. A device may record, for example, up to 2,880 readings over a user-specified interval (e.g., 1 reading per minute for 24 hours or 1 reading every 10 minutes for 1 week).

A location application may define a "high-threat" operation after motion is detected beyond a configurable threshold. A high-threat warning is enabled for a configurable number of seconds, e.g., from 0 to 64K. During high-threat mode, the location data is recorded (via a snapshot) once every N seconds, minutes, or hours, e.g., configurable from 0 to 1K. The snapshot frequency may be increased during high-threat mode compared to steady-state operation. Recordings are stored in non-volatile memory.

Locations may be reported in batch to the backend server once every N snapshots in steady-state mode. The parameter "N" may be configured from 1 to 1K. Data compression may be used to optimize reporting, especially if no movement is detected.

Another type of application is for alerts. Events or conditions that trigger an alert (such as movement of the device) will produce notifications. The form of notification may be configured for various types of alerts. Examples of responses include one or more notifications via text message, pager or email; a user-programmable C code or GUI script; a phone call with voice prompt, and/or GPIO action (e.g., to trigger a local alarm).

Another type of application is for SmartROAM. Roaming may occur when a device is experiencing difficulty connecting to a local cellular tower (perhaps due to high network congestion, or a weak signal), and the gateway device attempts (if configured) to use another nearby tower even if the alternative tower is with another carrier. The gateway device will attempt to return to the original tower after a wait period. Roaming related events generally do not generate alerts, but may be logged.

Another type of application is for temperature. Temperature measurements may be from on-board temperature sensors or from external probes. The user may specify temperature conditions (e.g., minimum and maximum thresholds) that trigger an event.

Another type of application is for Motion. Motion applications use information from a motion sensor in the gateway device. An example, an application triggers an alert when a motion threshold is exceeded. Thresholds may be, for example, accelerations or orientation angles.

Another type of application is for POS terminals and ATMs. These applications include monitoring the POS or ATM activity, initiating communication to payment processors, and protocol translation for payment processors, activity reporting, etc.

Another type of application is for abnormal transaction patterns. Such applications include generating alerts based on transaction patterns, e.g., a pattern of transaction processing frequency that varies from the norm by more than a threshold.

Another type of application is for video surveillance. Video surveillance applications generally use connectivity to Ethernet or Wi-Fi. Some video surveillance applications stream from a camera to a web-based client or app-based smart phone. Video from multiple cameras may stream simultaneously. Video streams may be filtered to detect predefined conditions in the video. For example, motion detection may trigger recording and an alert notification.

Another type of application is for Wi-Fi hot spots. Features of a hot spot application may include online payment or the use of vouchers, Wi-Fi start page, custom pricing (including free), and complete billing solutions (e.g., payments, refunds, etc.).

Another type of application is for fax. A fax application may provide gateway support to allow an external fax machine connected to a POTS port to send and receive faxes to other fax machines accessible via a phone call. The faxes may be communicated by way of the Internet.

Another type of application is for voice, audio, and/or video. A gateway device may provide voice communication using VOIP technology. The gateway device may include an integral speaker and microphone or may use external devices couple to the gateway device via one of its ports. In some embodiments, video conferencing is also supported. A gateway device may also provide audio and/or video streaming. Additionally, in some embodiments, gateway devices provide PBX functionality to a plurality of users.

A gateway device may also provide content management. For example, the device may provide digital rights management for Kindles, eReaders, iPods, Netflix, Blockbuster, etc. In an embodiment, a user can access cloud-based content via a cellular connection from the gateway device.

A gateway device may also include a media player. The media player may present audio or video via integral devices or by an external device couple to the gateway device, for example, by an HDMI port. The media player can be used for informational displays or marketing messages.

Another type of application is for proximity. A gateway device application may initial actions based on the presence of an individual near the gateway device or within a building or area associated with the gateway device. Uses of proximity applications include security and marketing, such as presenting retail coupons to consumers based on their location. The gateway device, in an embodiment, detects an individual's proximity by communicating with the individual's mobile phone or similar device.

Another type of application is for vending machines. A vending machine application may use, for example, Ethernet, Wi-Fi, and ZigBee interfaces to enable cross-vending machine communication and provide Internet connectivity through one shared connection. Additional vending machine application features include door open, local siren, remote temperature sensor (via the SmartPLUG), and backup battery status. Further vending machine application features include vending status, inventory status, funds reconciliation (e.g., via a cloud-based server, web-based client, and/or smart phone), and credit card and private card payment processing.

In an embodiment, a family of gateway devices shares a modular architecture. Those elements common to each (or most) family members are placed on the main board. Other features and connectivity are handled by the addition of one or more modules. Advantages of this modular approach include the ability to capitalize on new device developments, to incorporate new cellular and/or wireless standards as they are deployed, to simplify configuration control, to minimize SKU growth, to simplify inventory control, and to combine high volume feature clusters in modules to lower cost to selected markets One such family includes the SysLINK 1000, 2000, 3000 and 4000. These gateway devices include a Systech mother board (SMB). Each SMB has a main processor (e.g., 400 MHZ ARM926), RAM (e.g., 256 Mbytes DDR2), flash (e.g., 256 Mbytes), and Ethernet capability. The 1000, 2000, 3000 and 4000 SMBs also contain USB Host connections (e.g., a 4-port hub). These SMBs also have support for motion sensing and internal temperature monitoring. Some features may be depopulated in selected implementations. In an embodiment, the mother board may use multiple physical boards. In some configurations, a gateway device may include a digital storage module, for example, a hard disk drive or a solid state drive. The digital storage module may be used to store, for example, information collected by the gateway device or downloaded information, such as a movie.

Other functions on the SysLINK 1000 through 4000 can be implemented on Systech Option Cards. Systech Option "Cards" mate to the SMB via option "Slots" with 22-pin connectors. Option Cards can be physically mounted on top of the SMB. Any connectors that are necessary to connect external devices are located on the edge of the option card and the rear panel of the gateway device. Some option cards must accommodate wider connectors than others. For instance, DB-25 connectors are wider than DB-9 connectors. To reduce or minimize the gateway device physical size, two different size options slots are defined, full size and half size. Example dimensions for these cards are 56×70 mm (full size) and 28×70 mm (half size). The SMB and enclosures are laid out such that a full size card may only be installed in a full size slot but a half size card may be installed in either a full size or a half size slot.

In addition to the Systech option slots, each SysLINK 1000 through 4000 can support one or two Mini PCI Express daughter boards (PCIe). SIM sockets (or slots) may be provided, for example, on the gateway device via the PCIe board. Cellular certification is cased by mounting the cellular modem Mini PCI Express card on a carrier board that includes the Mini PCIe connector and a SIM (designed to accommodate a specific cellular module). The other Mini PCI Express slot can be used for other high speed connectivity support, such as Wi-Fi. Both of the Mini PCI Express boards communicate via a High Speed 480 Mbs USB 2.0 interface.

Typically, one end of an option card will be secured to the motherboard with a 22 pin header arranged as 2×11 on 0.10 inch centers, with the other end supported by standoffs. External connectors affixed to option cards protrude through the rear of the enclosure. Systech option card may be, for example, a simple POTS implementation.

The option card connection is made through a 20 pin header. These signals bring the host processor's SPI, I2C, USB, and UART/USART data and clock to the board. Additionally, power, ground, and interrupt request lines are present. The table below shows assigned connections. On some Systech cards, only pins 1 through 18 are available and pins 2 and 4 are not available to carry USB data. In other embodiments, a 22 pin header is used. All signal levels 3.3 V DC unless otherwise indicated.

TABLE

| Daughter Board Signals Option Card Pin Header | | |
|---|---|---|
| Pin | Signal | Description |
| 1 | V+ | Raw Supply Power |
| 2 | USB-M | USB Port |
| 3 | V+ | Raw Supply Power |
| 4 | USB-D | USB Port |

TABLE-continued

Daughter Board Signals
Option Card Pin Header

| Pin | Signal | Description |
| --- | --- | --- |
| 5 | GND | Ground |
| 6 | GND | Ground |
| 7 | I2C-SDA | I2C Data |
| 8 | I2C-CLK | I2C Clock |
| 9 | 3.3 V DC | Regulated 3.3 V |
| 10 | 3.3 V DC | Regulated 3.3 V |
| 11 | TXD | Serial Xmit Data |
| 12 | SPI-SCLK | SPI Clock |
| 13 | RXD | Serial Rcv Data |
| 14 | SPI-MOST | SPI Data from Host |
| 15 | CTS | Clear to Send |
| 16 | SPI-MISO | SPI Data to Host |
| 17 | RTS | Request to Send |
| 18 | /SPI-SEL | Board Select-Active Low |
| 19 | SDC | Serial Data Clock |
| 20 | /INT | Interrupt Service Request |
| 21 | GND | Chassis Ground |
| 22 | GND | Chassis Ground |

Figure 19A:
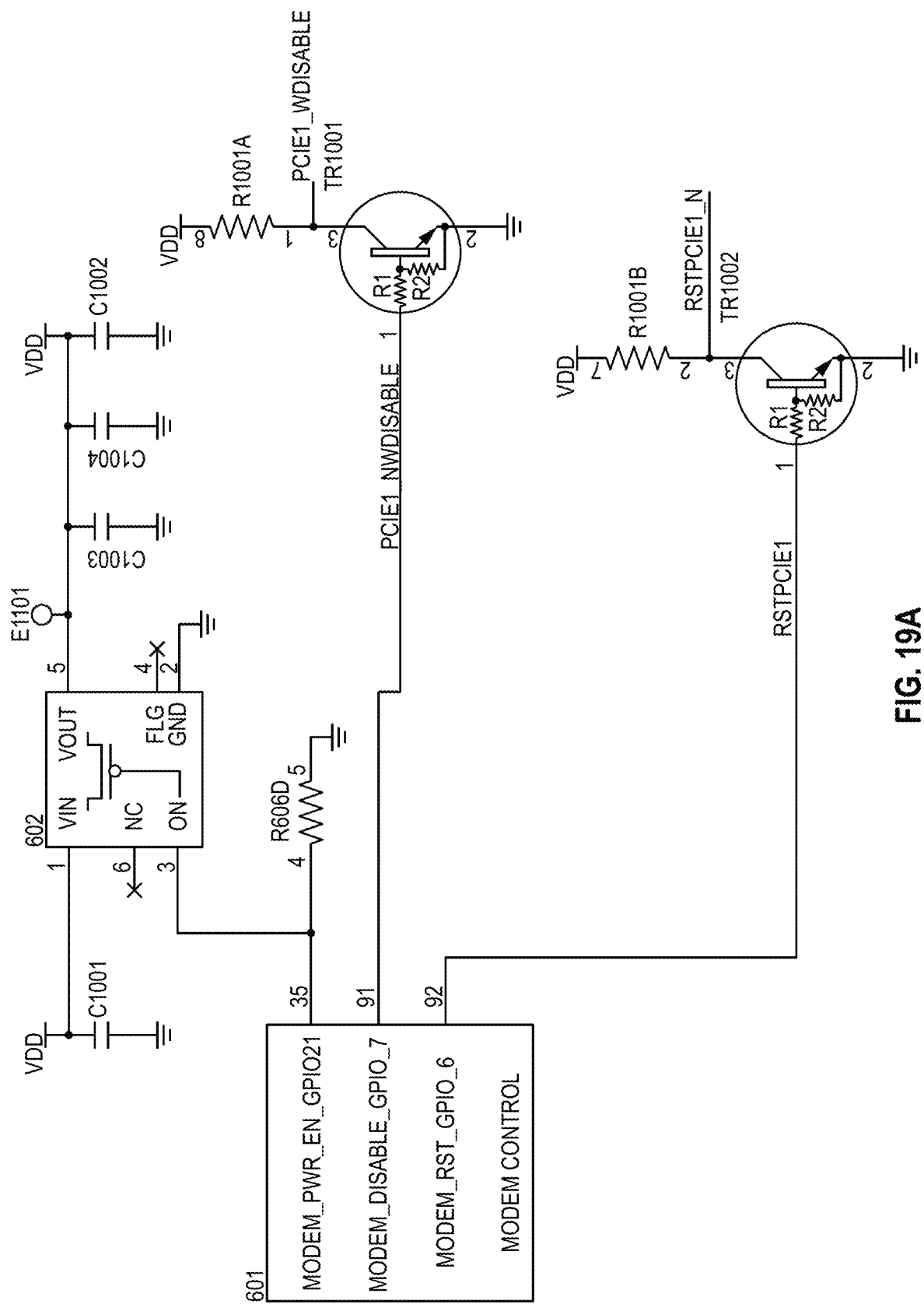
FIGS. 19A-19C are various parts of another schematic diagrams of example gateway device according to a presently disclosed embodiment.
Figure 19B:
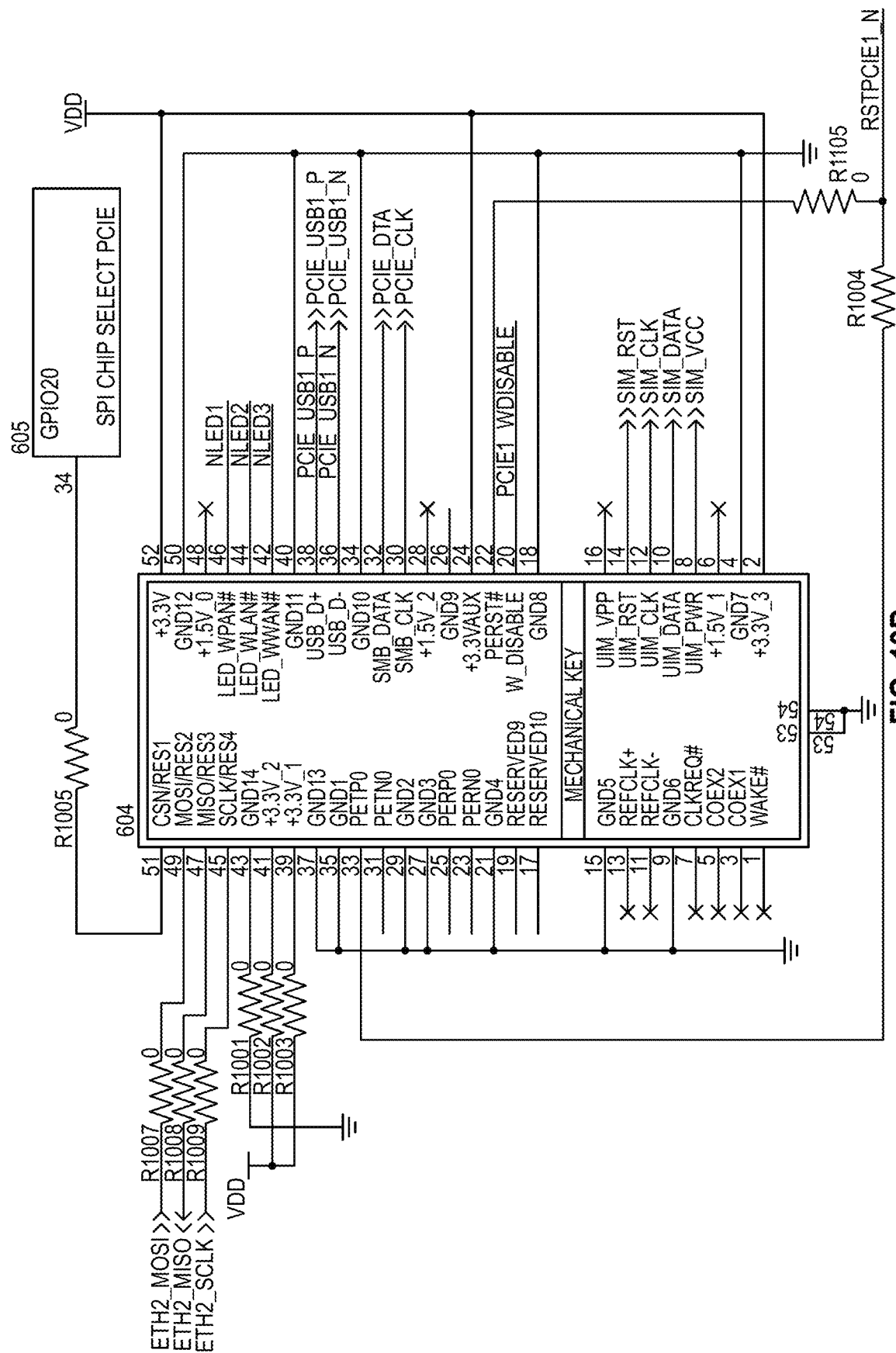
Figure 19C:
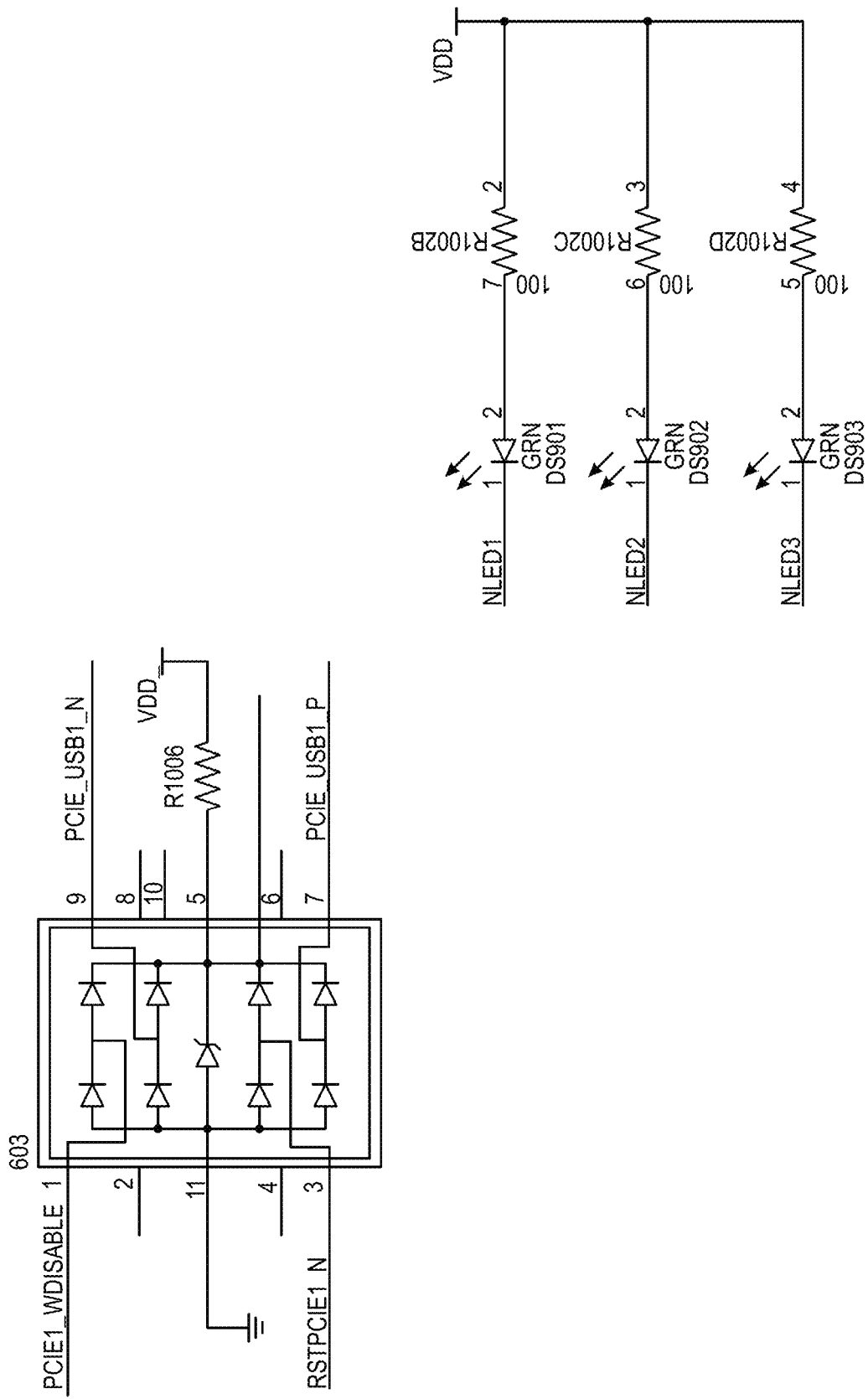

FIGS. 19A-19C are various parts of another schematic diagrams of example gateway device according to a presently disclosed embodiment. FIGS. 19A-19C illustrates an example SysCORE, which may provide for either Daughter Board Signals described above (mPCIe) having a subset of the daughter board signals. Embodiments according to FIGS. 19A-19C may allow the mPCIe slot to house either a modem or IoT card or a dual function allowing both. As shown in FIGS. 19A-19C, the option card header 604 is electrically connected to modem control 601, integrated circuits 603 and 602, and SPI chip select PCIe 605. The example of FIGS. 19A-19C also illustrates a plurality of resistors R606 and R1001-R1005, a plurality of capacitors C1001-1009, a plurality of transistors TR 1001 and 1002, and a plurality of diodes DS 901-903.

Figure 20:
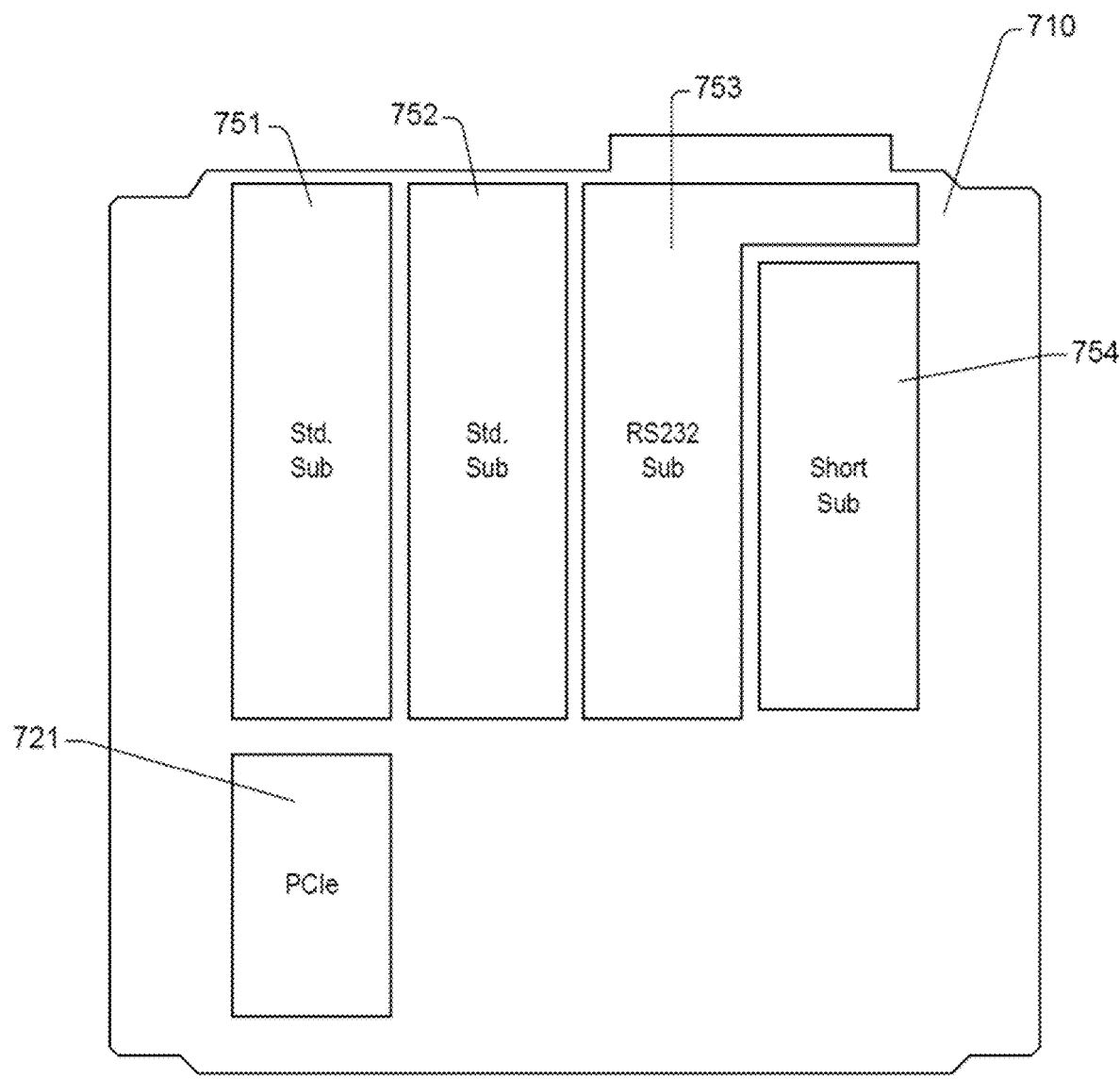
FIGS. 20 and 21 are diagrams of a gateway device from a family of gateway devices according to a presently disclosed embodiment.

An example SysLINK gateway, designated SysLINK 3000 and illustrated in FIG. 20, has a motherboard 710 with a single Ethernet connection and a single PCIe connection 721. The SysLINK 3000 includes four option cards 751-754. The illustrated device includes an RS232 option card 753 with an extended rear portion allowing a wide DB25 connector. The adjacent option card 754 does not include external ports, for example, a security coprocessor card.

Figure 21:
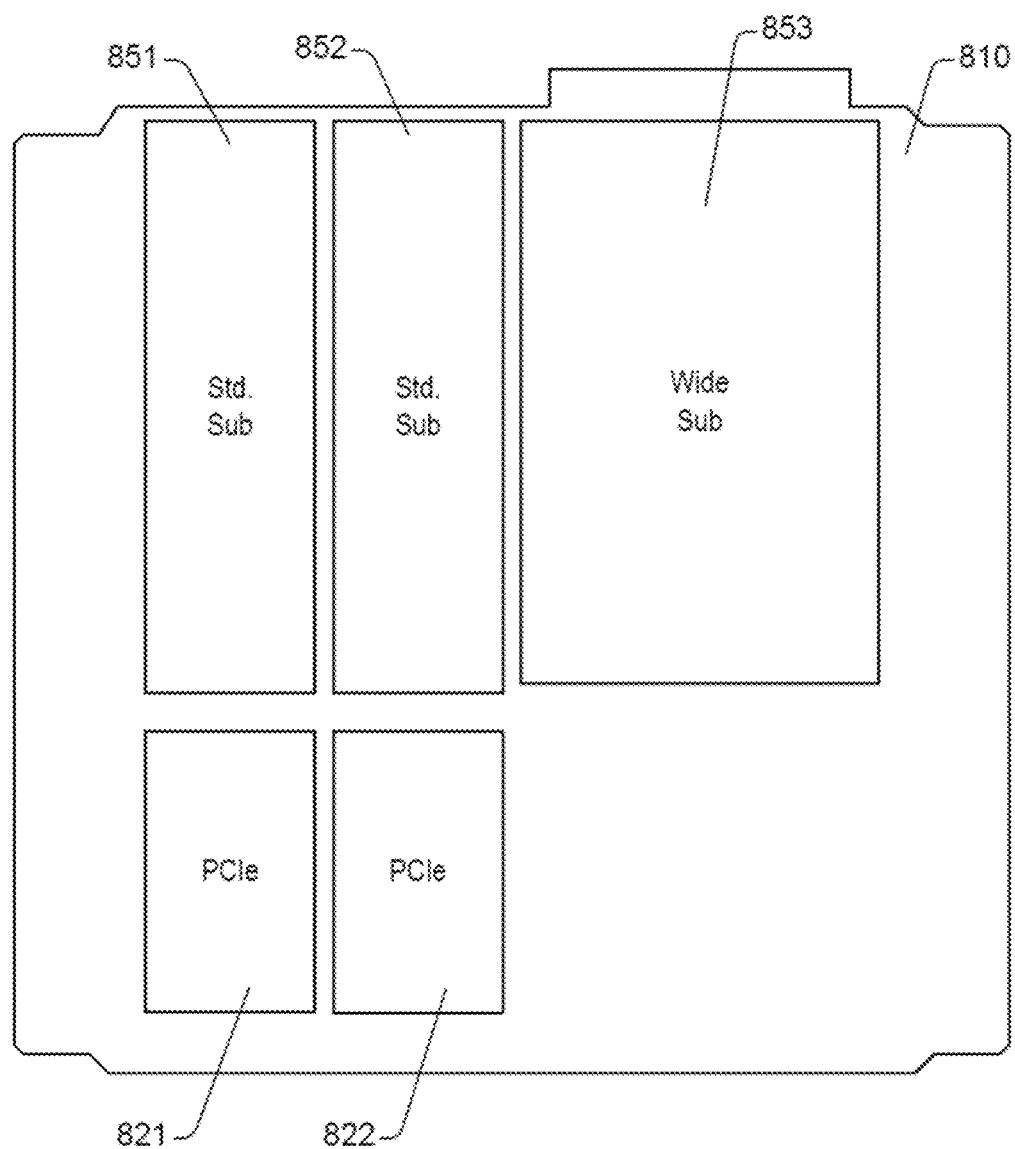

Another example SysLINK gateway, designated SysLINK 4000 and illustrated in FIG. 21, has a motherboard 810 with four Ethernet connections, divided between two separate networks; two PCIe slots 821-822 for cellular and Wi-Fi; a full size 853 and two half size 851-852 option slots that can be used for one or more Serial, POTS, GPIO, DEX, Zigbee or Z-Wave cards; and two externally visible USB connections for USB storage devices or additional connectivity options.

An integrated ARM9 processor from Atmel (AT91SAM9G45) is used in some of the models. In addition to the processing core, it includes four USB 2.0 High Speed 480 Mbs ports (particularly useful, for example, for supporting 4G and 3G at their maximum rates), embedded NAND flash control, four UART/USARTs onboard as well as a debug serial port, and advanced power management features. Other embodiments use quad ARM7 processors with additional IO and memory capability. Independent of the processing architecture, the architecture should be configured to support processing requirements of one or more of the modem and/or multiple cellular network interfaces.

Functional and/or physical isolation may be required to pass Payment Application Data Security Standard (PA-DSS) compliance testing. A gateway device may thus use an isolated payment processor. Payment data processed by the processor and resulting encrypted data can be passed via a serial port or other transport medium to the mother board. The board handles the clear text transaction recognition, Open SSL (secure sockets layer) encryption and packing and unpacking of data. This data will then be passed through the port to gateway device for communication using the gateway device's preferred connectivity hierarchy.

Some gateway devices include UPS (uninterruptible power supply) and battery backup. When the gateway device detects a slow, monotonic decrease in supply voltage, it will assume it is running on backup power and provide an alert message to the server. This message will indicate, based on the rate of voltage decay an estimated time to shut down.

The gateway device firmware may be implemented using a standard embedded operating system, for example, Embedded Linux. When using Embedded Linux, some firmware using threads can be ported to Linux using the <pthreads.h> library. This library provides a POSIX compatible set of calls, implemented via calls to Linux kernel primitives.

Also Stream abstraction from System V, release 4 (SVR4) can be supported under Linux by LiS v2.19 (Linux Streams). This library implements the streams abstraction at the user level through multitasking. It should facilitate the porting of existing PPP/POTS transaction handling functions to new platforms. OpenSSL code may alternatively be used to address this.

A Streams interface to the 3G and 4G cards may allow code for slower networks to work seamlessly on faster cellular networks.

Gateway devices may use a streams based M2M design. One gateway may include 13 different IO modes, e.g., Ethernet, cellular, Wi-Fi, Bluetooth, ZigBee, Z-wave, DEX, MDB, motion/position, temperature, location, GPIO, and POTS. Each of those IO modes may have several associated device types. Even for a single device model on each IO, there are 156 (12×13) different cross connection combinations. Stream bridges may be used to support all possible connections. Since many of these ports have many device classes that must be handled, the practical possible combinations can be in the thousands.

Furthermore, this assumes the gateway device is not "smart." That is to say, it does not have any semantic knowledge of the data it transports. This condition is clearly not the case in the payment processing applications, nor will it be true for many emerging applications, such as medical logging, office automation, security, and vending. Thus, firmware may be as modular, reusable, and easily validated as practically possible.

A streams model includes a hierarchical data flow architecture. The basic concepts of an example firmware architecture include:

IO Streams flow bidirectionally to and from ports.

Device Abstraction Filters (DAFs) are inserted into IO Streams. Their function is to intercept a subclass of data streaming from a Port (Upstream, or the left side of the filter) and route it to another Device Filter or API Filter. Data that is not part of a member of the device subclass is passed downstream. Data streaming from downstream of the device to the IO port is simply passed to the device filter without any handling.

DAFs may be implemented, for example, in C++. In many embodiments, DAFs pass and receive device data to or from other DAFs as XML text messages. The API of a DAF can be defined as an object class contained in a library supplied to an embedded application developer.

API Filters are connected to the Device Data port of a DAF. These object classes provide a uniform set of embedded Application Program Interfaces to Device Abstraction Filters. They regularize the method for sending data to and from a Device Abstraction and monitoring and generating device events.

Device Messaging Tasks are two port processes that pass data packets between a pair of device abstractions without any significant interpretation of the contents of those packets.

Embedded Application Tasks (EATs) are tasks attach and communicate with one to many different API filters. Any API Filter may only be attached to a single Embedded Application Task, but a single Embedded Application Task may attach many different API Filters.

EATs can be implemented in virtual machines, for example, JAVA and PHP. For procedurally complex operations, JAVA may be the preferred development platform. For simpler operations transforming EATs, PHP may be employed.

Remote JAVA debugging can be used to facilitate program development.

The firmware architecture of an example gateway device may be configured to perform multiple functions. In this example, most upstream communication is a payment processor embedded application. It takes payment requests from a local secure Ethernet or a POTS port. These payments are encrypted and communicated via a cellular connection to a payment services provider. Since they are the upstream connections to most IO streams, no data pertaining to these transactions can be visible to filters downstream and are thus secure.

The next set of filters passes location information to an OnDemand connection. Further downstream, an embedded application passes building status and handles building control commands with a remote building management server. Finally, a Wi-Fi Hotspot server provides wireless connectivity to users, but the access is filtered and access controlled by the Wi-Fi Hotspot router application.

This modular firmware architecture can be based on porting an implementation of Linux Streams to the gateway device. Additionally, software coding, interface and tasking standards can be used to assure uniformity of filter implementation and reusability of filter components and tasks in different client configurations. For example, by applying the described methods, a new customer configuration comprised of differently connected filters and tasks may require verification of the integration but not of the individual component functionality.

The gateway device may operate with a two-step boot process. The flash memory may be partitioned into a number of virtual Linux drives. For example, there can be: a Safe Boot Drive Image; a Customer Boot Drive Image; and a Data Drive Image.

The boot process can include initializing SDRAM memory and other hardware interfaces and then checking the integrity of the Customer Boot Drive Image. At a minimum, the Customer Boot image should have a good checksum, valid file structure, and a correct electronic signature. If these conditions are met, a watch dog timer will be set and an attempt will be made to boot the Customer Boot Drive Image. As part of the Customer boot process, the watch dog timer is turned off after a sufficient level of functionality has been initialized to ensure that the host may be contacted and updates may be validated and downloaded with the operating kernel.

If the watch dog timer expires prior to being turned off, the system will automatically boot using the Safe Boot Drive Image. Whenever the unit boots from the Safe Boot Drive, it will contact the SOUP (using, for example, Systech Online Update Protocol) server, indicate its customer boot failure, and wait for a new customer boot image to be downloaded.

A short press of the RESET switch will trigger a reboot from the Customer Boot Drive Image. A long press of the RESET switch will trigger a reboot from the Safe Boot Drive Image.

The Safe Boot system will typically be configured to contact the Systech server and perform Customer firmware update and then reboot the system normally.

In addition to the firmware embedded in the device, external software running on other platforms may be used for some functionality. Example protocols for communication between the device and other platforms include SOUP, OnDemand, RM, and LWHB.

SOUP-uses HTTP/HTTPS to connect to a SOUP server, send status, and check for new code, configuration files, or PRL files. A unit set up for SOUP updates is typically configured to connect to the host on boot up and then daily during the night. It can also be configured to more frequently send "heartbeats" (status messages) during the day.

RM-Remote Management-provides access to the web server interface on the unit. The unit makes an outbound connection to a server, sends its MAC address to identify itself, then remains connected and waits. When a client wants to connect to the unit, it connects to the server, identifies the unit it wants to talk to, and the server connects the two sockets. At that point, the connection operates just as if the client had connected to port 80 or 443 on the unit.

OnDemand-operates similarly to RM, but gives access to a port (e.g., serial port or pots port) instead of to the web server interface.

Direct Connection-A TCP connection can be made to a physical port on the gateway device. For example, connect to TCP port 800n or 900n on the unit to talk to physical port n. Once the connection is established, the device can "write/send" data out the TCP connection to go out the port, and the device can "read/recv" data arriving on the physical port. The 800n ports support "raw TCP"—the device doesn't touch the data, just send/receive it as is. The 900n ports may support the "telnet" protocol. So the device looks for and processes telnet escape sequences in the TCP data stream and generates appropriate telnet escapes to the host.

If the device is behind a firewall (e.g., for "wired" units) or on a private network (e.g., as AT&T does for cellular units), it may not be able to make TCP connections to the ports. But with OnDemand the device can do virtually the same thing as with RM. The device makes a connection to a server, identifies itself (MAC) and the port it is offering, and then waits for some activity. When a client program wants to connect to the port, it connects to the server, asks for a MAC/port combo, and the server connects the two sockets. At that point, the connection operates just as if the client had connected to port" 800n or 900n on the unit.

RM server software may be, for example, written in python and use OpenSSL. OnDemand server software may be, for example, .NET application for Windows. The server software may have complexities to deal with security, identifying the device/port to connect to, etc. In the case of OnDemand, it is may be a paid service so that the existence of a valid license should be checked.

LWHB-Light Weight Heart Beat is a protocol. SOUP updates may be relatively costly. A daily update on a cellular unit over HTTPS consumes about 27 Kbytes of data if there are no updates. Done daily, that consumes over 800 K of data which may be on a 2-5 MB/month data plan. LWHB is designed to send a very small amount of data (about 12 bytes), unencrypted, optionally over UDP or TCP, to the host. The host can just record the contact (and the source IP address can be helpful) or it can respond with some actions-like "Do a full update", "Send status", "Reboot", etc.

LWHB is designed such that users can configure their devices to not do a full update every day but do frequent LWHBs (e.g., every 30 minutes). The server side can then enable a full update only when there is something to be updated.

A gateway device may include support for connection services with a method whereby the initial IP address to which a device connects, can redirect the unit to another IP address. This allows an initial connection server to offload connections to many different servers. The connection server may use a networked backend database to track what units are attached to servers at any given time so that it can perform load balancing. Additionally, customer clients may initially connect to the connectivity server, but they may subsequently be redirected to the server where the corresponding device is waiting.

The connection server method allows protocols to scale by allowing additional servers to be added or deleted as necessary.

The LWHB may be extended to allow the host to inform the unit that it has been requested to attach to the RM or OnDemand server. When it receives this request, it can be connected to a server and remain attached for up to one heart beat interval awaiting a connection from its client. Once, the requested unit has connected to the server, the server will notify the client via email, IM, other protocol messages, or a combination thereof. The client can then connect to the unit via OnDemand or RM and complete whatever activity is required. Furthermore, the LWHB protocol may allow that units can post that some actionable alarm or warning condition (e.g., exceeding a temperature, location, motion range, or some other fencing condition) has occurred. In this case the unit will immediately connect to the OnDemand or RMs server and await service from its client.

The above methods reduce connection stresses on OnDemand and RM servers. By not remaining continuously connected to the servers, many more units can be handled. The cost of this is the latency of a server responding to client request. For most automated clients, a cadence measured in hours, is likely sufficient for routine operations.

LWHB servers may also include data archiving and retrieval. The data may, for example, be accessed by customer applications use an XML schema for data to be stored and retrieved on their behalf on backend database servers.

GPS and AGPS data can be received from the unit by the client, either directly or via a host. The GPS port can use the NEMA ASCII standard to send the location, time and motion information. The NEMA sequence, in an implementation, repeats once per second. The information can be packaged in an XML wrapper.

Temperature data can be forwarded, for example, as ASCII strings including the sensor number followed by a space followed by the Celsius temperature as an ASCII expressed real number followed by a linefeed. If a temperature limit has been exceeded, the word "ALERT" may be appended to the sensor string. For example:
1 27.5C
2 33.9C ALERT In one implementation, the sequence repeats every 10 seconds and is packaged in an XML wrapper.

The Position and motion sensor report can, for example, return a string containing the instantaneous acceleration and forces in the X, Y, and Z axis followed by the time and maximum changes in X, Y and Z forces over the past 24 hours. The forces are ASCII expressed real numbers that are in units of Gs and are packaged in an XML wrapper. This string will repeat at a low rate unless a fence has been violated in which case its cadence is increased.

An example of a stable unit might be:
0.1 0.02 0.97 0.01 0.01 0.01
A unit that has been tampered might return:
0.1 0.05 0.78 0.4 0.5 1.0

A power monitoring report can include, for example, a string of four ASCII expressed numbers separated by spaces and packaged in an XML wrapper. These may report the current supply voltage, the rate of change of the supply voltage over the last 30 minutes expressed in volts per hour, the peak supply voltage in the past 24 hours, and the minimum voltage in the last 24 hours.

An example of a stable UPS powered unit might return:
13.50 +0.05 13.56 13.44
A UPS powered unit experiencing a power failure might return
11.60 −1.17 13.55 11.60

A system may also create and transmit DEX fault reports.

In a further example system, text messaging is used as a way to view and manage cellular gateway device units. There are multiple ways that text messaging can be utilized in conjunction with gateway device products.

Unit status—a user can text the serial number of a unit to a service number and get back the status for the unit having that service number. Example status includes the last time the unit contacted SOUP and other useful info about the unit. Relatively benign information (not exposing anything private about the unit) may be provided, in an implementation, without requiring any authentication or registration. Other information can be more private (e.g., the current IP address, configuration information, etc.). Such information may require the requester to have previously registered her phone number in a SOUP account before access is allowed.

Status information may be supplied without communicating with the gateway device unit by supplying information stored at the server. SMS messages to the server can also schedule a reboot, update, etc.

Commands to the unit—A gateway device unit may be capable of receiving SMS (text) messages. The SMS messages may contain commands to the unit. The commands generally require secure verification of the source of the command. Accordingly, the gateway device unit may include authentication and encryption functionality.

Status from the unit—A gateway device unit may also be capable of sending SMS messages. In some situations, SMS messaging may be available when other cellular connectivity is unavailable. Accordingly, the gateway device unit may send SMS messages for certain alerts, for example, an alert text message indicating an inability to connect to a server.

Those of skill will appreciate that the various illustrative logical blocks, modules, units, and algorithm steps described in connection with the embodiments disclosed herein can often be implemented as electronic hardware, computer software, or combinations of both. To clearly illustrate this interchangeability of hardware and software, various illustrative components, blocks, modules, and steps have been described above generally in terms of their functionality.

Whether such functionality is implemented as hardware or software depends upon the particular constraints imposed on the overall system. Skilled persons can implement the described functionality in varying ways for each particular system, but such implementation decisions should not be interpreted as causing a departure from the scope of the invention. In addition, the grouping of functions within a unit, module, block, or step is for ease of description. Specific functions or steps can be moved from one unit, module, or block without departing from the invention.

The various illustrative logical blocks, units, steps and modules described in connection with the embodiments disclosed herein can be implemented or performed with a processor, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

The steps of a method or algorithm and the processes of a block or module described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium. An exemplary storage medium can be coupled to the processor such that the processor can read information from, and write information to, the storage medium. In the alternative, the storage medium can be integral to the processor. The processor and the storage medium can reside in an ASIC. Additionally, device, blocks, or modules that are described as coupled may be coupled via intermediary device, blocks, or modules. Similarly, a first device may be described as transmitting data to (or receiving from) a second device when there are intermediary devices that couple the first and second device and also when the first device is unaware of the ultimate destination of the data.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter that is broadly contemplated by the present invention. It is further understood that the scope of the present invention fully encompasses other embodiments that may become obvious to those skilled in the art and that the scope of the present invention is accordingly limited by nothing other than the appended claims.

Although a few example implementations have been shown and described, these example implementations are provided to convey the subject matter described herein to people who are familiar with this field. It should be understood that the subject matter described herein may be implemented in various forms without being limited to the described example implementations. For example, it is to be understood that the features of the various embodiments described herein may be rearranged, interchanged, combined, omitted, and/or otherwise modified as would be understood by one skilled in the art. The subject matter described herein can be practiced without those specifically defined or described matters or with other or different elements or matters not described. It will be appreciated by those familiar with this field that changes may be made in these example implementations without departing from the subject matter described herein as defined in the appended claims and their equivalents.

The embodiments described herein are not intended to be limited to the aspects shown herein, but is to be accorded the full scope consistent with the language claims, wherein reference to an element in the singular is not intended to mean "one and only one" unless specifically so stated, but rather "one or more."

The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more.

Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of operating a gateway apparatus capable of communicating with two cellular networks, the gateway apparatus having
   a cellular module configured to communication over a first network and a second network, the cellular module comprising a modem;
   a first cellular interface coupled to the cellular module and configured to identify and authenticate the gateway device to the first network, the first cellular interface assignable to a first network service of a plurality of network services;
   a second cellular interface coupled to the cellular module and configured to identify and authenticate the gateway apparatus to the second network, the second cellular interface assignable to a second network service of the plurality of network services;

at least one local communication interface configured to route communications between the gateway apparatus and one or more client devices; and one or more processors coupled to the cellular module and the at least one local communication interface, the method comprising:

routing communication with the one or more client devices via the cellular module using the first cellular interface assigned to the first network service over the first network, while maintaining an active connection to the second network via the cellular module using the second cellular interface assigned to a second network service;

monitoring one or more parameters of the first network;

determining, by the one or more processors, to switch communication with the one or more client devices from the first network based upon the one or more monitored parameters of the first network; and after determining to switch communication with the one or more client devices from the first network, route communication with the one or more client devices via the second network.

2. The method of claim 1, further comprising monitoring one or more parameters of the second network; and after switching communication with the one or more client devices from the first network to the second network, switching communication with the one or more client devices back to the first network upon the one or more parameters of the first network meeting a predetermined criteria.

3. The method of claim 2, wherein the one or more parameters of the first network comprises signal strength.

4. The method of claim 2, wherein monitoring one or more parameters of the first network comprises monitoring the quality of service (QOS) of the first network.

5. The method of claim 2, wherein the one or more parameters of the first network comprise a plurality of parameters which are assigned different priorities and determining to switch communication with the one or more client devices from the first network based upon the one or more monitored parameters of the first network accounting for the plurality of parameters and their priorities.

6. The method of claim 2, wherein determining to switch communication with the one or more client devices from the first network comprises determining that the first network is one or more of unreliable, unavailable, inactive, and idle.

7. The method of claim 1, wherein the first network service of a plurality of network services is selected from the group consisting of voice services, data services, short message service (SMS), and multimedia messaging service (MMS).

8. The method of claim 7, wherein the second network service of the plurality of network services is selected from the group consisting of voice services, data services, short message service (SMS), and multimedia messaging service (MMS).

9. A method of operating a dual channel gateway device capable of communicating with two cellular networks, the dual channel gateway device having a network module having a modem and configured to communication over at least a first network and a second network;

a dual network interface coupled to the network module and comprising at least a first network interface and a second network interface, the first network interface assignable to a first network service of a plurality of network services and the second network interface assignable to a second network service of the plurality of network services;

at least one local communication interface configured to communicate with one or more external client devices; and one or more processors coupled to the network module and the at least one local communication interface, the method comprising:

assigning the first network interface to the first network service;

assigning the second network interface to the second network service;

using the first network service of the first network interface to communicate over the first network, while maintaining an active connection to the second network via the second network service;

determining, by the one or more processors, to switch communication from the first network; and after determining to switch communication from the first network, using the network module to route communications over the second network.

10. The method of claim 9 further comprising:

identifying and authenticating the gateway device to the first network via the first network interface; and identifying and authenticating the gateway device to the second network via the second network interface.

11. The method of claim 9, wherein the plurality of network services comprises data services, voice services, and short messaging services (SMS).

12. The method of claim 9, wherein, after determining to switch communication from the first network, changing the second network interface to a third network service of the plurality of network services and using the third network service to communicate over the second network.

13. The method of claim 12, wherein, after determining to switch communication from the first network, changing the network service assigned to the first network interface and maintaining a connection to the first network using the second network service.

14. The method of claim 9, further comprising monitoring one or more parameters of the first network and determining to switch communication from the first network is based upon the one or more monitored parameters of the first network.

15. The method of claim 14, further comprising monitoring one or more parameters of the second network; and after switching communication from the first network to the second network, switching communication back to the first network upon the one or more parameters of the first network meeting a predetermined criteria.

16. The method of claim 14, wherein monitoring one or more parameters of the first network comprises monitoring the quality of service (QOS) of the first network.

\* \* \* \* \*